United States Patent
Bauer et al.

(10) Patent No.: US 7,084,769 B2
(45) Date of Patent: Aug. 1, 2006

(54) INTELLIGENT STATION USING MULTIPLE RF ANTENNAE AND INVENTORY CONTROL SYSTEM AND METHOD INCORPORATING SAME

(75) Inventors: Donald George Bauer, Laurel, MD (US); Edward Raymond Buiel, Mount Pleasant, SC (US); Richard John Campero, Ellicott City, MD (US); William Joseph Carpenter, Sykesville, MD (US); Steven Paul Metzler, Chillicothe, OH (US); Richard Eric Nordgren, Daleville, VA (US); Paul Brent Rasband, Frederick, MD (US); Mark Albert Taylor, Columbia, MD (US); Howard E. Wood, Jr., Covington, VA (US)

(73) Assignee: Vue Technology, Inc., Lake Forest, CA (US)

( * ) Notice: Subject to any disclaimer, the term of this patent is extended or adjusted under 35 U.S.C. 154(b) by 573 days.

(21) Appl. No.: 10/338,892

(22) Filed: Jan. 9, 2003

(65) Prior Publication Data

US 2003/0174099 A1    Sep. 18, 2003

Related U.S. Application Data

(60) Provisional application No. 60/350,023, filed on Jan. 23, 2002.

(51) Int. Cl.
    *G08B 13/14*    (2006.01)
(52) U.S. Cl. .................... 340/572.7; 340/10.3
(58) Field of Classification Search .......... 340/539.22, 340/10.1, 10.2, 10.31, 10.4, 572.1, 572.7; 235/472.02; 342/51, 357.11; 455/193.1
    See application file for complete search history.

(56) References Cited

U.S. PATENT DOCUMENTS

| | | | | |
|---|---|---|---|---|
| 4,375,642 A | * | 3/1983 | Dorrie et al. ............... 343/895 |
| 4,560,978 A | * | 12/1985 | Lemelson ............... 340/539.22 |
| 4,694,283 A | | 9/1987 | Reeb |
| 4,703,327 A | * | 10/1987 | Rossetti et al. ............... 342/51 |
| 4,827,395 A | * | 5/1989 | Anders et al. ............. 340/10.1 |
| 5,136,719 A | * | 8/1992 | Gaskill et al. ............ 455/193.1 |
| 5,268,695 A | * | 12/1993 | Dentinger et al. ...... 342/357.11 |
| 5,347,280 A | * | 9/1994 | Schuermann ................ 342/51 |
| 5,406,297 A | | 4/1995 | Caswell et al. |
| 5,434,775 A | | 7/1995 | Sims et al. |
| 5,461,385 A | | 10/1995 | Armstrong |
| 5,602,556 A | | 2/1997 | Bowers |
| 5,629,981 A | * | 5/1997 | Nerlikar ................... 340/10.31 |
| 5,640,002 A | * | 6/1997 | Ruppert et al. ......... 235/472.02 |
| 5,661,457 A | * | 8/1997 | Ghaffari et al. .......... 340/572.7 |

(Continued)

FOREIGN PATENT DOCUMENTS

EP    1185953    11/2000

(Continued)

*Primary Examiner*—Brian Zimmerman
(74) *Attorney, Agent, or Firm*—Dickstein Shapiro Morin & Oshinsky LLP

(57) ABSTRACT

An inventory control system and method that tracks inventories of items with RFID tags, includes a reader unit and an intelligent station that tracks RFID tags to determine item information of items to be inventoried. The reader unit transmits and receives RF signals. The intelligent station includes a first RF antenna connected to the reader unit by a first transmission cable through a first switch, and one or more additional RF antennae connected to the reader unit by the same first transmission cable through additional switches. An inventory control processing unit receives item information from the intelligent stations to update inventory information regarding the items to be inventoried.

8 Claims, 36 Drawing Sheets

U.S. PATENT DOCUMENTS

| | | | |
|---|---|---|---|
| 5,727,153 A | 3/1998 | Powell | |
| 5,729,236 A | 3/1998 | Flaxl | |
| 5,751,220 A * | 5/1998 | Ghaffari | 340/10.2 |
| 5,751,256 A | 5/1998 | McDonough et al. | |
| 5,777,561 A | 7/1998 | Chieu et al. | |
| 5,786,763 A | 7/1998 | Canipe | |
| 5,798,693 A | 8/1998 | Engellenner | |
| 5,800,724 A | 9/1998 | Habeger et al. | |
| 5,825,814 A | 10/1998 | Detwiler et al. | |
| 5,884,278 A | 3/1999 | Powell | |
| 5,902,437 A | 5/1999 | McDonough et al. | |
| 5,963,173 A | 10/1999 | Lian et al. | |
| 6,002,344 A | 12/1999 | Bandy et al. | |
| 6,037,879 A | 3/2000 | Tuttle | |
| 6,046,683 A * | 4/2000 | Pidwerbetsky et al. | 340/10.4 |
| 6,055,509 A | 4/2000 | Powell et al. | |
| 6,057,756 A | 5/2000 | Engellenner | |
| 6,058,374 A | 5/2000 | Guthrie et al. | |
| 6,069,564 A | 5/2000 | Hatano et al. | |
| 6,094,173 A | 7/2000 | Nylander | |
| 6,105,002 A | 8/2000 | Powell | |
| 6,112,988 A | 9/2000 | Powell et al. | |
| 6,137,447 A * | 10/2000 | Saitoh et al. | 343/742 |
| 6,150,921 A | 11/2000 | Werb et al. | |
| 6,154,137 A | 11/2000 | Goff et al. | |
| 6,166,706 A | 12/2000 | Gallagher, III et al. | |
| 6,172,596 B1 | 1/2001 | Smyczynski | |
| 6,173,891 B1 | 1/2001 | Powell | |
| 6,204,764 B1 | 3/2001 | Maloney | |
| 6,259,991 B1 * | 7/2001 | Nysen | 340/10.1 |
| 6,286,762 B1 | 9/2001 | Bodnar et al. | |
| 6,317,650 B1 | 11/2001 | Hintz et al. | |
| 6,320,556 B1 | 11/2001 | Cyman et al. | |
| 6,335,686 B1 | 1/2002 | Goff et al. | |
| 6,339,762 B1 | 1/2002 | Powell | |
| 6,341,269 B1 | 1/2002 | Dulaney et al. | |
| 6,351,215 B1 | 2/2002 | Rodgers et al. | |
| 6,354,495 B1 | 3/2002 | Powell et al. | |
| 6,395,373 B1 * | 5/2002 | Conti et al. | 340/572.1 |
| 6,398,105 B1 | 6/2002 | Katsandres et al. | |
| 6,400,272 B1 | 6/2002 | Holtzman et al. | |
| 6,462,656 B1 | 10/2002 | Ulrich et al. | |
| 6,600,418 B1 * | 7/2003 | Sainati et al. | 340/572.1 |
| 6,600,420 B1 | 7/2003 | Gonzalez et al. | |
| 6,686,830 B1 * | 2/2004 | Schirtzer | 340/10.3 |
| 6,714,121 B1 | 3/2004 | Moore | |
| 6,747,560 B1 | 6/2004 | Stevens | |
| 2001/0006368 A1 | 7/2001 | Maloney | |
| 2001/0054082 A1 | 12/2001 | Rudolph et al. | |
| 2002/0038267 A1 | 3/2002 | Turner et al. | |
| 2002/0041233 A1 | 4/2002 | Nicholson | |
| 2002/0044096 A1 | 4/2002 | Chung | |
| 2002/0149481 A1 * | 10/2002 | Shanks et al. | 340/572.1 |

FOREIGN PATENT DOCUMENTS

| | | |
|---|---|---|
| WO | WO 98/08182 | 2/1998 |
| WO | WO 00/43803 | 7/2000 |
| WO | WO 0201467 A2 | 1/2002 |

* cited by examiner

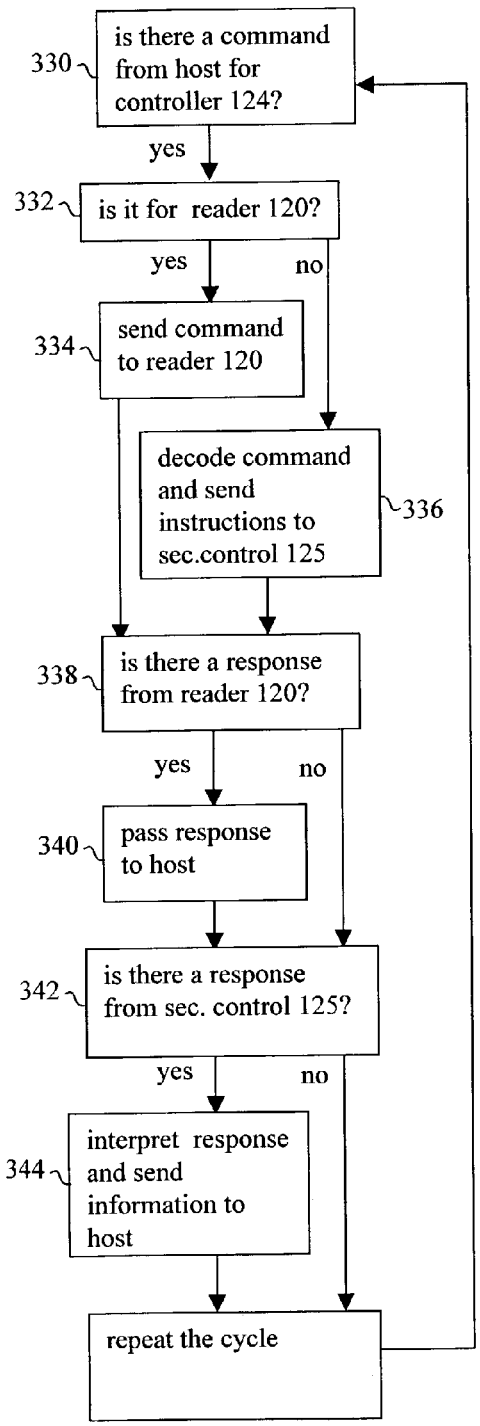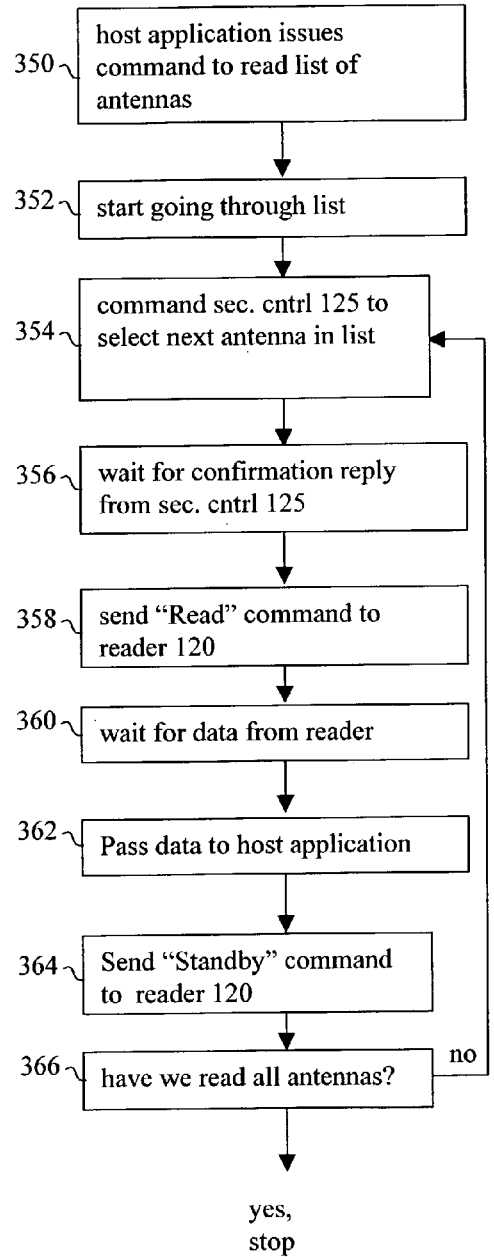

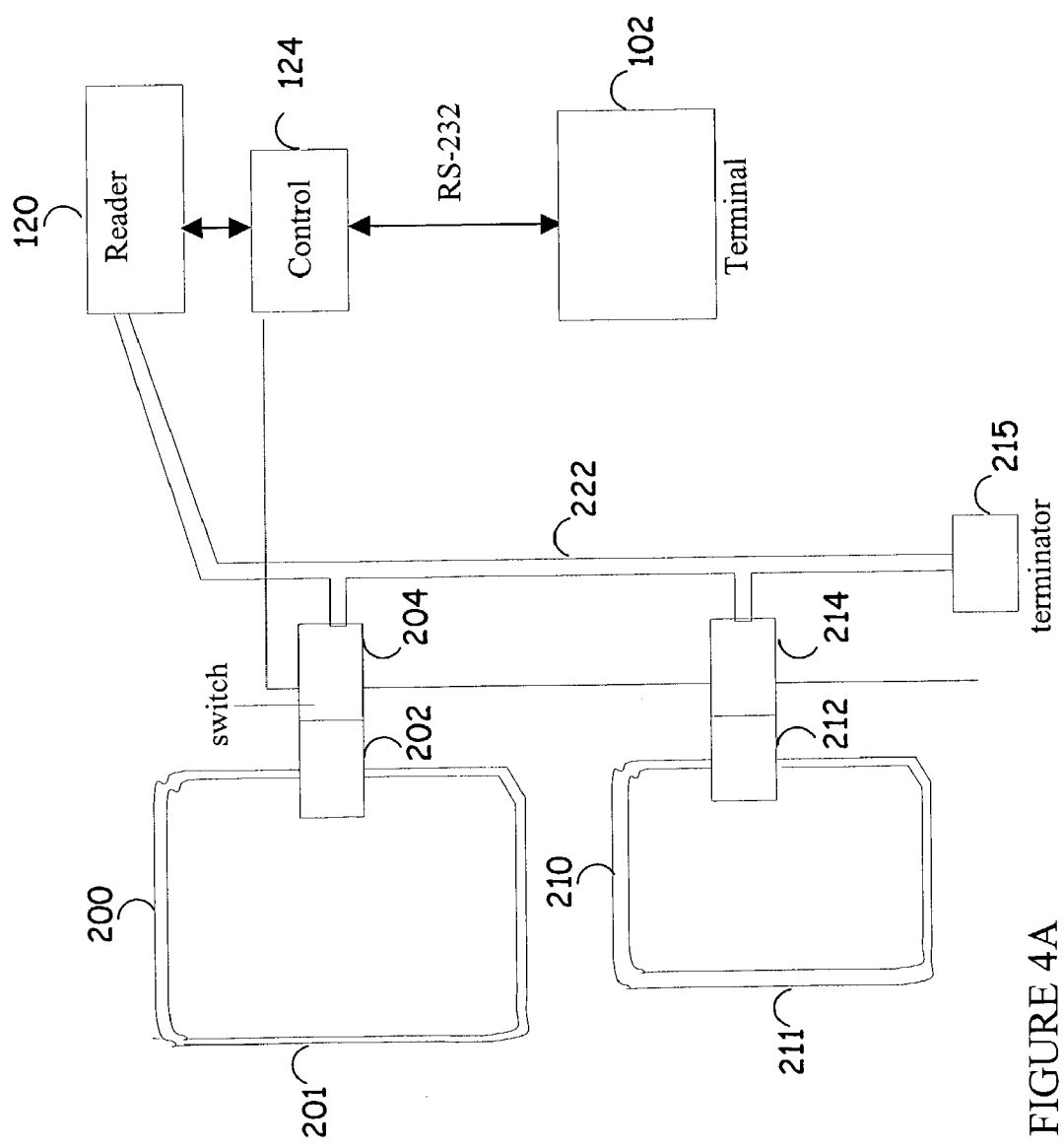

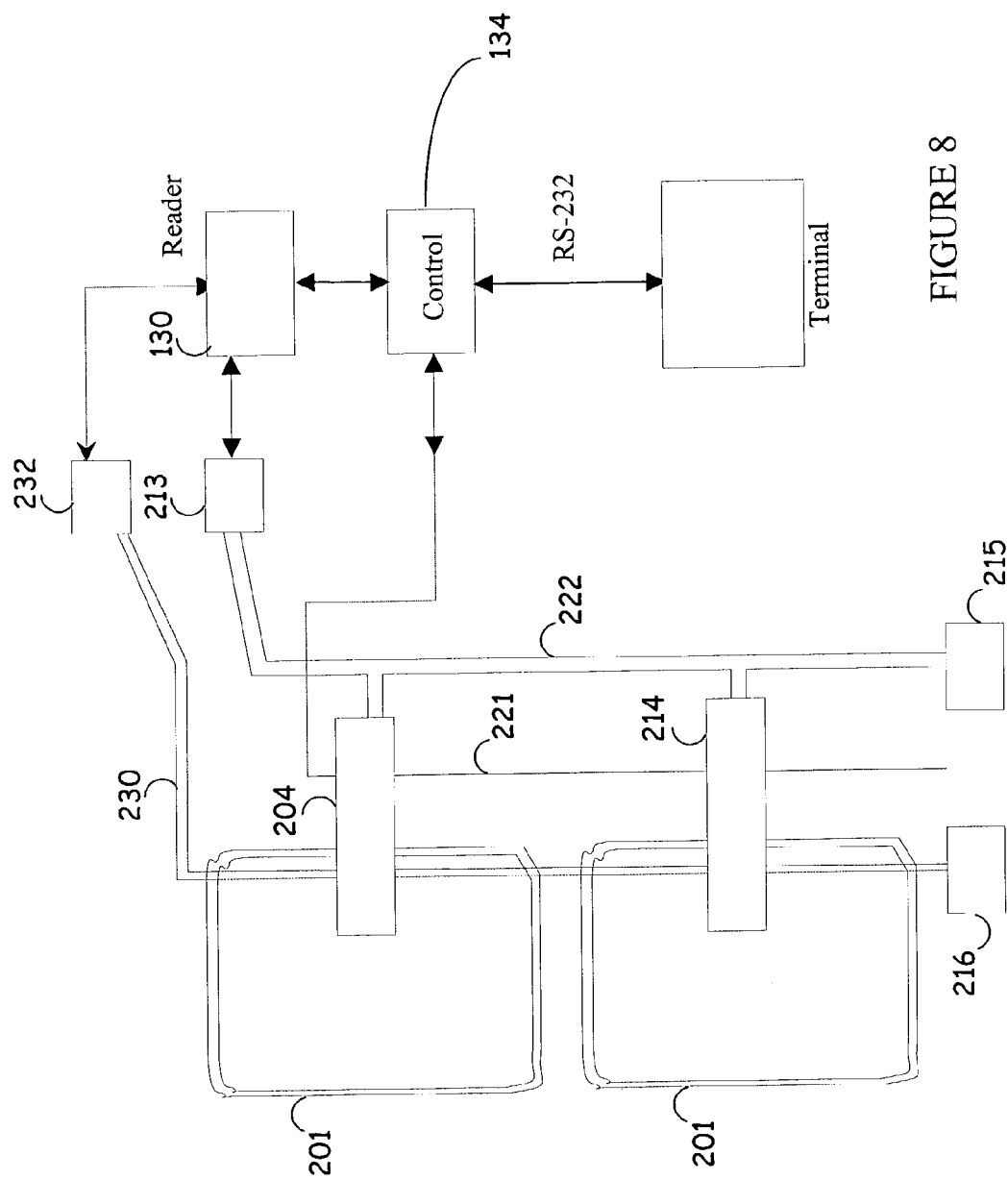

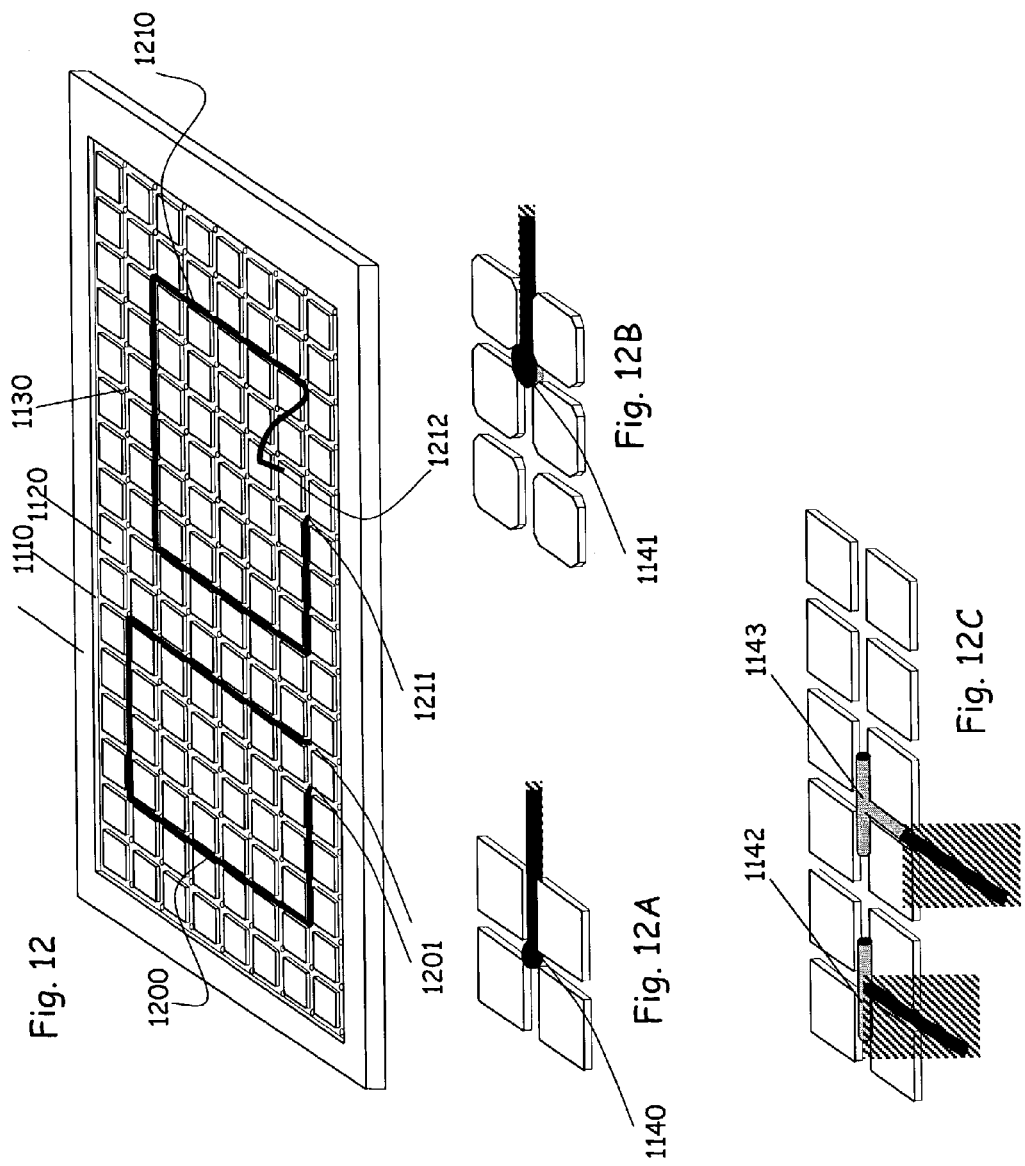

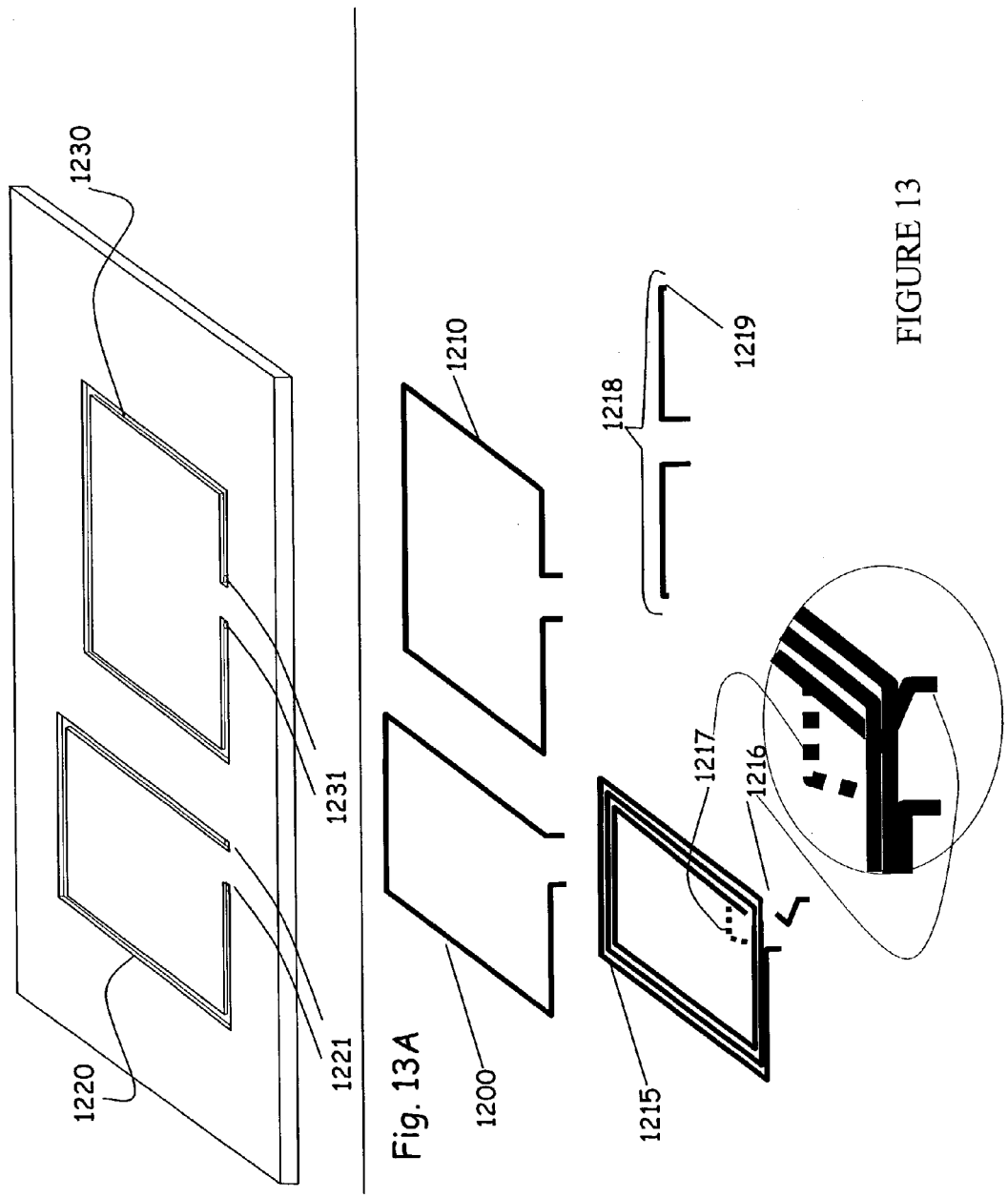

US 7,084,769 B2

INTELLIGENT STATION USING MULTIPLE RF ANTENNAE AND INVENTORY CONTROL SYSTEM AND METHOD INCORPORATING SAME

CROSS-REFERENCE TO RELATED APPLICATION

This application claims the benefit of priority under 35 U.S.C. §119(e) of provisional application Ser. Nos. 60/346,388, filed Jan. 9, 2002, and 60/350,023, filed on Jan. 23, 2002, the disclosures which are incorporated herein in their entireties.

FIELD OF THE INVENTION

The present invention relates generally to the field of using multiple RF (radio frequency) antennae in an intelligent station to track items tagged with RFID (radio frequency identification) tags. More generally, the present invention is directed to an inventory control method and system that uses the intelligent station to track and inventory items that are tagged with RFID tags.

BACKGROUND OF THE INVENTION

Radio frequency identification (RFID) systems typically use one or more reader antennae to send radio frequency (RF) signals to items tagged with RFID tags. The use of such RFID tags to identify an item or person is well known in the art. In response to the RF signals from a reader antenna, the RFID tags, when excited, produce a disturbance in the magnetic field (or electric field) that is detected by the reader antenna. Typically, such tags are passive tags that are excited or resonate in response to the RF signal from a reader antenna when the tags are within the detection range of the reader antenna. One example of such a RFID system including details of suitable RF antennae is described in U.S. Pat. No. 6,094,173, the contents of which are incorporated herein in their entirety. In order to improve the detection range and expand "coverage" it is known to use coplanar antennae that are out of phase. One example of such an antenna is provided in U.S. Pat. No. 6,166,706.

The detection range of the RFID systems is typically limited by signal strength to short ranges, for example, frequently less than about one foot for 13.56 MHz systems. Therefore, portable reader units are moved past a group of tagged items in order to detect all the tagged items since the tagged items are typically stored in a space significantly greater than the detection range of a stationary or fixed single reader antenna. Alternately, a large reader antenna with sufficient power and range to detect a larger number of tagged items may be used. However, such an antenna may be unwieldy and may increase the range of the radiated power beyond allowable limits. Furthermore, these reader antennae are often located in stores or other locations were space is at a premium and it is expensive and inconvenient to use such large reader antennae. In another possible solution, multiple small antennae may be used but this configuration may be awkward to set up keeping in mind that space is often at a premium.

However, use of multiple antennae (or components) has the drawback that multiple transmission cables are used to connect a reader unit to the multiple antennae and/or that the multiple antennae cannot be individually controlled when they are all connected by a single transmission cable to the reader unit.

By way of background, FIG. 1 is a block diagram that illustrates the basics of a prior art RFID system. A reader unit 100 may typically be connected through RS-232 or similar digital communication to a terminal 102 such as a computer terminal. The reader unit 100 is connected by a cable 203 to a reader antenna 200. The reader antenna 200 typically consists of at least a loop 201 and a tuning circuit 202. Although the tuning circuit 202 is shown as a localized part in FIG. 1, one skilled in the art would recognize that it might be distributed around the loop 201. The reader antenna 200 in turn communicates by low power radio waves 105 with one or more RFID tags 1 06 that are typically associated with items, objects (animate or inanimate) or persons that are to be tracked by the RFID system.

The transmission cable 203 is typically characterized by its impedance, which in a simplified form, is approximately the square root of inductance L divided by capacitance C of the transmission cable. For coaxial cables, the impedance is commonly 50 or 75 ohms.

Generally, the transmission cable 203, antenna loop 201, and tuning circuit 202 are connected together in a manner that most efficiently utilizes the RF power at a desired frequency, which for a given RFID system using a loop antenna, such as antenna 200, is typically a "high" frequency such as 13.56 MHz. Another common "low" frequency that is often used for RFID systems is 125 kHz. "Ultrahigh" (UHF) frequencies such as 900 MHz or 2.45 GHz within the RF range are also used with different antenna designs.

A system using multiple antennae powered by a single reader unit and using a multiplexer switch to alternate between the antennae has also been known. Such a system is conceptually represented in FIG. 2 where two separate antennae 200a and 200b are connected to a reader and multiplexer unit 101 through respective transmission cables 203a and 203b. The use of multiple antennae typically improves the spatial coverage when reading tags, without requiring more than one reader unit. The main disadvantage of the arrangement disclosed in FIG. 2 is the need for a separate transmission cable to each of the antennae. Since space is often at a premium, the use of these separate cables is a disadvantage because additional space is needed to install or position each of these separate cables. This disadvantage is accentuated when more than two antennae are used with one reader unit since all of these multiple antennae require separate transmission cables.

SUMMARY OF THE INVENTION

In one aspect, the present invention provides an intelligent station that tracks RFID tags, the intelligent station including: a reader unit that transmits and receives RF signals; a first RF antenna connected to the reader unit by a first transmission cable through a first switch; and one or more additional RF antennae connected to the reader unit by the same first transmission cable through one or more additional switches. The term "intelligent," as used herein, means that the system can, through transmission of radio frequency signals, capture, store, and lookup data, and monitor unique identifiers associated with trackable items.

In a further aspect, each of the first and one or more additional RF antennae includes a loop and a tuning circuit.

In another aspect of the present invention, the reader unit includes a tuning circuit for the first and one or more additional RF antennae, with the tuning circuit connected to the first and one or more additional RF antennae through the first transmission cable.

In another aspect, the present invention includes: a reader unit that generates and receives RF signals; and a control unit that is operatively connected to the reader unit and to first and one or more additional switches, wherein the control unit is configured to selectively operate the first and one or more additional switches to connect the reader to the first and one or more additional RF antennae, respectively. The reader unit and the control unit may be separate devices or combined in a single unit.

In yet another aspect of the present invention, the intelligent station further includes a second transmission cable that connects the reader unit to auxiliary RF antenna loops, each of the auxiliary RF antenna loops arranged proximate to a corresponding one of the first and one or more additional RF antennae. The auxiliary antennae receive an unmodulated RF signal that powers up the tags, which are normally not powered in the absence of an RF signal. As used herein, "unmodulated RF signal" is an RF signal without superimposed data. A "modulated RF signal" is an RF signal carrying superimposed data.

In a further aspect, the reader unit includes a second tuning circuit, proximate to the reader unit, that is connected to the auxiliary RF antenna loops through the second transmission cable. The second tuning circuit is configured to tune the auxiliary RF antenna loops.

In yet another aspect, the present invention provides a second transmission cable that connects the reader unit to the first and one or more additional RF antennae through the first and one or more additional switches, respectively. The reader unit transmits an unmodulated RF signal to the first and one or more additional RF antennae through the second transmission cable, and transmits a modulated RF signal to the first and one or more additional antennae through the first transmission cable.

In a further aspect of the present invention, the first switch is configured to operate in only three states: a first state such that the first switch only transmits the modulated RF signal to the first RF antenna; a second state such that the first switch only transmits the unmodulated RF signal to the first RF antenna; and a third state such that both the modulated RF signal and the unmodulated RF signal bypass the first RF antenna. The second switch includes a multi-pole switch configured to operate in only three states: a first state such that the second switch only transmits the modulated RF signal to the associated second RF antenna; a second state such that the second switch only transmits the unmodulated RF signal to the second associated RF antenna; and a third state such that both the modulated RF signal and the unmodulated RF signal bypass the associated second RF antenna. Each of the switches can be controlled independently of each other, thus, for example, the first and second switches may be set to transmit modulated and unmodulated signals, respectively, at the same time. In addition, a two-pole switch may be used which is configured to operate in one of two states (one state being to pass modulated RF signals to the associated antenna, and the other state being to pass no signals to the associated antenna).

In a further aspect, the present invention provides: additional RF antennae connected to the reader unit through the same first transmission cable; and additional switches arranged between the first transmission cable and the additional RF antennae, respectively.

In one aspect, an RF transmission cable has a single branch serving all antennae, that is antennae are connected to a reader unit through a RF transmission cable in a series arrangement.

In another aspect, an RF transmission cable has two or more branches, each serving one or more antennae, That is, antennae are connected to the reader unit through the RF transmission cable in a parallel-series arrangement, with each branch on the RF transmission cable selectable by use of a switch.

In another aspect, intelligent stations contain RF signal processing electronics to perform some of the signal processing otherwise done by the reader.

In yet another aspect, each of the one or more additional switches include a PIN type diode.

In another aspect, the present invention provides an intelligent inventory control system that uses RFID tags to determine item information of items to be inventoried, the intelligent inventory control system including one or more intelligent stations. Each intelligent station comprises a first RF antenna connected to the reader unit by a first transmission cable through a first switch; and one or more additional RF antennae connected to the reader unit by the same first transmission cable through respective one or more additional switches. The reader unit may be located apart from or within one of the intelligent stations. The inventory control system further includes an inventory control processing unit, connected to a data store, that receives item information from the intelligent station to update inventory information regarding the items to be inventoried.

In yet another aspect, the present invention provides a method of inventory control for items tagged with RFID tags, the method including: providing a plurality of intelligent stations, each intelligent station including a reader unit that transmits and receives RF signals, a first RF antenna connected to the reader unit by a first transmission cable through a first switch; and a one or more additional RF antennae connected to the reader unit by the same first transmission cable through respective one or more additional switches; determining item information of items to be inventoried by selectively energizing the first and one or more additional RF antennae of each of the intelligent stations to determine item information of items that are located on the respective intelligent stations; and processing the determined item information to update inventory information of the items to be inventoried.

In one aspect, each station has its own reader unit. However, one reader unit may also serve many stations.

In a further aspect of the present invention, the inventory control method includes selectively controlling the first and one or more additional switches to energize the first and one or more additional RF antennae and detect item information from items with RFID tags that are within range of the respective energized one or more additional RF antennae.

In a further aspect of the present invention, the inventory control method includes software control of the RF power level generated by the reader unit. In a preferred embodiment, testing would determine how much RF power the reader unit must provide to achieve optimal results for each connected antenna, which are positioned at different distances along the RF cable. This information would be stored, for example, in a look-up table or other equivalent indexed data storing means. Thereafter during operation, the power level for each antenna would be set based on this predetermined level stored in the look-up table, so that antennae at differing distances along the RF transmission cable may all operate at essentially equal power.

In an alternate embodiment, the power provided to each antenna could also depend on additional factors, for example, on the type of antenna. Therefore, in the alternate embodiment, both the distance and type of the antenna could be used to determine and store the optimal power level for a particular antenna.

In a further aspect of the present invention, the inventory control method includes RF amplifier devices, such as RF filter amplifiers, located periodically along the RF transmission cable such as in every Nth shelf to boost the RF signal strength.

In a further aspect of the present invention, the inventory control method includes updating the determined item information of items in a data store.

In a further aspect, the present invention provides that the inventory control method includes, for each intelligent station, providing a second transmission cable to connect the reader unit to one or more auxiliary antenna loops arranged proximate to respective ones of the first and one or more additional RF antennae, wherein the reader unit transmits a modulated RF signal through the first transmission cable and transmits an unmodulated RF signal through the second transmission cable.

In yet another aspect, the inventory control method according to the present invention includes providing, for each intelligent station, a second transmission cable that connects the reader unit to the first and one or more additional RF antennae through first and one or more additional switches, respectively, wherein the reader unit transmits an unmodulated RF signal to the first and one or more additional RF antennae through the second transmission cable, and transmits a modulated RF signal to the first and one or more additional RF antennae through the first transmission cable.

In another aspect the inventory control method of the present invention provides, for each intelligent station, configuring the first and one or more additional switches to operate in one of only three states: a first state that only transmits a modulated RF signal to a respective one of the first and one or more additional RF antennae; a second state that only transmits an unmodulated RF signal to the respective one of the first and one or more additional RF antennae; and a third state such that both the modulated RF signal and the unmodulated RF signal bypass the respective one of the first and one or more additional RF antennae.

BRIEF DESCRIPTION OF THE DRAWINGS

The accompanying drawings, which are incorporated in and constitute a part of the specification, illustrate without limitation presently preferred embodiments of the invention, and, together with the general description given above and the detailed description of the preferred embodiments given below, serve to explain the principles of the invention.

FIGS. 3C and 3D are flowcharts illustrating processing performed by the control unit of the inventory control system according to the present invention.

FIG. 4A is a block diagram illustrating one embodiment of the present invention showing an RFID system with multiple antennae connected to a reader unit.

FIG. 4B is a schematic diagram showing a logical switch.

FIG. 8 is a block diagram illustrating an alternate embodiment in which the modulated and unmodulated RF systems use the same antenna loops.

FIG. 12 is a diagram illustrating one method of making a wire antenna.

FIGS. 12A–C are diagrams illustrating alternate ways of securing the ends of wires on a substrate.

FIG. 13 is a diagram illustrating an alternate method of making a wire antenna.

FIG. 13A is a diagram illustrating various alternate wire antenna shapes.

DETAILED DESCRIPTION OF THE PREFERRED EMBODIMENTS

Unless otherwise specified, "a" or "an" means one or more. The present invention provides an intelligent inventory control system including one or more intelligent stations that can detect RFID tags using multiple antennae. The RFID tags are attached to items to be detected or tracked. In certain preferred embodiments discussed herein, the intelligent station system is designated as an intelligent "shelf" system since the intelligent station system provided by the present invention is suitable for tracking items on shelves of stores and warehouses for inventory control or other tracking purposes. However, it is to be understood that the present invention is not limited to intelligent shelf systems since one skilled in the art would recognize its applicability to other uses such as, for example, tracking items in closed receptacles, other storage volumes, and particular spaces. Examples of such closed receptacles or storage volumes include, without limitation, rooms, closets, cabinets, cupboards, refrigerators, freezers, pegboards, clothing racks, trailers, warehouses, pallets, counters, and other similar enclosures, spaces, or racks. It may be used in doors, doorways and other portals, in floors or floor mats, or in ceilings. It is also to be understood that the intelligent stations may be used in orientations other than the horizontal orientation typically associated with a shelf. For example, the intelligent shelves may be used in a vertical orientation as, for example, on the wall of a container, or the back or side area or surface of a storage volume.

Figure 22A:
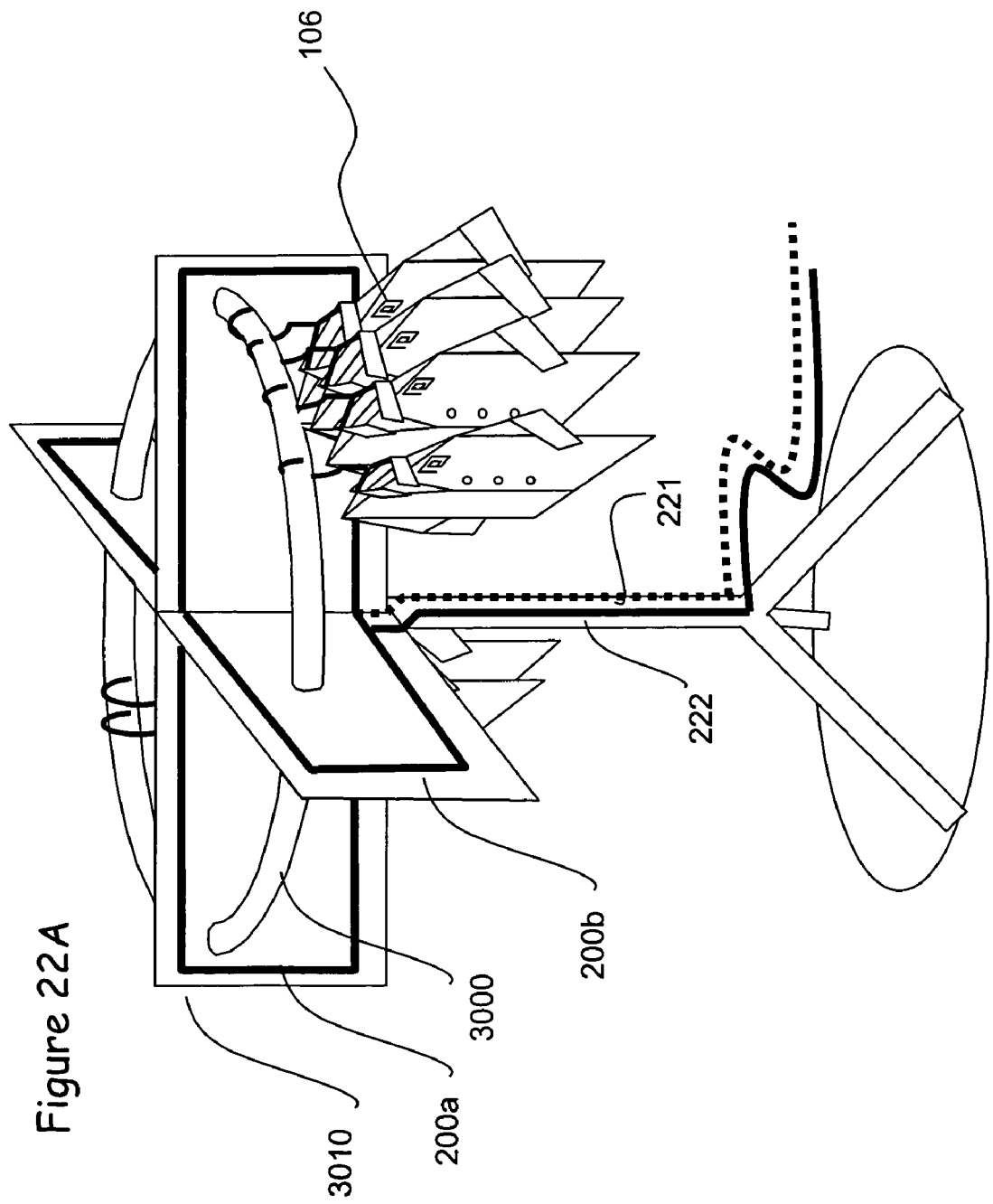
FIG. 22A is a diagram illustrating the use of an intelligent station arranged on a circular rack.

For use in clothing racks, various embodiments are envisioned including linear or circular racks, as illustrated, for example, in FIG. 22A. In the particular embodiment illustrated in this figure are shown the clothing hanger circular support 3000 and verticle antennas 200a and 200b (which may be on the surface of, or else hidden inside of the verticle antenna supports 3010). Hanging on the hanger support are clothing items with attached tags 106. The RF signal transmission cable 222 and the switch control data line 221 are also shown. The switches which connect the two antennas to the common RF signal transmission cable are not shown in the figure, but would usually be located at the point of attachment of the antenna loop to the transmission cable. The lines 221 and 222 are connected to the RF and data network which contain the reader (not shown) and control unit (not shown), and other units as described elsewhere in this specification. For circular racks in particular, it is envisioned that two antennas may be used that are orthogonally disposed in two vertical planes within the center of the circular rack. The antenna may be driven by a single reader but the length of their lead-in cables differs, preferably, by {fraction (¼)} of the RF wavelength, or alternately, a two-way 90 degree power splitter is used (e.g. MiniCircuits PSCQ-2-13) to put the two antennas 90 degrees out of phase. As a consequence the magnetic field orientation set up by the two antennas "rotates" once each cycle of the RF wave, so that all RFID tags around the circular rack may be read.

Figure 22B:
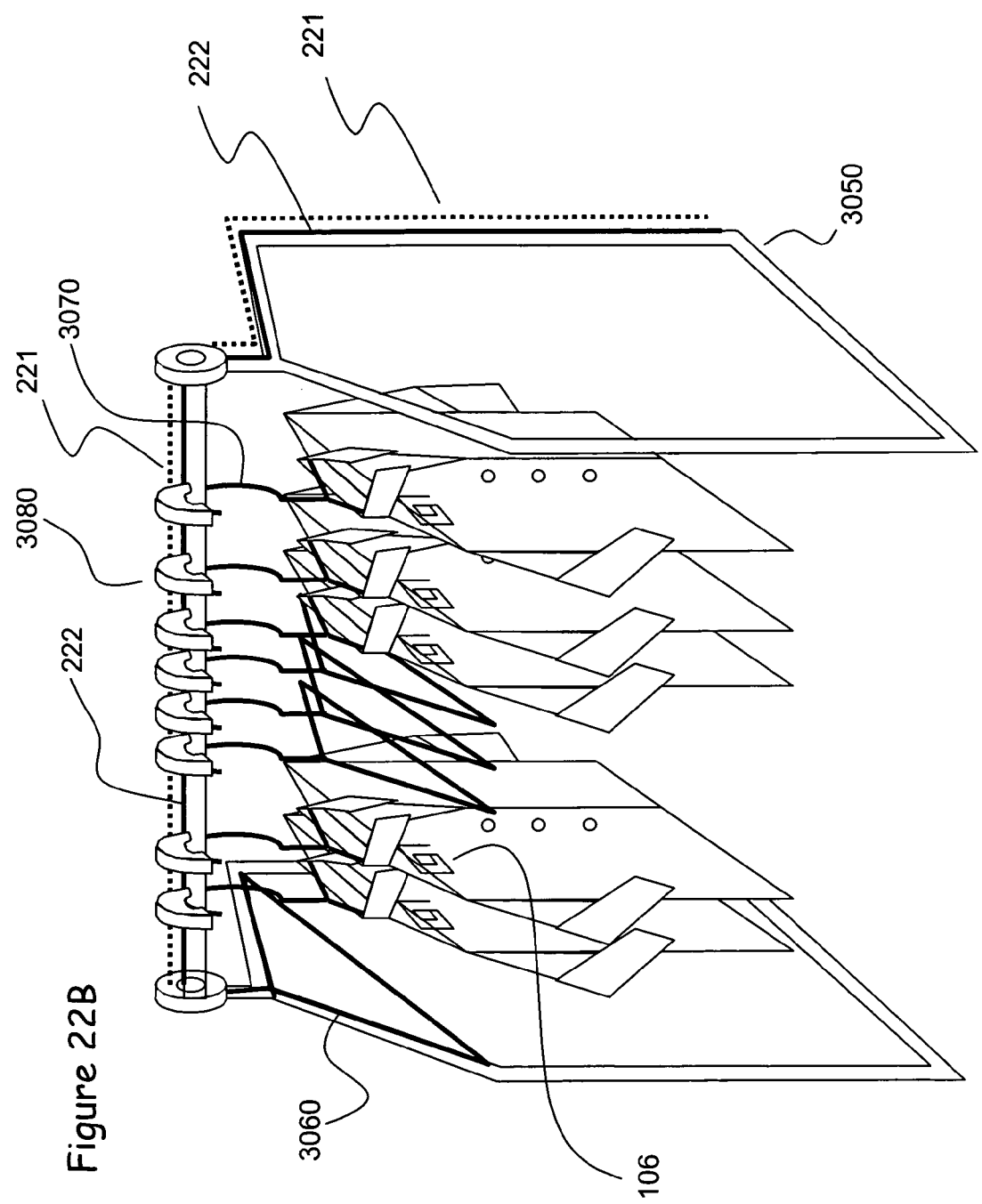
FIG. 22B is a diagram illustrating the use of RF antennae embodied as hangers on rack.

For use with clothing racks, another embodiment provides, on the clothing rack, one or more antenna loops, for example positioned or hanging at one or both ends of the rack, or distributed as hangers amidst the clothing, as illustrated, for example, in FIG. 22B. In the figure is shown one antenna loop 3060 at the end of the rack, and other antenna loops in the form of clothing hangers 3070 distributed along the rack. The RF signal transmission cable 222 extends from other parts of the RFID network containing the reader (not shown) and includes a horizontal component with which the antenna hangers are in electrical contact. At this point of contact for each hanger is a switch 3080 which creates or breaks the electrical connection between the hanger antenna and the common RF transmission cable, according to the signals sent through the control line 221. The hanger antennas may be fabricated by running conductive wire through narrow (e.g. ¼"–⅜" diameter) thermoplastic tubing, then heat-forming the tubing to create hanger-shaped antennas. The same method could be used to create self-supporting antennas in any shape.

A planar antenna can be limited in its ability to read tags that are oriented parallel to the magnetic field lines created by the antenna. The read range may be extended and tag orientation limitations overcome by providing for an RF-powered antenna (antenna connected to a reader) and one or more passively coupled antennae that are not connected directly to the reader. These passively connected antennae are excited or powered through inductive coupling with the powered antenna. The passively coupled antenna will have a magnetic field, preferably, 180 degrees out of phase with the actively coupled antenna. Thus the orientation of the resulting magnetic field will oscillate, so that RFID tags in otherwise unfavorable orientations may still be read. In one embodiment, the passively coupled antennas could be provided in the shelf itself, for example, with actively powered antennas in the front of the shelf and passively coupled antennas in the back of the shelf, with all antennas being in the plane of the shelf. Other embodiments include having passively coupled antennae in the vertical plane at the ends of shelves or backs of shelves. Other embodiments include using at least one actively powered antenna within an enclosure such as a box, cabinet, or passageway, with one or more passively coupled antennae to provide better reading range or better flexibility in reading tags that are disposed in any orientation. Other embodiments include having passively coupled antennae in the vertical plane at the ends of shelves or backs of shelves, Other embodiments include for a given shelf having passively coupled antennae in the horizontal plane some distance above the shelf, preferably just under the next shelf up.

In a preferred embodiment, the multiple antennae may be put on a self-supporting shelf or may be embedded into a thin mat that can be laid on existing store shelves.

Figure 1:
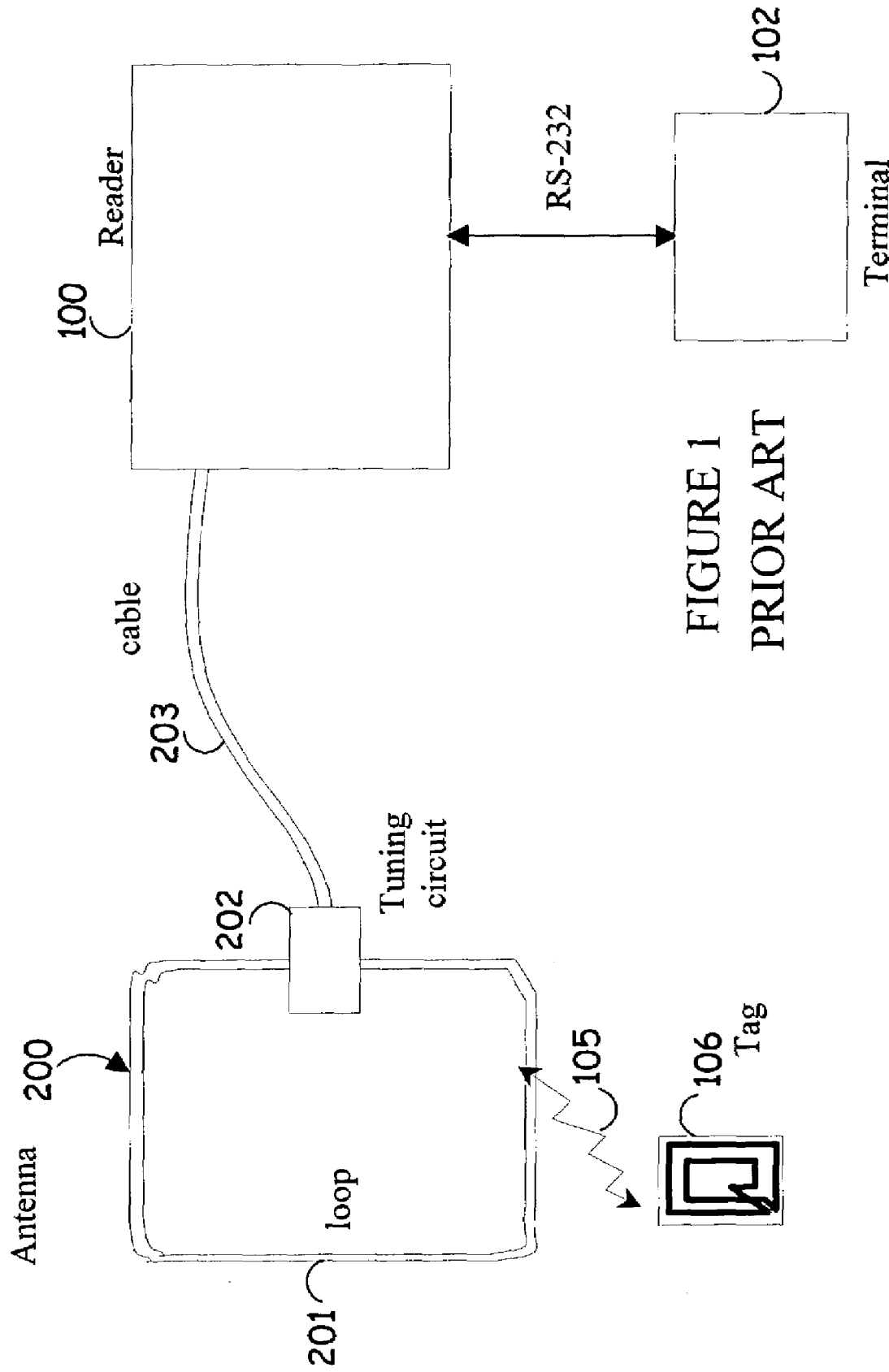
FIG. 1 is a block diagram illustrating the basics of a prior art RFID system.
Figure 2:
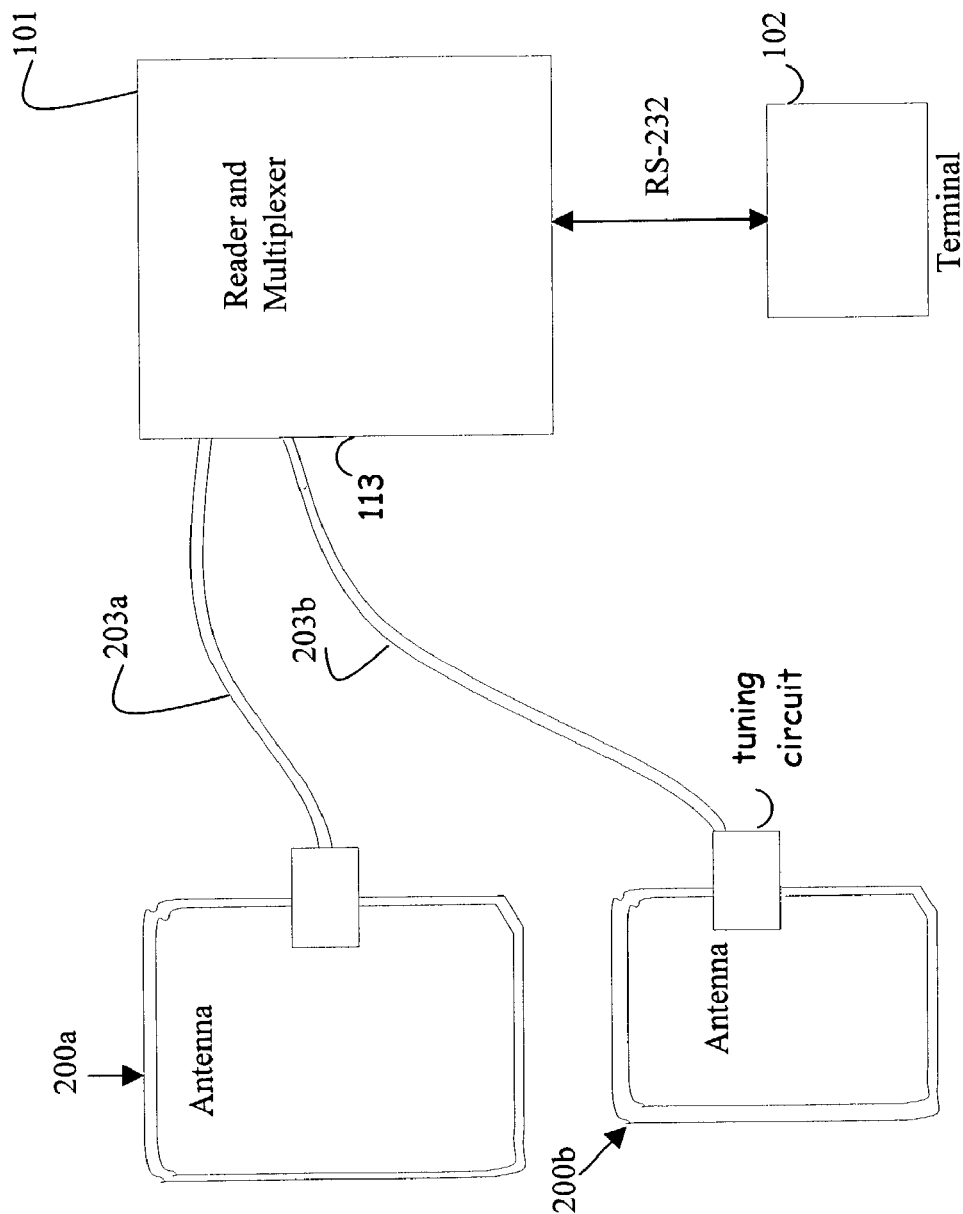
FIG. 2 is a block diagram illustrating a prior art RFID system with multiple antennae connected to a reader unit.
Figure 3A:
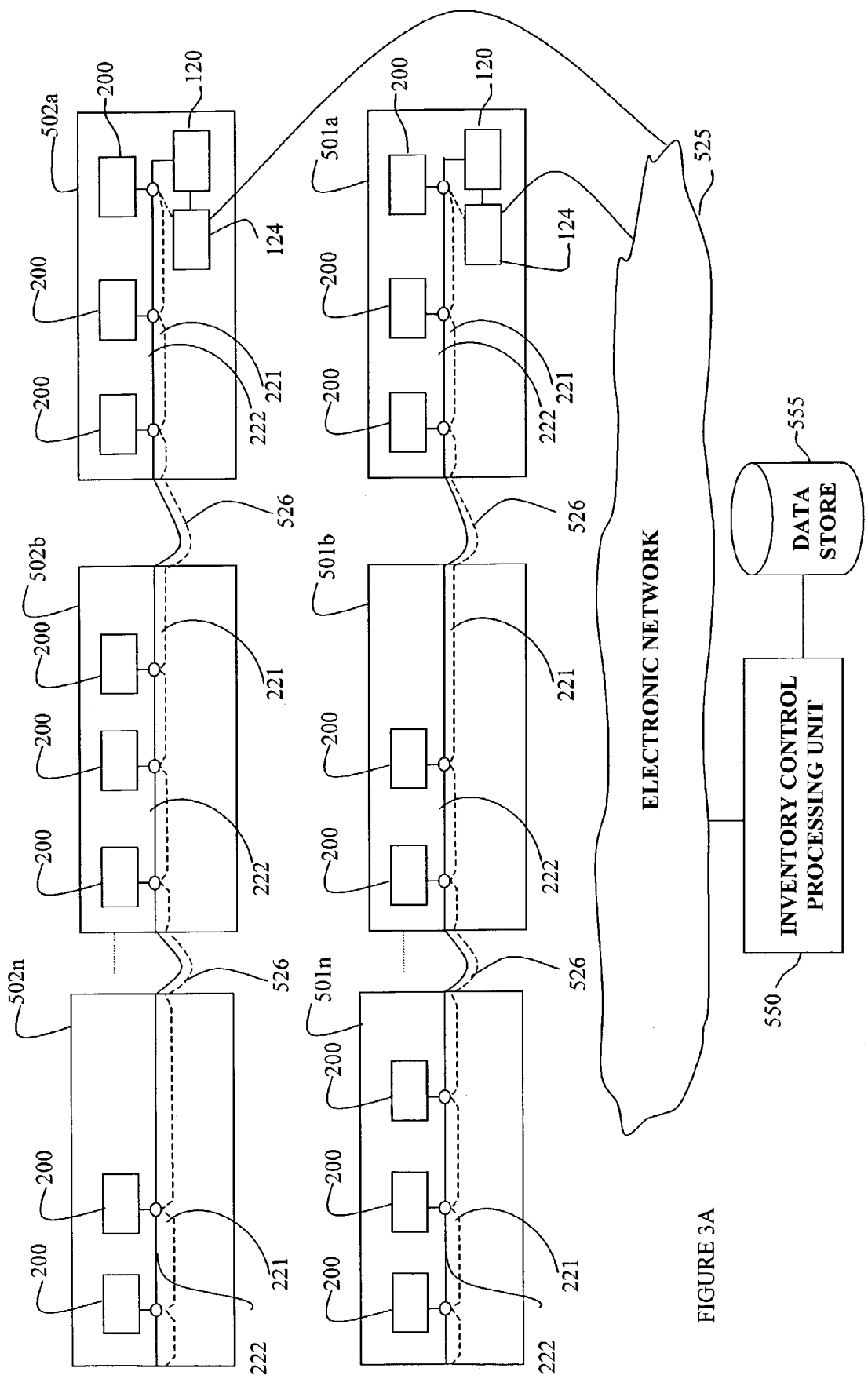
FIG. 3A is a block diagram illustrating an embodiment of an inventory control system that uses intelligent stations in accordance with the present invention.

For example, as shown in the block diagram of FIG. 3A, independent shelf systems 501a, 501b . . . 501n and 502a, 502b . . . 502n are each provided with multiple antennae 200 that are each connected to a reader unit 120 by a transmission cable 222. Each reader unit 120 has a controller or control unit 124 that uses a control cable 221 in selecting which antenna is active at any time. Between shelves, the cables 221 and 222 may be interconnected using connectors 526. While the embodiment disclosed in FIG. 3A shows that each group of shelves has an RFID system with a reader unit 120 connected to multiple antennae 200, one skilled in the art would recognize that a single reader unit may be configured to connect to multiple antennae on more than one shelf that are located proximate to each other, or each shelf may be configured to have its own reader unit.

Figure 3B:
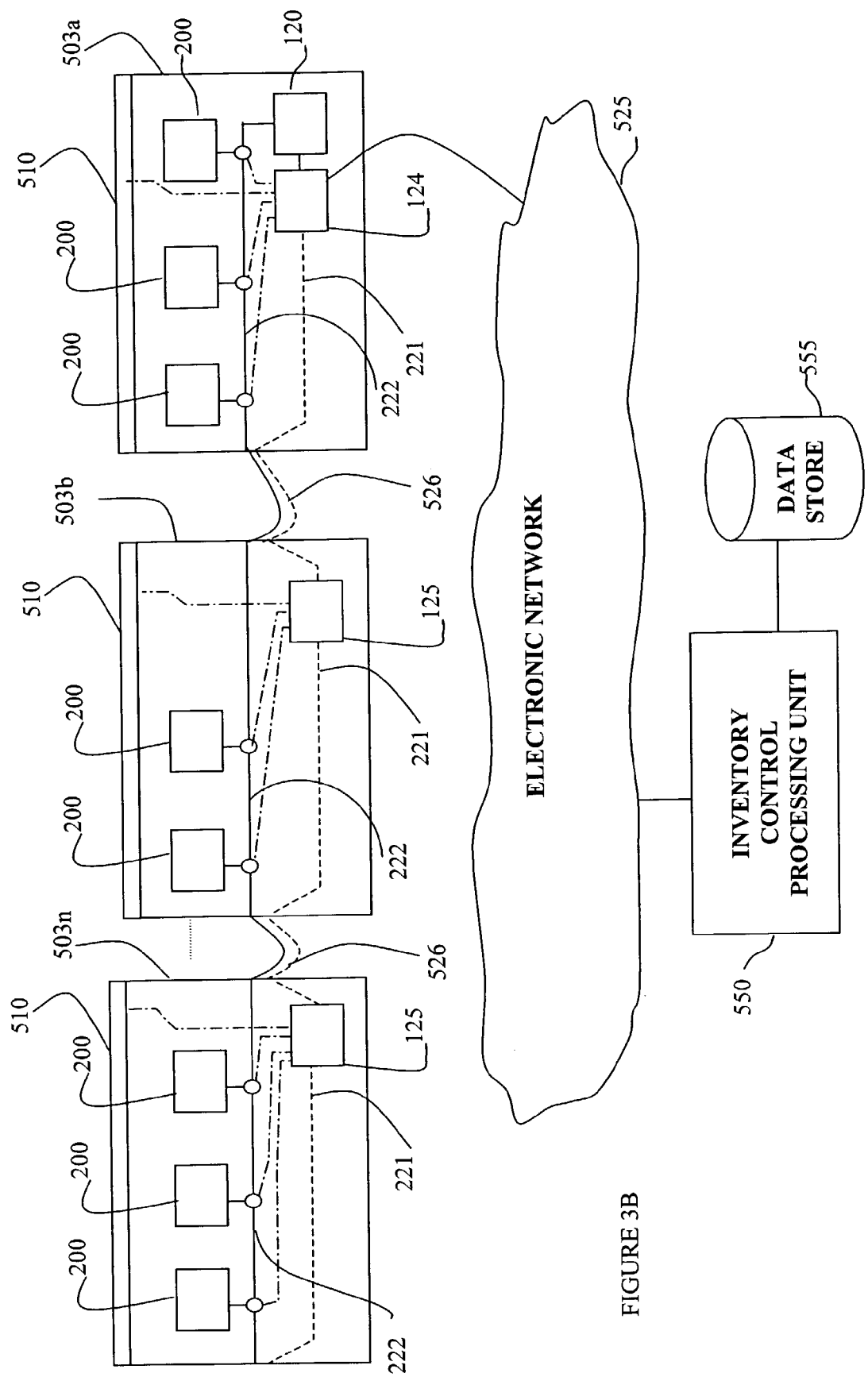
FIG. 3B is a block diagram illustrating another embodiment of an inventory control system that uses intelligent shelves in accordance with the present invention.

The block diagram of FIG. 3B shows an alternate embodiment where each shelf 503a, 503b ... 503n is provided with multiple antennae 200. The multiple antennae 200 are each connected to a reader unit 120 by a transmission cable 222. Each reader unit 120 has a controller 124 to select which antenna is active at any time. This controller 124 may be a microprocessor. Furthermore, the shelves may have secondary controllers 125 that co-operate with the controller 124 to select antennae. The secondary controllers 125 may be microprocessors with sufficient outputs to control all the antennae within the associated shelf, as well as controlling output devices 510, such as shelf-edge displays, for displaying information such as pricing. The output devices 510 could display information using visible and audible signals as would be recognized by those skilled in the art. Using secondary controllers 125 may reduce the number of wires required in connectors 526 between shelves.

The control unit 124 may selectively operate any or all the switches by sending commands through a digital data communication cable 221, for example by sending a unique address associated with each switch, as with would be possible, for example, by using a Dallas Semiconductor DS2405 "1-Wire®" addressable switch. Each such addressable switch provides a single output that may be used for switching a single antenna. Preferably the control unit 124 may selectively operate any or all the switches by utilizing one or more secondary control units 125. For example, the secondary control unit 125 may be a microprocessor such as a Microchip Technology Incorporated PICmicro® Microcontroller, which can provide multiple outputs for switching more than one antenna, such as all the antennas in proximity to the secondary control unit 125. The control unit 124 may also be a microprocessor such as a MicroChip Technology Incorporated PICmicro® Microcontroller. Communications between the control unit 124 and the secondary control unit 125 can be implemented by using digital communication signals in accordance with well known communication protocols such as RS-232, RS-485 serial protocols, or Ethernet protocols or Token Ring networking protocols. Such communications through the secondary control unit 125 may, in addition to selecting the desired antennae, also include commands to operate additional features. Examples of such features include providing displays (for example, light LED's) proximate to the antennae, displaying alphanumeric text through appropriate visual displays, or outputting audible information in the proximity of the antennae.

In a preferred embodiment, the intelligent shelf system is controlled through the electronic network. A controlling system that controls the intelligent shelf system will send command data to the control unit 124 via RS-232 or similar protocol. These commands include but are not limited to instructions for operating reader unit 120, instructions for operating the antennae switches, and auxiliary information to be displayed by shelves for example with lights, visual displays, or sound. The control unit 124 is programmed to interpret these commands. If a command is intended for the reader unit 120, the control unit 124 passes that command to the reader unit 120. Other commands could be for selecting antennae or displaying information, and these commands will be processed if necessary by control unit 124 to determine what data should be passed through digital data communication cable 221 to the secondary control units 125. Likewise the secondary control units 125 can pass data back to the controller 124, as can the reader unit 120. The controller 124 then relays result data back to the controlling system through the electronic network. The inventory control processing unit 550, shown in FIGS. 3A and 3B, is one example of such a controlling system. As discussed further herein with respect to the intelligent shelf system, the electronic network and controlling system are used interchangeably to depict that the intelligent shelf system may be controlled by the controlling system connected to the intelligent shelf system through an electronic network.

At a minimum, control unit 124 must decide whether a command from the electronic network should be sent to reader 120, or should be send on the digital communication cable 221. Also, control unit 124 must relay data it receives from the digital communication cable 221, and from reader unit 120, back to the electronic network. In the minimum configuration for example, the electronic network would for example issue a command to read a single antenna. The control unit 124 would a) set the proper switch for that antenna, b) activate the reader, c) receive data back from the reader, d) deactivate the reader, and e) send the data back to the electronic network.

FIG. 3C is a flowchart illustrating exemplary processing of a command signal from a host by the control unit 124. In step 330, the control unit 124 determines whether there is a command for the control unit 124 (it may do so by interrogating a memory location periodically). The control unit 124 then determines in step 332 whether the command was for the reader 120 and, if so, sends the command to the reader unit 120 in step 334. If not, in step 336, the control unit 124 decodes the command and sends appropriate instructions to the secondary controller 125. Thereafter, in step 338, the control unit 124 determines whether a response has been received from the reader unit 120 if a command had been sent to the reader in step 334. If a response has been received, then in step 340, the control unit 124 passes the response back to the host. Thereafter, in step 342, the control unit 124 determines whether a response has been received from the secondary control unit 125 in response to the instruction sent in step 336. If a response has been received from the secondary control unit 125 in step 342, the response is interpreted by the control unit 124 and sent to the host in step 344. Thereafter, the processing control returns to step 330 in which the control unit 124 determines whether there is another command from the host that needs to be processed.

The control unit 124 may also perform some management functions otherwise handled by the electronic network. For example, the electronic network might issue a command to find a certain article on the entire shelf system associated with control unit 124. In such a case, the control unit would manage a series of tasks such as a) determine how many antennae were in its system, b) set the proper switch for the first antenna, c) activate the reader, d) receive data back from the reader and save it, e) deactivate the reader, f) set the proper switch for the next antenna until all the antennae have been activated, g) activate the reader until all the antennae have been read. In the preferred embodiment, when all antennae had been read, the control unit 124 or the electronic network ("host" or the "controlling system") would analyze its accumulated data and report back only the location(s) of the desired item.

FIG. 3D is a flowchart illustrating exemplary management function processing performed by control unit according to the present invention. In step 350, the control unit 124 receives a command from a host application that requests a count of the total number of antennae controlled by the control unit 124. Therefore, in step 352, the control unit 124 determines the number of antennae controlled directly by the control unit 124. Thereafter, in step 354, the control unit 124 issues a command to the secondary control units 125 to select the next antenna on their list and waits for a confirmation from the secondary control units 125 in step 356. In steps 358 and 360, a "read" command is sent to the reader 120 that awaits and reads the data from the selected antenna and sends the data to the host application in step 362. Thereafter, the control unit sends a "standby" command to the reader 120 in step 364 and determines in step 366 whether all the antennae have been read. If it is determined that all the antennae have been read in step 366, the processing is terminated. Otherwise, the process control returns to step 354 so that the control unit 124 can issue a command to the secondary control units to select the next antenna on the list that has not yet been selected.

An additional advantage of placing the control unit 124 between the electronic network and the reader units is that different types of readers 120 can be used as desired. The commands from the electronic network to the control unit may be generic and not reader-specific. For example the electronic network can send to the control unit a "read antennas" command. The control unit in turn can translate this command into the appropriate command syntax required by each reader unit. Likewise the control unit can receive the response syntax from the reader unit (which may differ based on the type of the reader unit), and parse it into a generic response back to the electronic network. The command and response syntax may differ for each type of reader unit 120, but the control unit 124 makes this transparent to the electronic network.

Figure 3E:
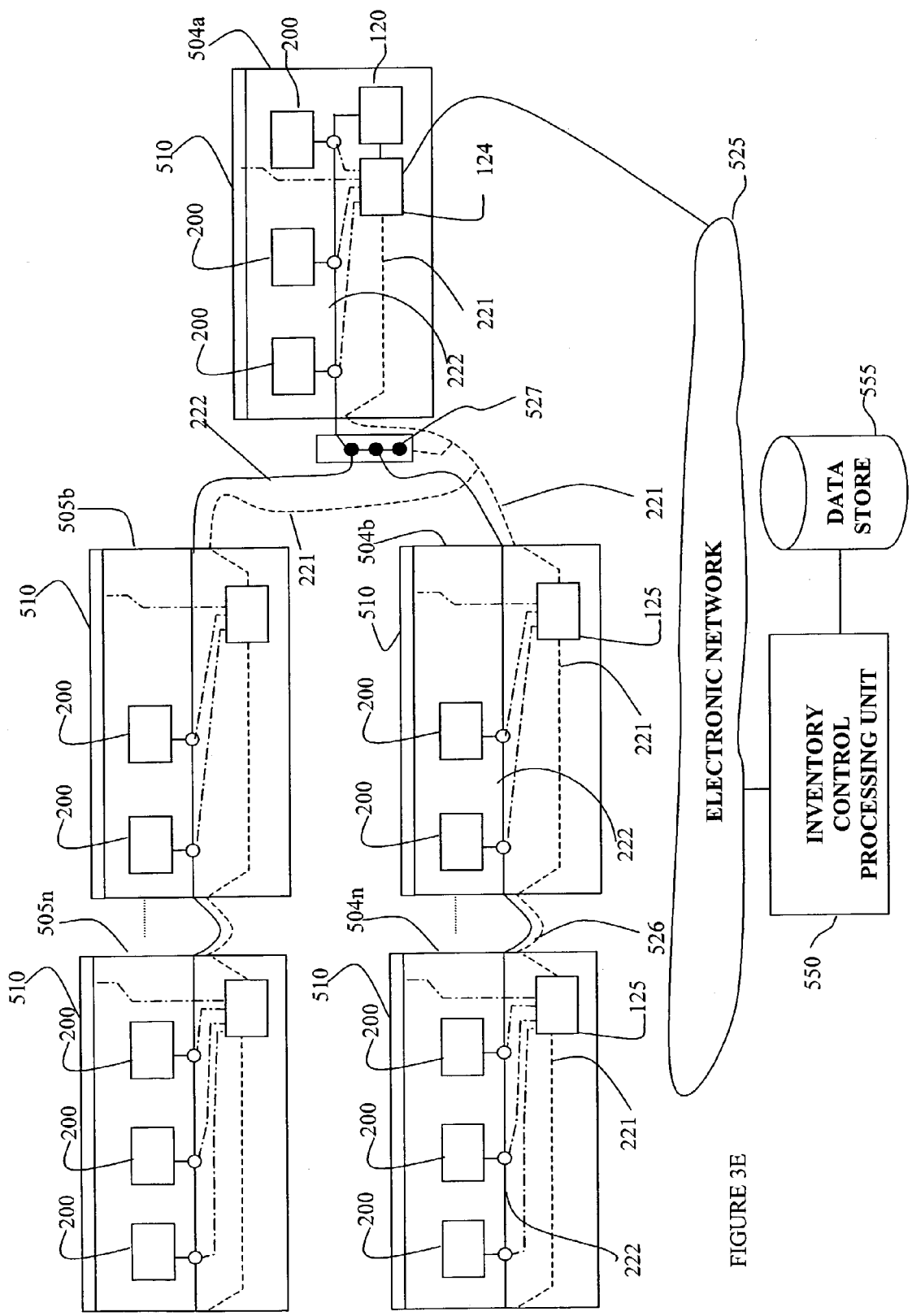
FIG. 3E is a block diagram illustrating another embodiment of an inventory control system that uses intelligent stations in a parallel-series configuration.

The block diagram of FIG. 3E shows an alternate embodiment where the controller 124 and reader 120 are contained in shelf 504a. As would be recognized by those skilled in the art, it is also possible for the controller and reader to be apart from any shelf. A digital communication cable 221 connects the controller 124 to secondary controllers 125, and RF transmission cable 222 connects the reader 120 to the antennae 200. The controller 124 may operate a branch switch 527 that selects which of the groups of shelves (for example 504b–504n, or 505b–505n) will be selected. In FIG. 3E, the branch switch 527 is used with a "parallel-series" connection method for the secondary controllers 125 and the antennae connected to the secondary controller 125. That is, instead of a controller 124 and reader 120 operating all of the shelves in single series arrangement, the RF and digital communication lines are branched (that is, each of the branches are parallel to each other) before continuing on through shelves 504b–504n in series, and 505b–505n in series. The parallel-series configuration in FIG. 3E may be advantageous for an aisle of shelves where typically there are approximately four levels of shelves (each of which may be connected in parallel), with each level having perhaps 10–20 shelf units connected in series. In certain situations a parallel-series configuration may also be desired from an RF transmission standpoint. For example, if an aisle has 4 levels of shelves each with 12 shelf units each having four antennae, the parallel-series configuration connects in parallel four groups of 48 antennae, while the series-only configuration would have to connect in series one group of 192 antennae. The RF transmission cable for the series-only configuration might thus become too long for efficient operation.

Figure 3F:
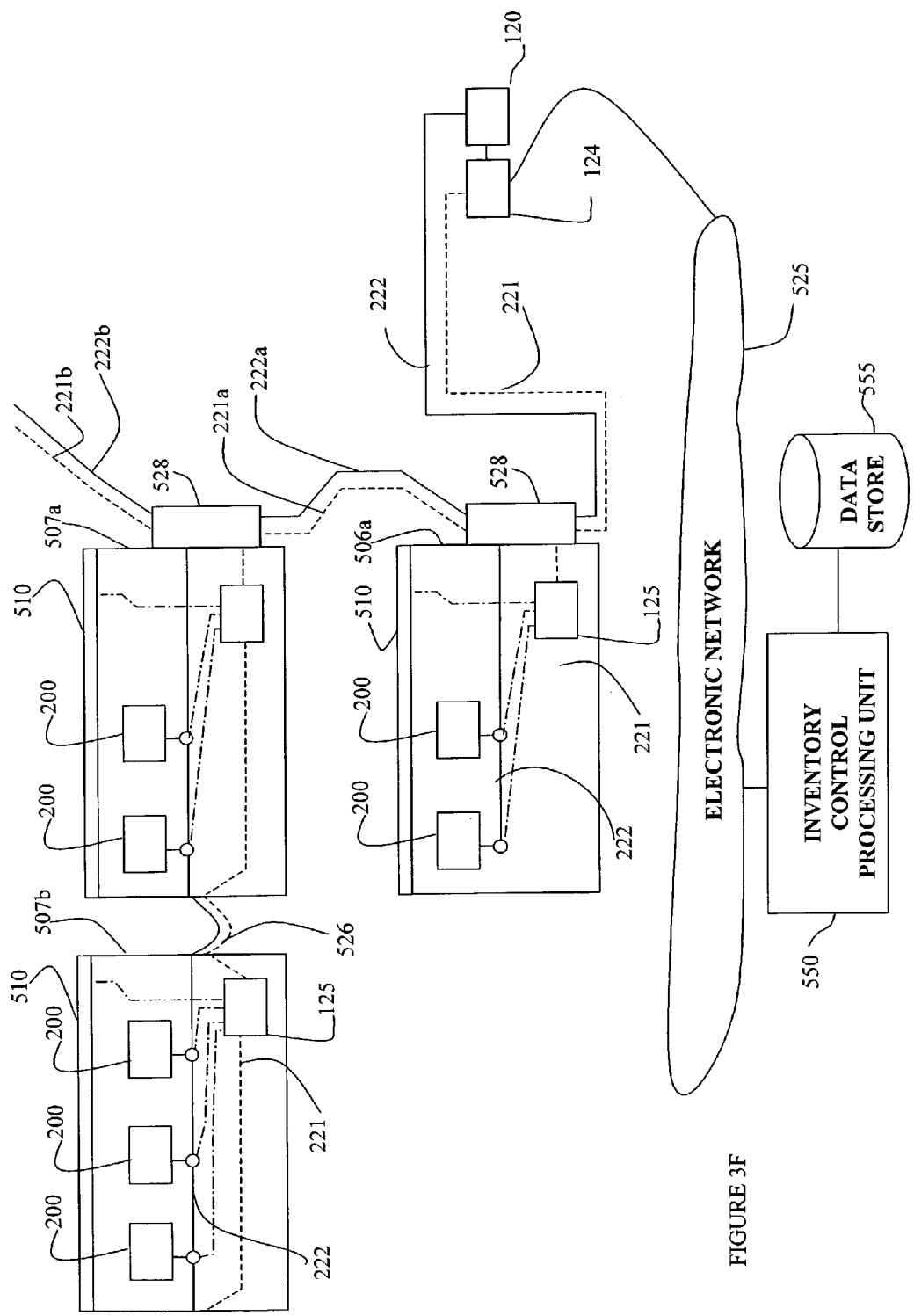
FIG. 3F is a block diagram illustrating another embodiment of an inventory control system that uses intelligent stations in another parallel-series configuration.

The block diagram of FIG. 3F shows an alternate embodiment where the controller 124 and reader 120 are arranged apart from any shelf. Digital communication cable 221 connects controller 124 to the secondary controllers 125, and RF transmission cable 222 connects the reader 120 to the antennae 200. The controller 124 or secondary controller 125 may operate a tee switch 528 that selects which of the shelves or groups of shelves (for example 506a, or 507a–507b) will be selected. The tee switch 528 may be separate from or part of a shelf as would be recognized by one skilled in the art. In FIG. 3F, the tee switch 528 is used with another "parallel-series" connection arrangement. That is, instead of a controller 124 and reader 120 operating all shelves in series, the RF and digital communication lines are branched off (that is, connected with a multi-drop or "tee" arrangement with each of the branches arranged in parallel) to shelves or groups of shelves that are arranged in series. This configuration allows the RF signal to be switched by the tee switch 528 into a shelf or group of shelves, or to bypass the shelf or group of shelves. The tee or multi-drop configuration shown in FIG. 3F may be used to reduce the number of switching elements through which the RF transmission cable passes.

In FIG. 3F the portion 221a of the control cable that extends beyond shelf 506a, and the portion 222a of the RF cable extends beyond shelf 506a, are outside of the shelf. However, as would be recognized by those skilled in the art, these extended portions of the cables may also be contained within the shelf. Additional extended control cable portions 221b and additional extended RF cable portions 222b may be used to connect to more shelves or groups of shelves. Likewise, additional shelves (not shown) may be added to groups of shelves, for example to shelves 506a–506b as would be apparent to those skilled in the art.

Figure 3G:
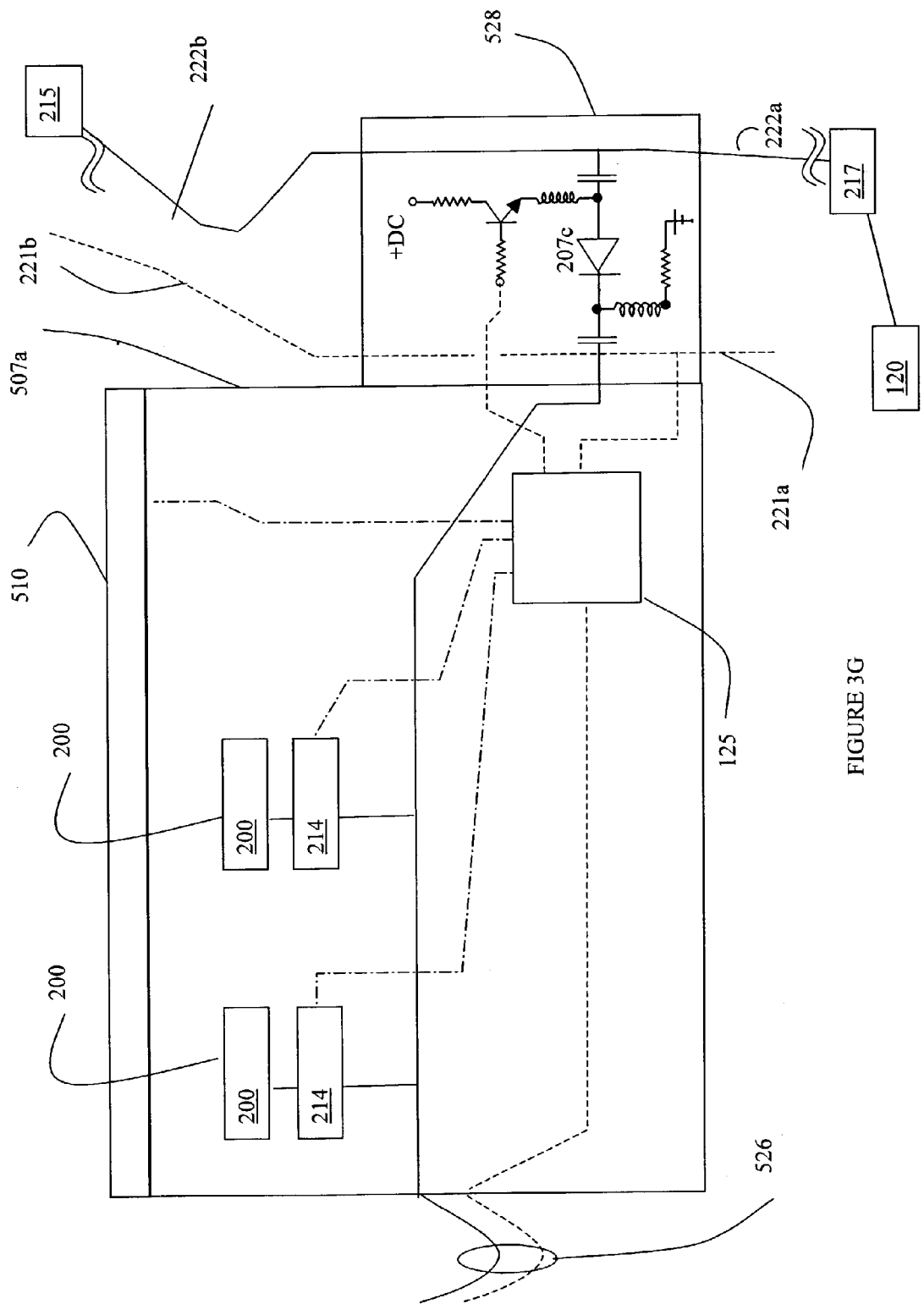
FIG. 3G is a block diagram illustrating a tee switch for use in a parallel-series configuration.

FIG. 3G shows an example tee switch 528 on an example shelf 507a. The tee switch contains a switch, for example PIN diode 207c. A secondary controller 125 associated with shelf 507a may activate PIN diode 207c to allow the RF signal from RF cable 222a into shelf 507a, where it may be routed through switches 214 to antennae 200. The RF energy also may continue along RF cable 222b to optional additional tee switches, and finally to a terminator 215. Thus typically there may be two parallel loads on the RF cable 222a—the activated antenna and the terminator 215. A circuit 217, for example, an isolator circuit that is well known to those skilled in the art, may be used to match the impedance to reader 120.

Figure 3H:
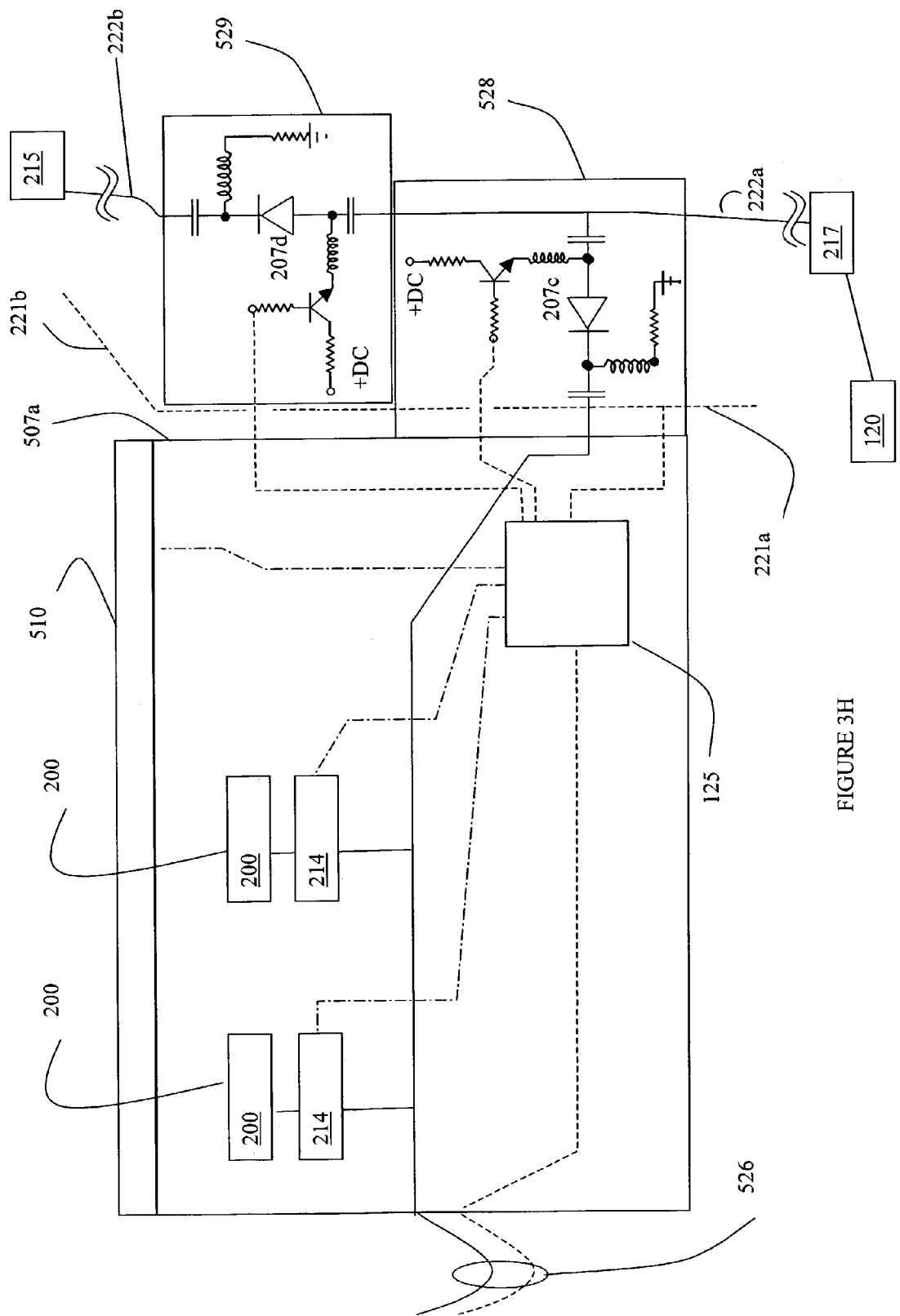
FIG. 3H is a block diagram illustrating an inline switch for use in a parallel-series configuration.

FIG. 3H shows an example inline switch 529 that may be used on an exemplary shelf 507a. The inline switch contains a switch, for example, a PIN diode 207d. A secondary controller 125 associated with shelf 507a may activate pin diode 207d to allow the RF signal from the RF cable 222a to continue along RF cable 222b, or deactivate PIN diode 207d to prevent the RF signal from continuing along RF cable 222b. Preferably, tee switch 528 and inline switch 229 may be used together to either route the RF signal to the shelf 507a or to RF cable 222b. With the use of one or more inline switches such as inline switch 529, isolator circuit 217 may not be necessary. However, the inline switch 529 may result in some RF energy loss.

Figure 3I:
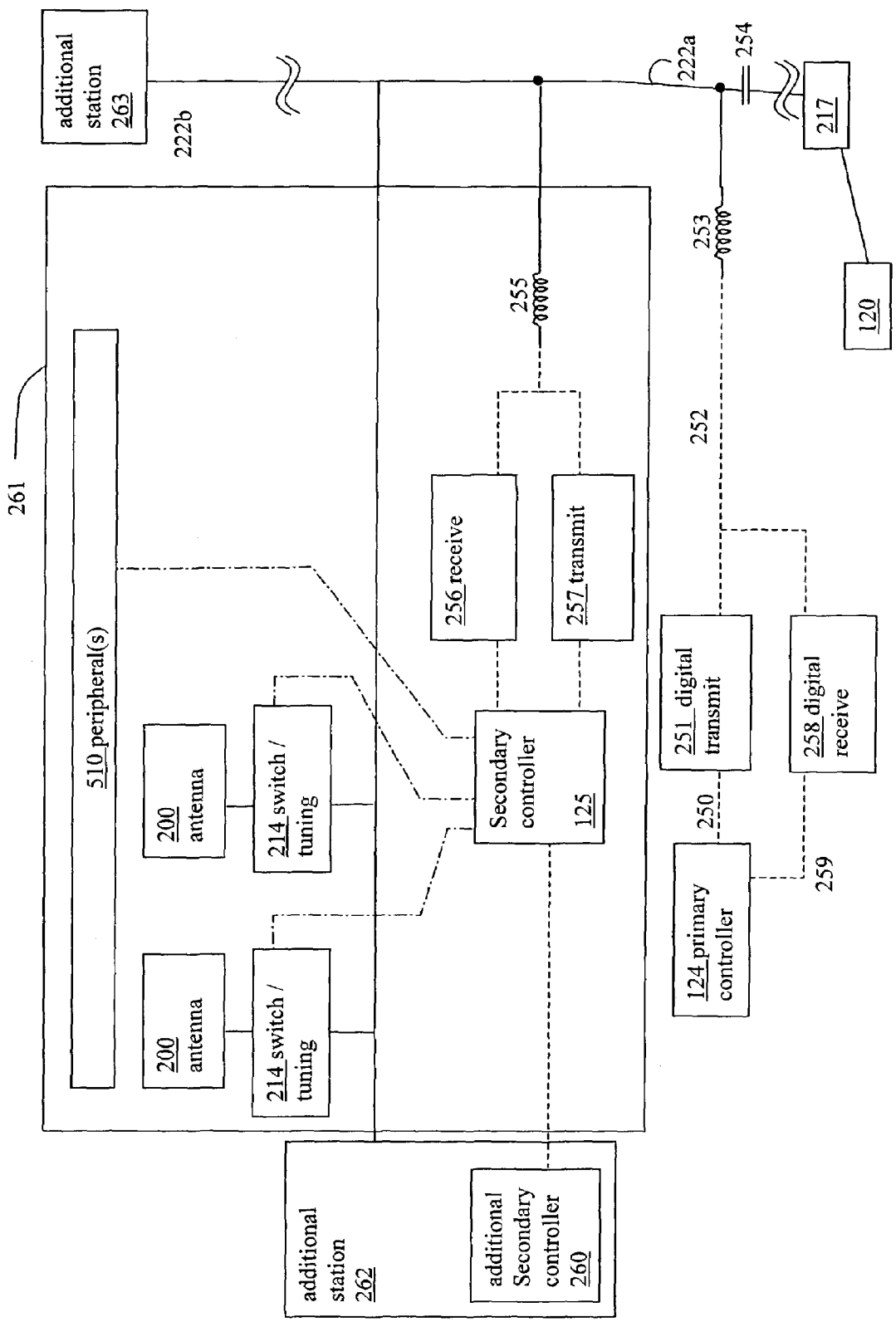
FIG. 3I is a block diagram illustrating an exemplary method of carrying RF and digital communications on one cable.

FIG. 3I shows an exemplary method of combining the RF and digital communication on a single cable. The primary controller 124 sends a digital command 250 intended for the intelligent stations. A converter 251 converts the digital data to a superimposed digital signal 252 that may be superimposed on the RF cable. For example, this superimposed digital signal may be at a different frequency than used by RFID reader 120. This superimposed digital signal may pass through a filter 253, such as the exemplary inductor 253 shown in FIG. 3I. It then is superimposed onto the RF cable.

Another filter 254 may be used to block the superimposed signal from reaching the RFID reader 120.

The combined RF and digital signals pass down cable 222a to one or more intelligent stations 261, 262, 263, etc. (only 261 and 262 shown in FIG. 3I). Upon reaching exemplary intelligent station 261, the combined signal may pass through another filter 255, such as an inductor sized to block the RF signals from the RFID reader. The superimposed digital communication passes through filter 255 and into a receiver circuit 256 that retrieves the digital information and passes it to secondary controller 125, and optionally to additional secondary controllers 260.

The secondary controller 125 may send information back to the primary controller 124 through a transmitter circuit 257, for example operating at a frequency other than the RF frequency of reader 120, and optionally at a different frequency than used for communicating from the primary controller (or control unit) 124 to the secondary controller (or control unit) 125. Such information may be received by receiver circuitry 258, converted to appropriate digital signals 259 and returned to the primary controller 124.

A variation on the method for digital communication between the primary controller 124 and secondary controller 125 is to send digital communications from the primary controller 124 as a series of pulses at two or more DC voltages. Preferably, both voltages are high enough to power any circuitry associated with the secondary controller 125, peripherals 510, etc that require DC power. These voltages may be sent from digital transmitter circuit 251, and received by receiver circuitry 256, which could be a simple voltage comparator circuit. Communication from the secondary controller 125 back to the primary controller may be provided by having the digital transmit circuitry 257 provide two different levels of current draw or load on the communications cable, for example by switching in and out a transistor feeding a resistor. Such variations in the current draw would then be sensed by the receiver circuit 258 and converted into digital data for the primary controller 124.

Figure 3J:
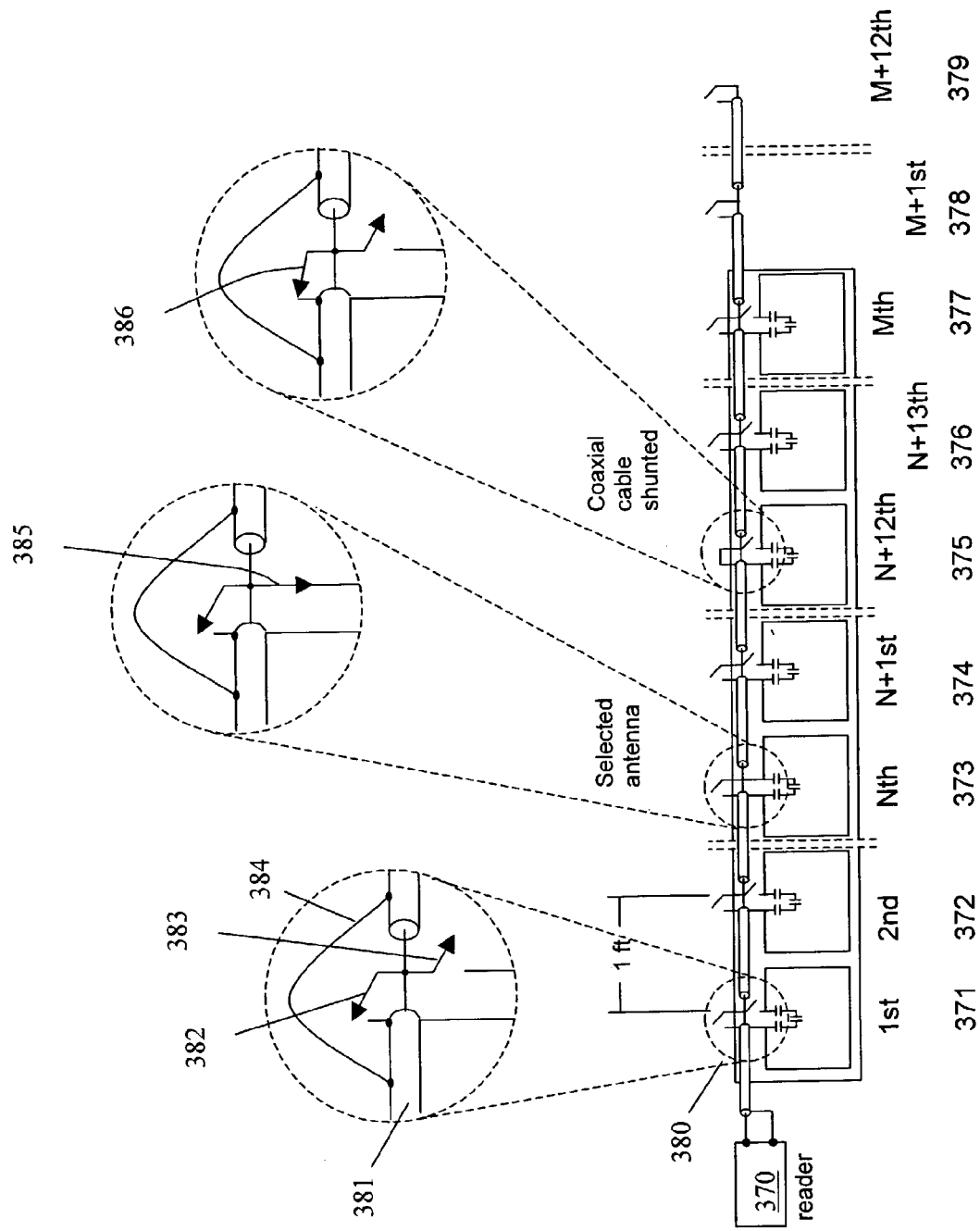
FIG. 3J is a block diagram illustrating a method of using switches to minimize undesirable effects of an RF cable extending past a selected antenna.

FIG. 3J illustrates an exemplary method using switches to minimize the undesirable effects of an RF cable extending past a selected antenna. It will be understood from the preceding descriptions that switches may be controlled by the intelligent station system through use of secondary controllers (or control unit). FIG. 3J shows a reader unit 370 connected to a series of antennas 371–377. The series of antennae are also denoted as $1^{st}$, $2^{nd}$, Nth, etc. Each antenna has associated with it circuitry 380. The circuitry may include a coaxial cable 381 carrying the RF signal. An RF-carrying center conductor may be shorted to the coaxial shield by shunt switch 382, or connected to tuning circuitry and thereafter the antenna 371 through a select switch 383. The coaxial shield is electrically continuous as denoted by line 384. The coaxial shield would typically be grounded. The coaxial center conductor is likewise continuous.

The distance between successive antennae is, preferably, an integer submultiple of a quarter-wavelength of the RF signal. For example, an RF signal at 13.56 MHz travelling through standard coaxial cable with polyethylene dielectric has a quarter wavelength of approximately 12 feet. Thus, as shown in FIG. 3J, a one-foot coaxial length between antennae could be used to provide a one-twelve submultiple of a quarter wavelength spacing. Other integer submultiples are possible, for example a 1.5-foot coaxial length between antennae could be used to provide a one-eighth submultiple.

To illustrate the method, the Nth antenna 373 could be selected by closing select switch 385 to direct the RF signal to antenna 373. Also, shunt switch 386 is closed to short the RF signal to the coaxial shield at antenna 375, which is located a quarter wavelength further along the RF cable. A short circuit at one-quarter wavelength distance along the RF cable is seen as an infinite impedance, and minimizes the adverse effects of the RF cable extension past the selected antenna. At the end of the series of antennae, there may optionally be additional shunting switches as denoted by 378 and 379.

In the preferred embodiments, the intelligent station system is modular, using inexpensive components to handle data from the multiple antennae. Multiple antennae within a shelf may be activated in sequence or, optionally, with phase delays to enhance their effectiveness as is within the abilities of those skilled in the art.

With reference to the figures, FIG. 4A is a block diagram illustrating one embodiment of the present invention that shows an RFID system with multiple antennae 200, 210 (only two shown for convenience) connected to a reader unit 120. Therefore, the RFID system disclosed herein could be used to implement the intelligent stations 501a–n or 502a–n shown in FIG. 3A. FIG. 4A is not intended to limit the present invention since those skilled in the art would recognize various modifications, alternatives, and variations thereof. Furthermore, one skilled in the art would recognize that the present invention, and its construction and method of operation would apply to transmissions and detection at other frequencies also as long as power and regulatory requirements are satisfied. The RFID system may comprise a single shelf or the multiple antennae may be arranged on proximate shelves and connected to a single reader unit using connectors, for e.g., co-axial or other connection means. As shown in FIG. 4A, a single RF transmission cable 222 is used to connect to both the antennae 200 and 210. The transmission cable 222 terminates in a conventional terminator 215. The reader unit 120 is associated with a control unit 124 but does not have a multiplexer. Instead the controller 124 is designed to control switches 204 and 214 located at the antennae 200 and 210, respectively. The control unit 124 may also communicate with secondary control units 125, for example, located proximate to the antennae. The secondary control unit 125 may include microprocessors or addressable devices that may cooperate with control unit 124 in selecting the antennae.

In one embodiment, the switches 204 and 214 are connected to the control unit 124 by a separate cable 221. Those skilled in the art would recognize that other means, including wireless means, or different frequency signals superimposed on the RF signal carried on the cable 222, may be used to connect the control unit 124 to the switches 204 and 214. The switches 204, 214 are controlled so that at any time, only one of the antennae 200, 210 is connected to the reader unit 120 through the cable 222.

FIG. 4B is a schematic diagram showing a logical switch 204 that toggles between an open (dotted line) and a closed position, which powers the antenna. Such a logical switch may be used with the embodiment discussed with respect to FIG. 4A.

Figure 5:
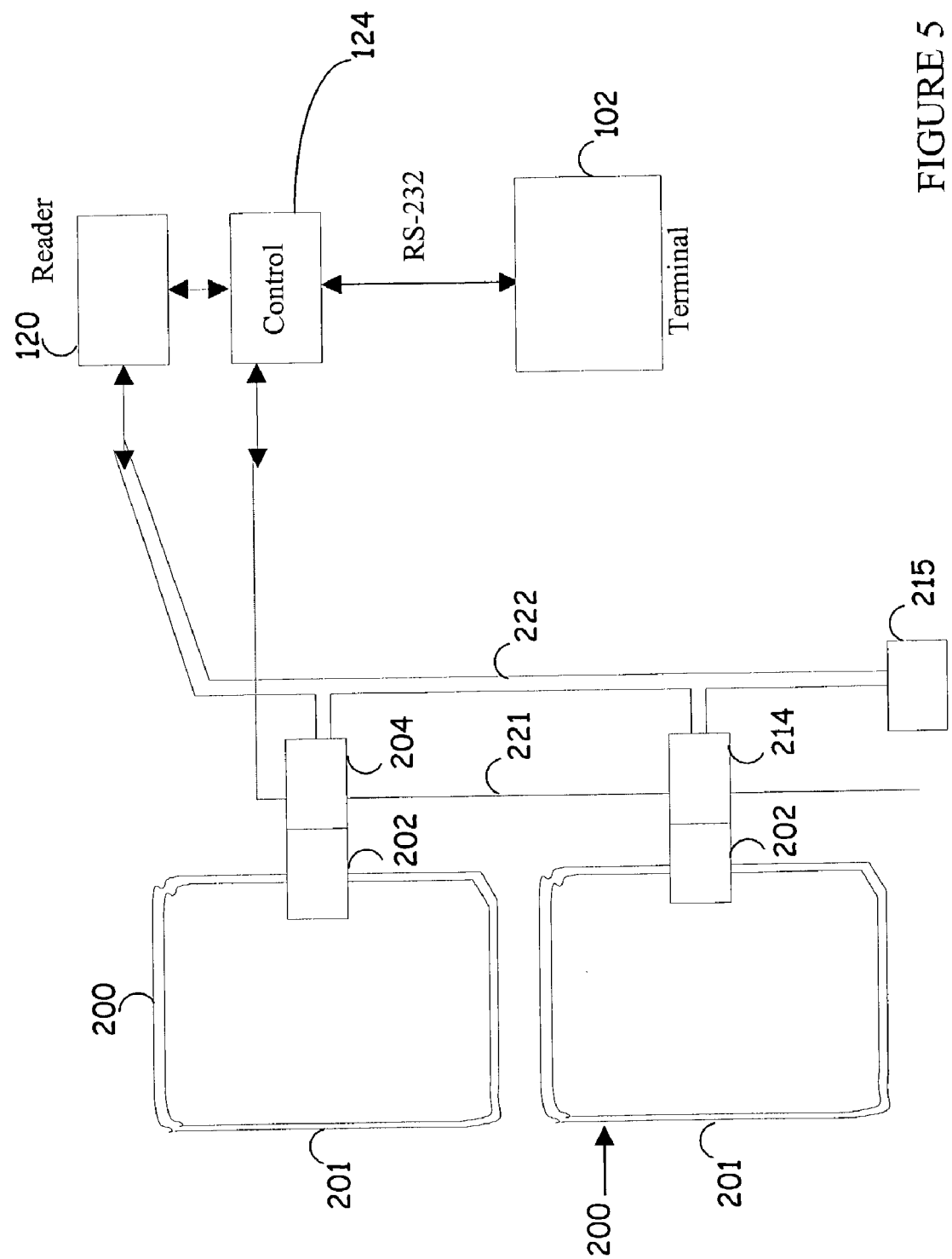
FIGS. 5 and 6 are block diagrams showing alternate embodiments of the present invention having multiple antennae.

FIG. 5 is another embodiment of the present invention that is similar to the embodiment discussed above with respect to FIG. 4A, except that the antennae 200 are all identical, as shown in FIG. 5. Therefore, the tuning circuits 202 may all be identical, which simplifies antenna fabrication. Therefore, the reader unit 120 is connected by transmission cable 222 and switches 204 and 214 to respective multiple identical antennae 200.

Figure 6:
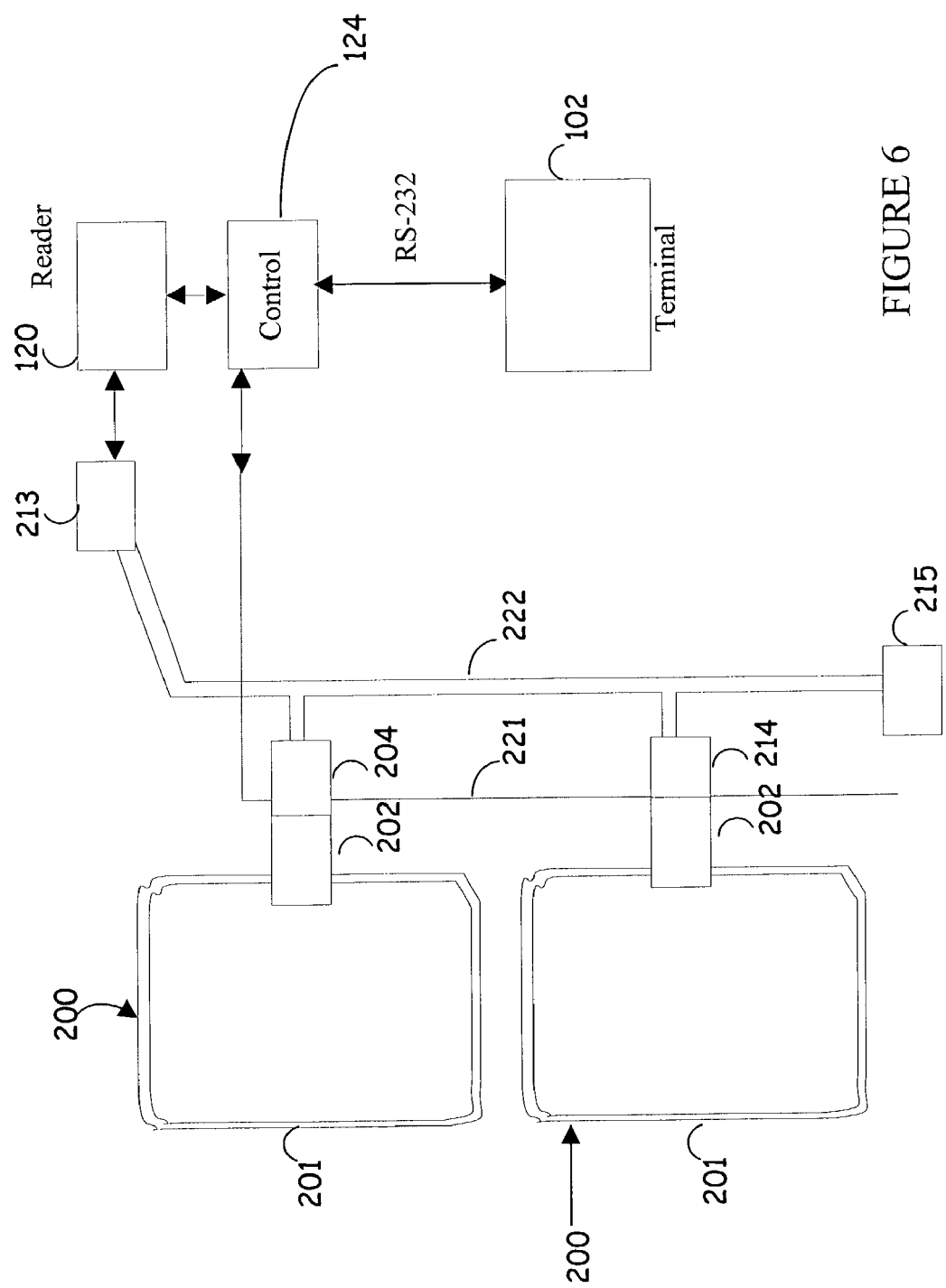

FIG. 6 is block diagram of an alternate embodiment that shows a benefit when the multiple antennae 200 are identical. Portions of the tuning circuitry 202 may be moved back to a common tuning circuit 213 at or proximate the reader unit 120 itself. Therefore, the reader unit 120 is connected to the multiple antennae 200 through a common tuning circuit 213 that is provided at the reader unit 120. As would be recognized by those skilled in the art, a main tuning circuit 202 or 212 may still be provided for each antenna 200.

Figure 7:
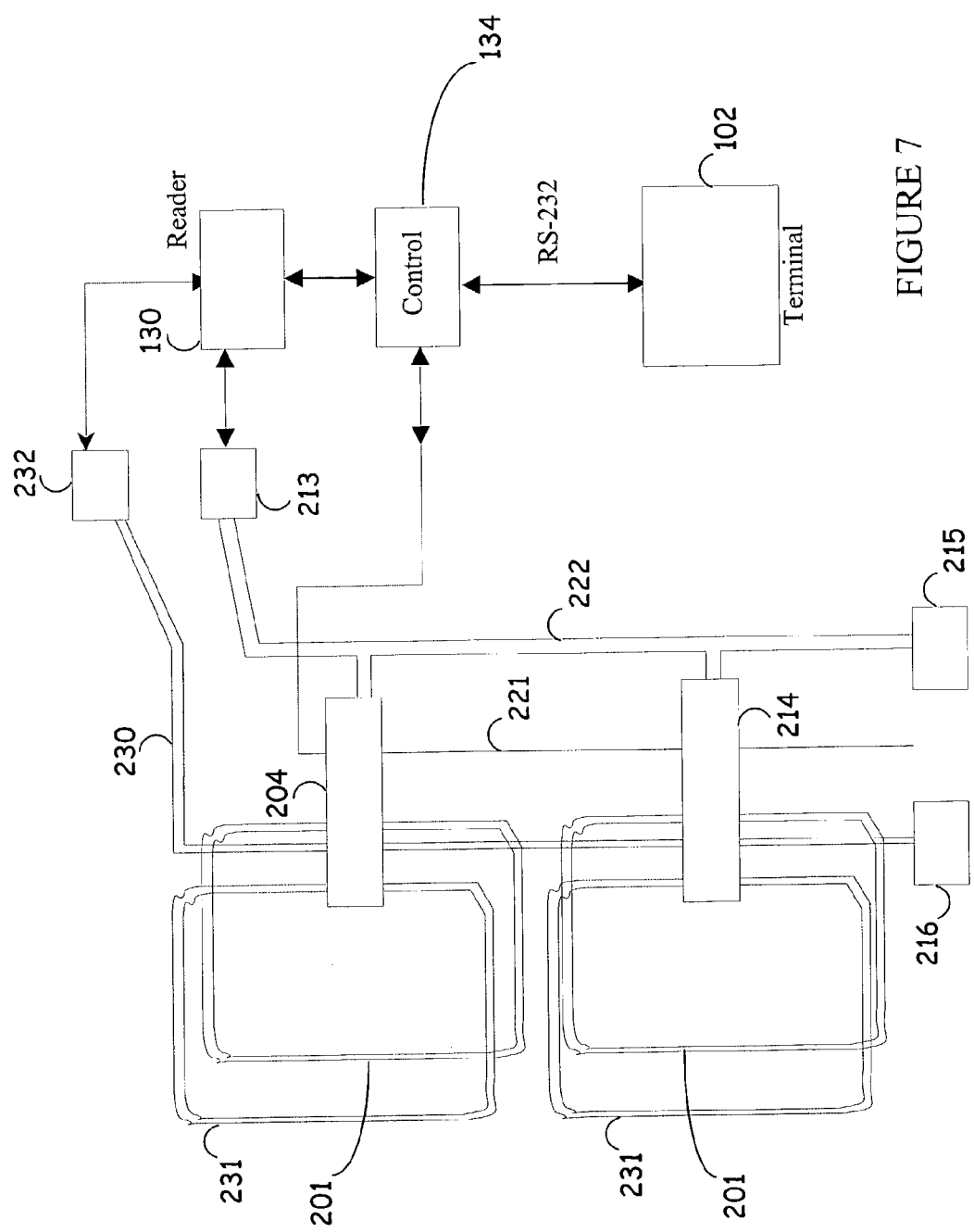
FIG. 7 is a block diagram illustrating another embodiment of the present invention in which two separate transmission cables transmit modulated and unmodulated RF signals to multiple antennae each having several loops.

FIG. 7 is a block diagram illustrating another embodiment of the present invention in which two separate transmission cables 222 and 230 transmit modulated and unmodulated RF signals, respectively, to multiple antenna configurations each of which include antenna loops 201 and 231. Associated with the reader unit 130 is a control unit 134. The reader unit 130 is designed so that a RF signal can be split to allow an unmodulated RF signal to be transmitted through a separate cable 230 and through a tuning circuit 232 into antenna loops 231 that are associated with the RF antennae 201. Each of the RF antennae 201 is associated with respective antenna loops 231. As before, the reader unit 130 also generates a modulated RF signal that is transmitted through the tuning circuit 212 and the transmission cable 222 to the multiple antennae 201. Respective switches 204 and 214 connect the respective antennae 201 to the transmission cable 222 and also connect the respective antenna loops 231 to the transmission cable 230.

In one embodiment, the unmodulated RF system, including the tuning circuit 232, the cable 230, and the antenna loops 231 may all be powered continuously. In contrast, the reader antenna data loops 201 may only be turned on one at a time by suitably controlling the switches 204 and 214. Because the loops 231 can be powered continuously, there is no start-up time required for RFID tags to charge up during data transfer. Such a system could advantageously be used in situations where the RFID tags need to be frequently read. Furthermore, this embodiment also allows handheld reader units to read the tags at any time because the tags are always powered in view of the continuous powering of the unmodulated RF system. The unmodulated cable 230 has a terminator 216 at the end of the cable 230. In this context, it should be understood that the term "continuous" power may include a percentage duty cycle if required by legal or other limits. Alternatively, the unmodulated RF system can be activated just prior to activating the modulated RF system for each antenna.

FIG. 8 is another embodiment that is similar to the embodiment discussed above with respect to FIG. 7. In this embodiment, the modulated RF signal through cable 222 and the unmodulated RF signal through cable 230 are routed through the same antennae 201. The switches 204 and 214 are preferably configured so that the modulated RF signal 222, or unmodulated RF signal 230, or neither signal, is routed into a given antenna 201. That is, the switches 204 and 214 are designed so that they can only operate in three states: (I) a first state in which only the modulated RF signal is transmitted to an antenna 201; (II) a second state in which only the unmodulated RF signal is transmitted to the antenna 201; and (III) a third state in which both the modulated RF signal and the unmodulated RF signal bypass the antenna 201.

Such a switching operation can be implemented with groups of single or multi-pole RF switches. In operation, this embodiment allows for an antenna 201 to be inactive until just before its turn to be polled. At that point, the unmodulated RF signal can be switched into the antenna 201 through the tuning circuit 232, the transmission cable 230 and the appropriate switch 204, 214 to "warm up" the nearby RFID tags. Thereafter, the modulated RF signal is switched into that antenna 201 through the tuning circuit 212, the cable 222, and the appropriate switch 204, 214 to efficiently acquire data from the RFID tags that have just been warmed up.

Figure 9A:
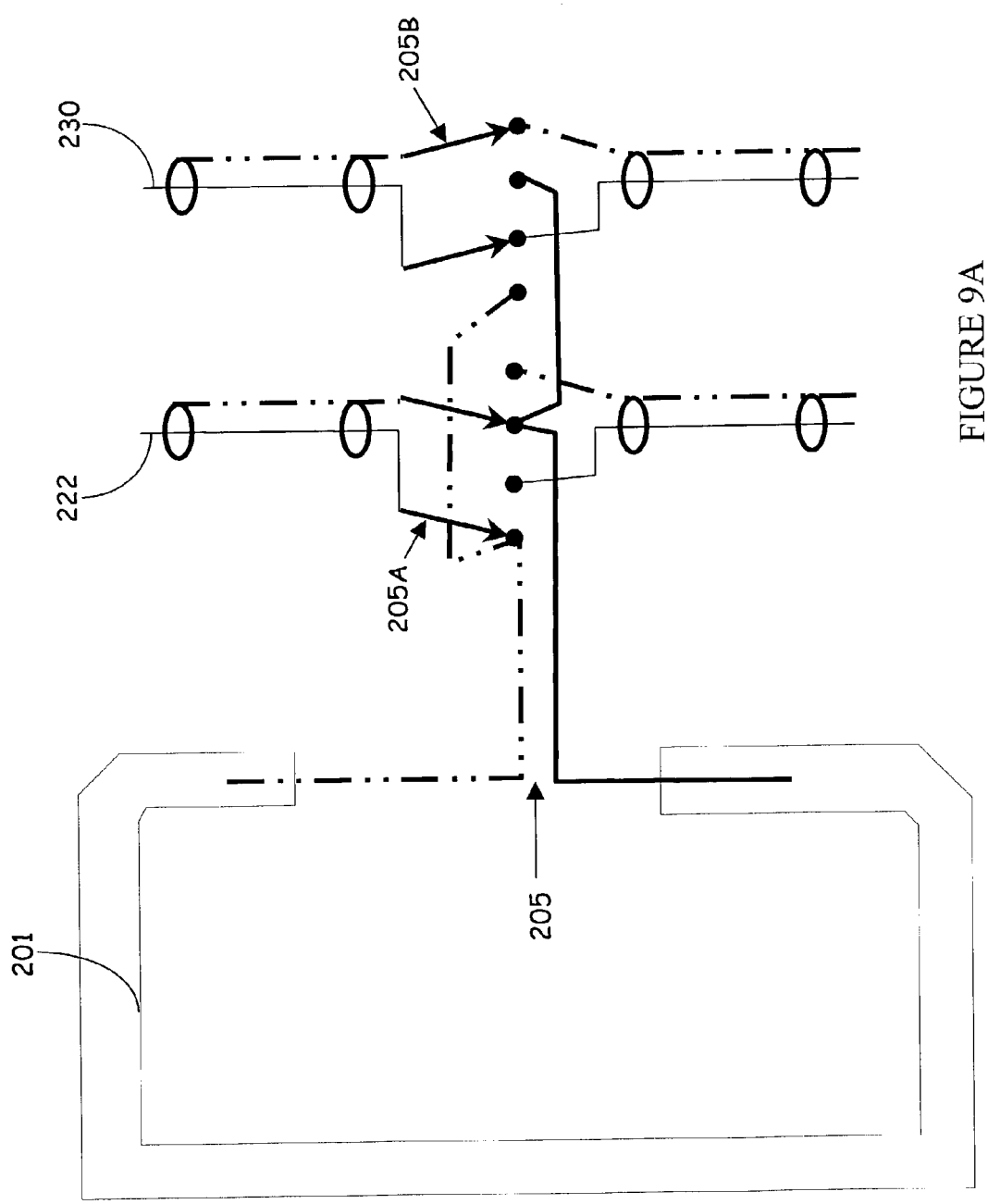
FIG. 9A is a schematic diagram of an exemplary switch that may be used with the embodiment disclosed in FIG. 8.

FIG. 9A is a simplified schematic diagram of a switch 205 that may be used, for example, with the embodiment discussed with respect to FIG. 8. FIG. 9A is not intended to limit the present invention since those skilled in the art would recognize various modifications, variations, and alternatives thereon. When switch 205A is thrown to the left to connect one pole of antenna loop 201 onto the center conductor of modulated RF signal coaxial cable 222, with the other pole connected to the shield of the same cable, the modulated RF signal is transmitted to the antenna 201. If switch 205A is thrown to the right, the signal in the modulated cable 222 continues on to another antenna. Switch 205B is shown thrown to the right, so that the unmodulated RF signal continues on toward another antenna. If switch 205B is thrown to the left, the unmodulated RF signal will be passed through the antenna 201. If both switches A and B are thrown to the right, both signals will bypass the antenna which will be completely inactive. Switch 205 is designed so that switches 205A and 205B cannot both be thrown to the left.

Figure 9B:
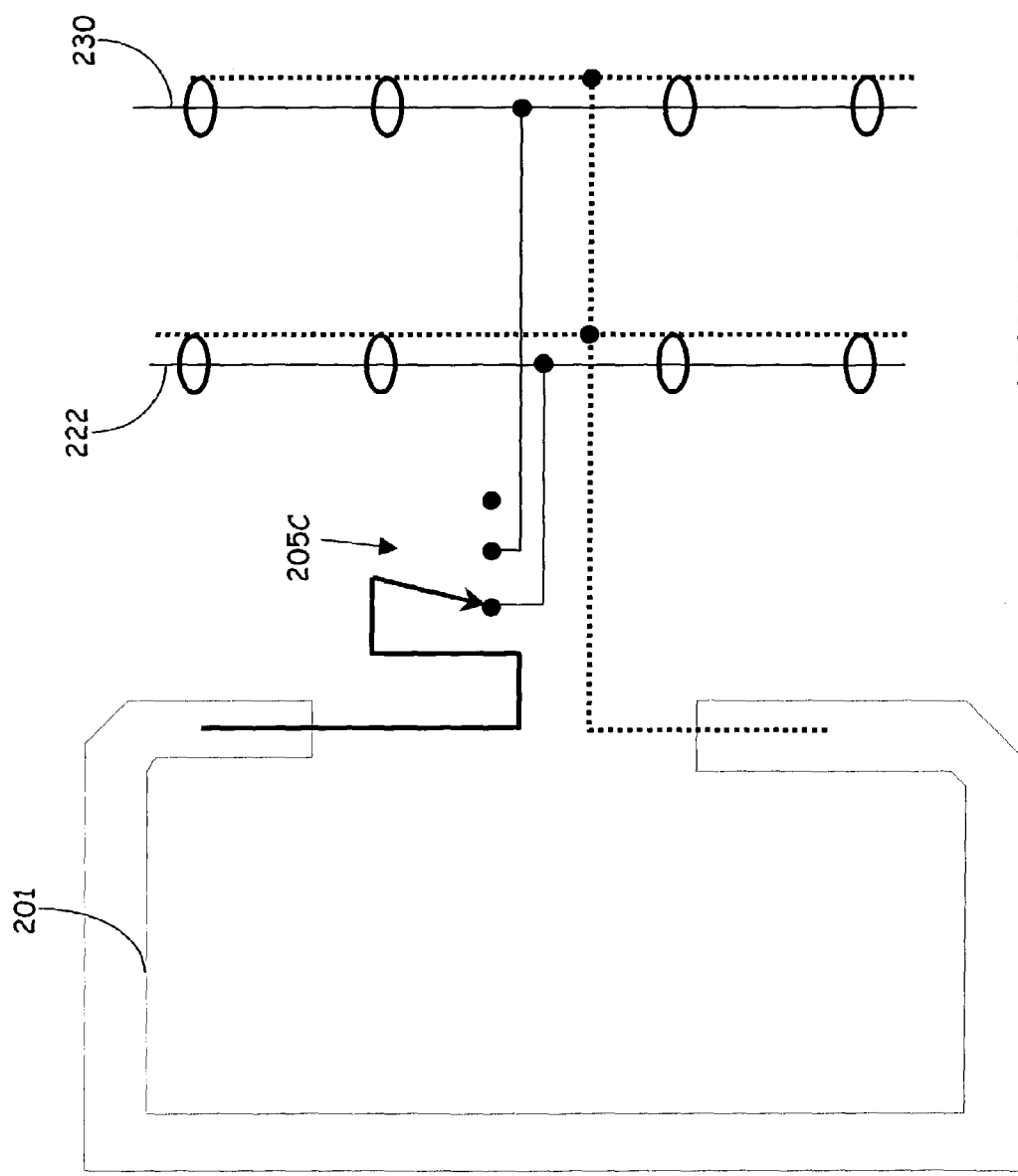
FIG. 9B is a schematic diagram of another exemplary switch that may be used with the embodiment disclosed in FIG. 8.

FIG. 9B is a simplified schematic diagram of an alternative switch 205C that may be used, for example, with the embodiment discussed with respect to FIG. 8. This diagram shows that the common (or ground) wire may not need to be switched, and that a switch may be branched off of the RF cable instead of being directly inline with the cable. When switch 205C is thrown to the left, it connects one pole of antenna loop 201 onto the center conductor of modulated RF signal coaxial cable 222, with the other pole connected to the shield of the same cable, so the modulated RF signal is transmitted to the antenna 201. If switch 205C is thrown to the center, the unmodulated RF signal 230 will be passed through the antenna 201. If switch 205C is thrown to the right, neither RF signal will enter the antenna which will be completely inactive. Note in the case of switch 205C that the RF signals also continue down their respective cables, past the antenna 201, regardless of the switch 205C setting.

Figure 10A:
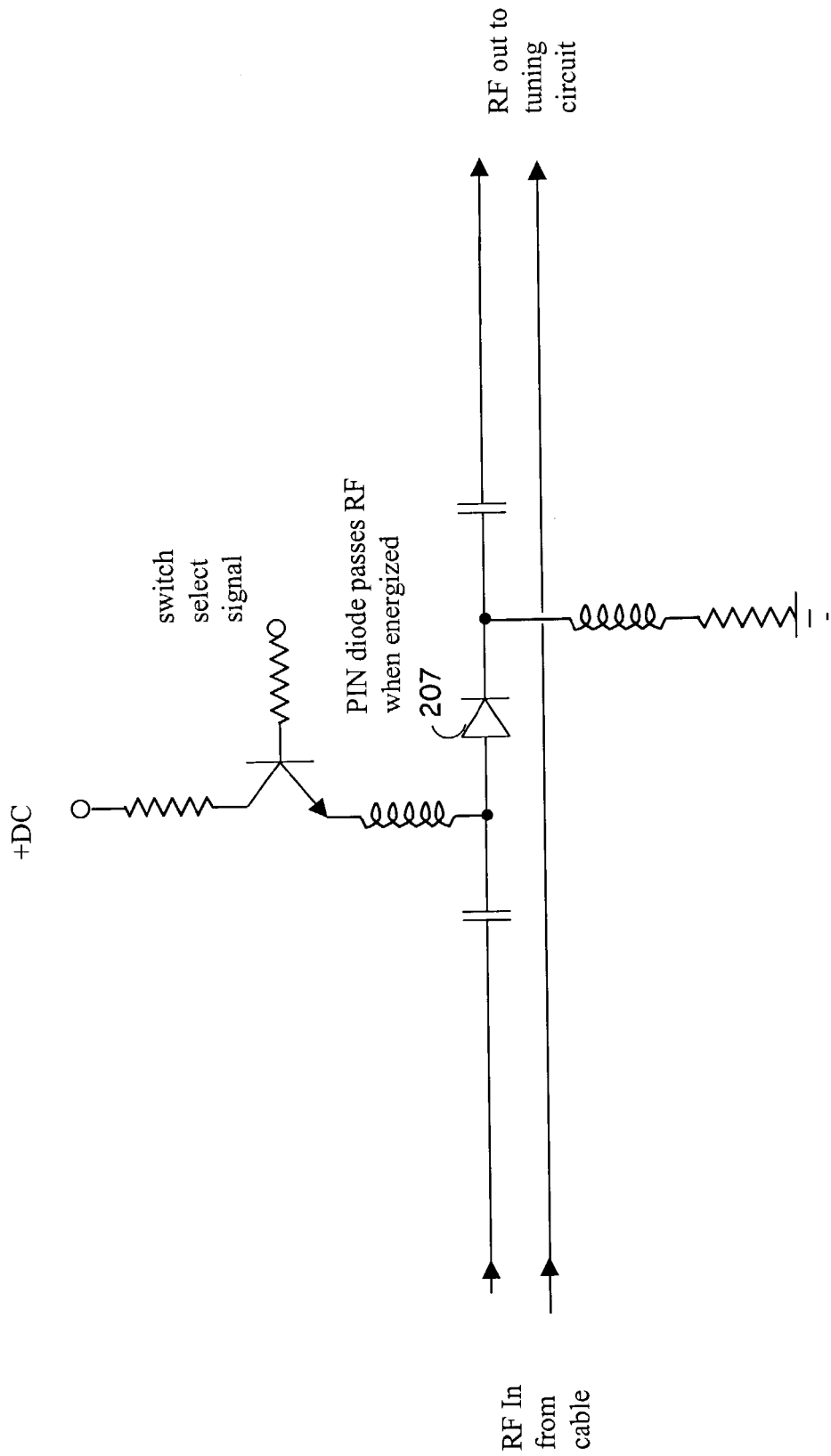
FIG. 10A is a circuit diagram of a switch using a PIN diode that may be used with various embodiments of the present invention.

FIG. 10A shows a circuit diagram for a RF switch that may be used, for example, as switch 204 or 214 discussed earlier herein with respect to various embodiments of the present invention. FIG. 10A is not intended to limit the present invention since those skilled in the art would recognize various modifications, variations, and alternatives thereof. As shown, the RF switch utilizes a PIN (P-type, I-type, N-type) diode 207 (for example, Microsemi part number 900-6228) which acts in a similar way to a regular PN diode except that it is able to block a RF signal when the switch contact is open. When the switch contact is closed, the PIN diode 207 becomes forward biased and conducts the RF signal. The control signal used to select the antenna may also be superimposed (not shown) on the RF signal that is used to read the RFID tags. Such a control signal could be separated from the RF signal by a band pass filter and then go on to an addressable switch, which selectively activates the RF switch utilizing a PIN diode. In FIG. 10A, the control signal is provided on separate wiring instead of using the RF signal cable. While superimposing the control signal on the RF signal cable may require fewer conductors and/or connectors between antennae or between intelligent stations, it requires additional electronic components to separate the signals at each antenna. Thus it may be more efficient to have separate wiring for the control signal.

Figure 10B:
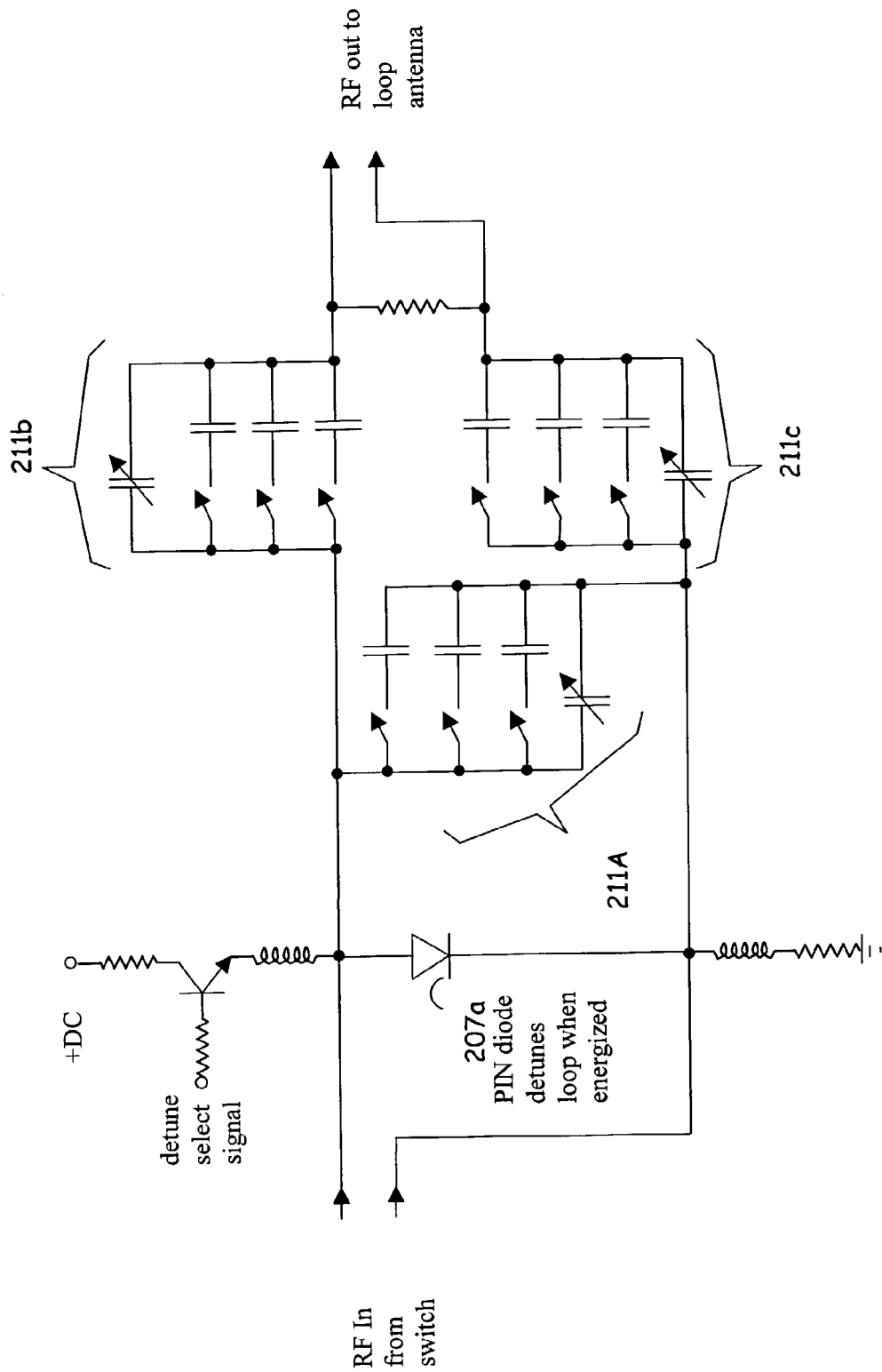
FIG. 10B is a circuit diagram showing how an antenna may be "detuned."

FIG. 10B illustrates a circuit diagram for detuning an antenna so that, if the antenna is not selected for activation, it will not resonate when a nearby antenna is selected. If the antenna is not selected, then the PIN diode 207a shorts out tuning capacitor 211a, and thereby changes the frequency of the antenna so that it will not be active at the frequency used to operate the antenna to read the RFID tags.

Using a PIN diode such as 207a to short out tuning capacitors and detune an antenna means that PIN diode 207a may be run under power for significant lengths of time. This may generate heat and waste power. Therefore the system may be designed to only detune antennae that are immediately adjacent to the antenna currently being read. Which antennae are adjacent may be determined by several methods. For example, this may be specified during design, or found by observation after assembly, or may be determined with the RFID reader during operation as described further herein.

Figure 10C:
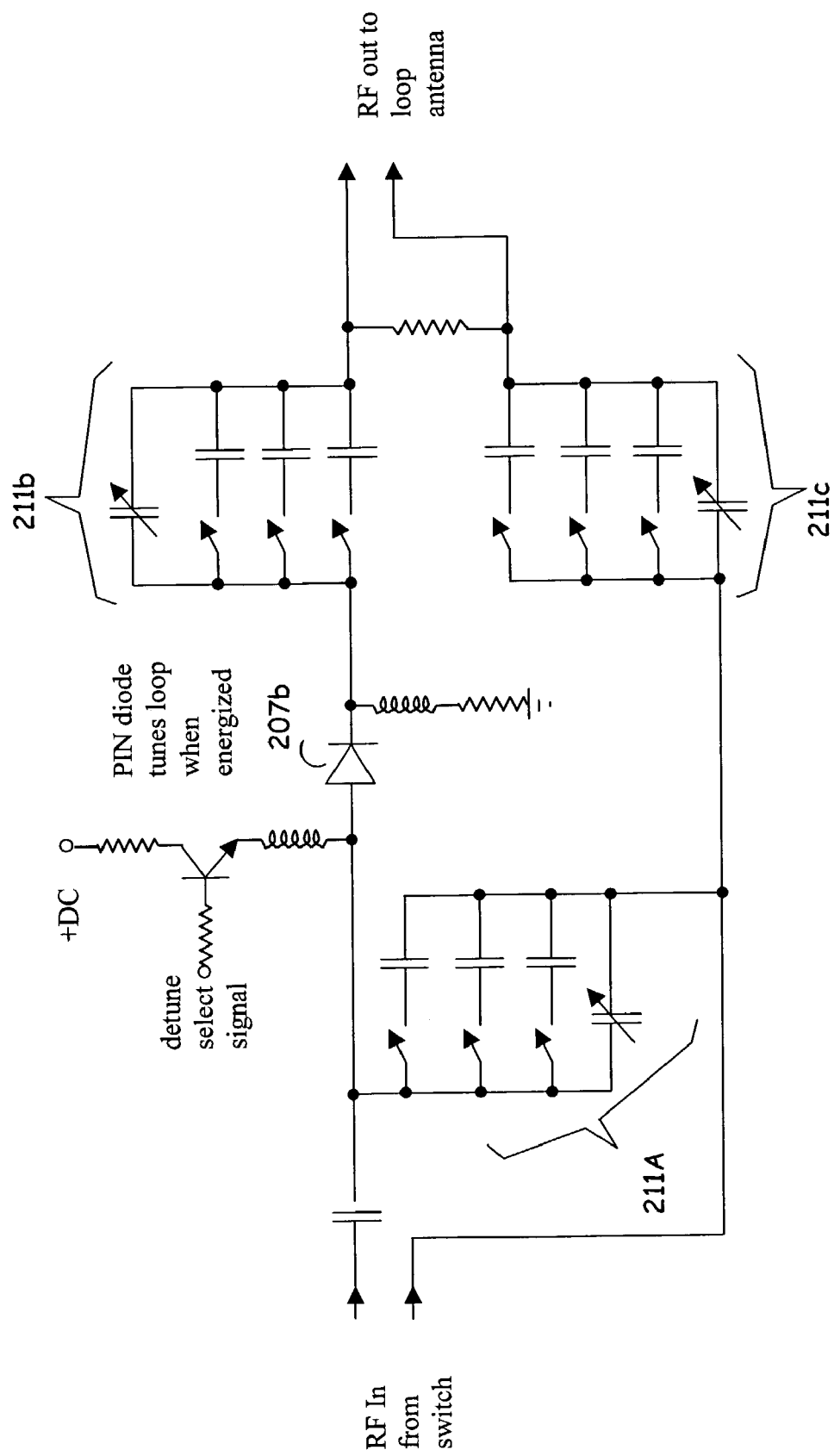
FIG. 10C is a circuit diagram showing another way that an antenna may be "detuned."

FIG. 10C shows another circuit diagram where a PIN diode 207b is used to tune the loop. Here the loop is in tune when PIN diode 207b is energized. Therefore, the PIN diode 207b is not required to remain on while the loop is not being read. This may save power and reduce heat generation.

While the examples here include use of PIN diodes for the switching and detuning functions, other electronic components such as, for example, FET (field effect transistor) or MESFET (metal-semiconductor FET) devices may also be used as would be recognized by those skilled in the art.

Figure 10D:
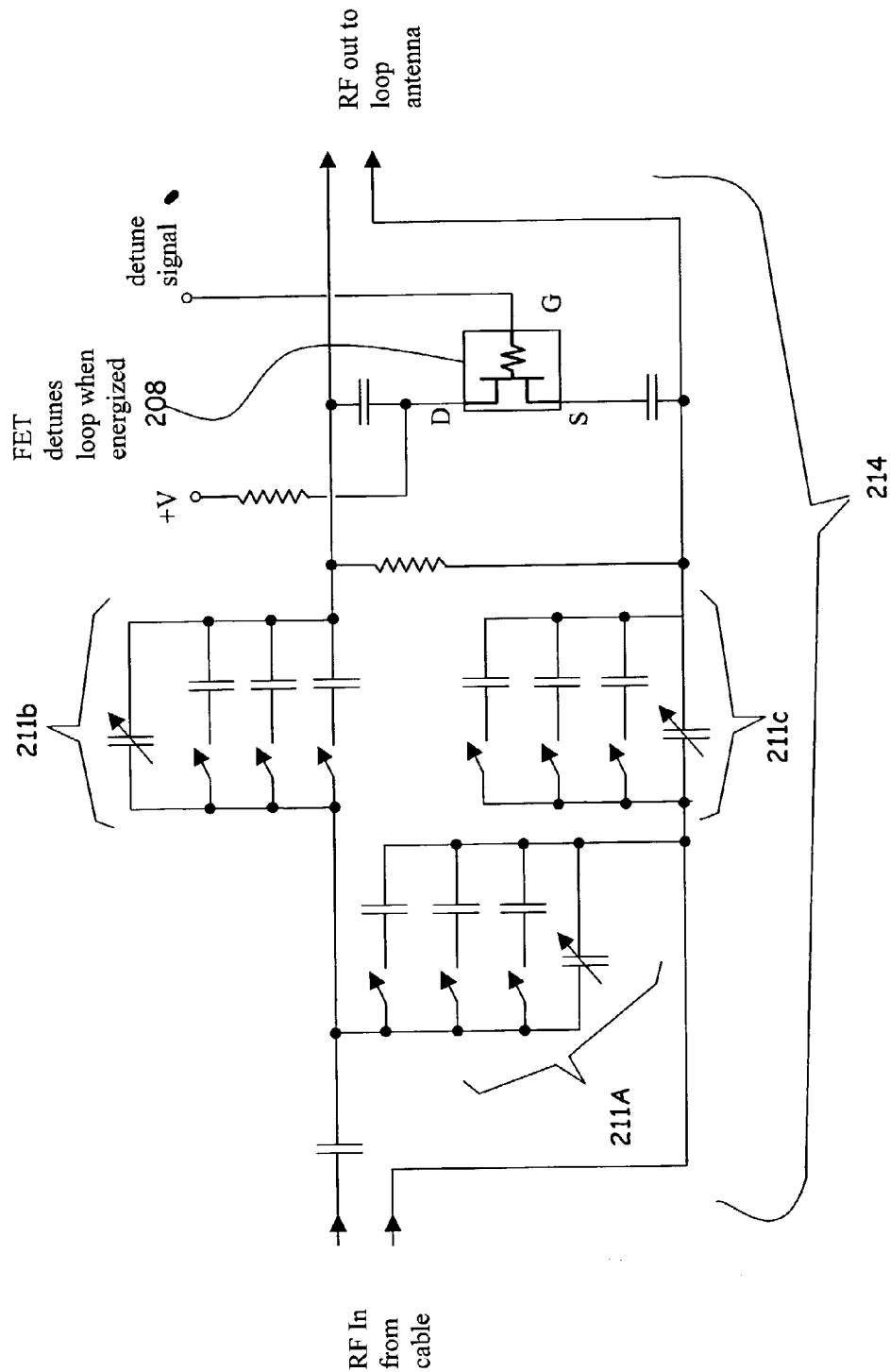
FIG. 10D is a circuit diagram showing yet another way that an antenna may be "detuned."

FIG. 10D shows another circuit diagram where a switch, for example field effect transistor (FET) 208, within the resonant part of the circuit is used to detune the loop. Here the loop is in tune when FET 208 is deenergized, and detuned when FET 208 is energized. In the energized state, the FET 208 draws little power. Furthermore, in this position within the circuit, when the FET 208 is energized it sufficiently detunes the loop antenna so that RF tends not to enter the tuning circuit. Therefore it may not be necessary to provide a separate FET or PIN diode to select the loop.

FIG. 10B illustrates one aspect of the present invention that variable capacitors (for example, variable capacitors 211a–c shown in FIG. 10B) may be used to tune the antenna, that is, to cause it to resonate at the same frequency as the RF signal from a reader unit. As the surroundings of the antenna may influence the tuning, any structure enclosing the tuning circuit is preferably designed to keep the adjustable components accessible from the outside, for example, by locating them at an edge of the structure (such as a shelf edge) or by providing access holes for tuning devices (such as servo-controlled screwdrivers).

Furthermore, since tuning an antenna can be a trial and error process and time-consuming, it is desirable to permit the tuning to be done automatically. According to one aspect of the present invention, this is accomplished by providing an automatic tuning unit (not shown) that would temporarily attach computer-controlled servo-driven screwdrivers to adjustment screws associated with the adjustable capacitors. To achieve optimal tuning, the automatic tuning unit (which may include a computer or other suitably programmed microprocessor) would receive feedback from a conductive connection to the antenna being tuned, or from an RFID reader that would detect which tags were identified from an array of tags in a predetermined or known spatial (preferably two or three-dimensional) arrangement. The tuning unit, based on a set of rules, experimentally developed or developed from experience, would manipulate the adjustment screws to achieve optimal tuning. Alternatively, the controller or secondary controller may adjust the tuning of each antenna by electronic adjustment, for example by remotely setting adjustable voltage-controlled capacitors within the tuning circuit. This method would minimize the need for using mechanical or servo controlled adjustments for tuning. Voltage-controlled capacitors in the tuning circuit could also be used to detune antennae so they would not resonate when they were not selected for reading.

In one embodiment, RFID tags may be placed within the shelf itself, preferably one or more situated within the read range of each individual antenna. These RFID tags provide for each antenna a known response when that antenna is read during a self-test mode. Thus, whether or not the shelf supported any RFID-tagged items, there would always be at least one self-test RFID tag that should be found in range of the antenna. If such RFID tags were not found, the control unit 124 or secondary control unit 125 may institute a self-tuning process. If after self tuning the self-test RFID tags could still not be read, then a message could be sent to the electronic network indicating the need for shelf maintenance. Instead of placing the self-test RFID tags within the shelf, they could also be placed elsewhere in range of the antennae, for example on the rear or side wall of a shelf.

Figure 11A:
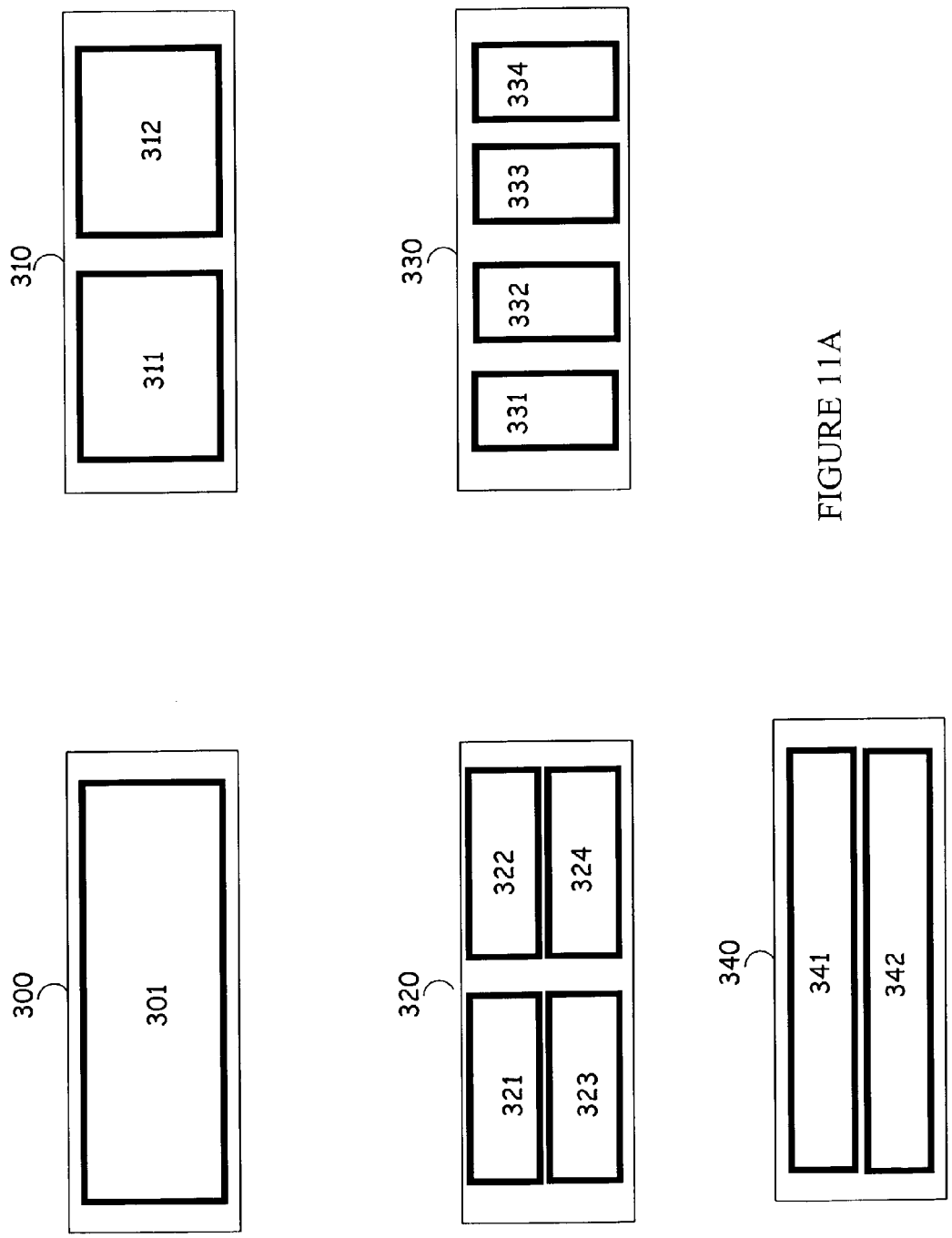
FIG. 11A is a diagram illustrating various layouts of reader antennae on shelves.

FIG. 11A is diagram illustrating alternate antenna loop configurations within a single shelf unit. Shelf 300 contains a single antenna loop 301. Shelf 310 contains antenna loops 311 and 312. With more than one loop within a shelf, there arise multiple operating modes. For example, loop 311 could be active, or loop 312 could be active, or both loops could be active or inactive at the same time. The present invention contemplates that both loops could be active simultaneously with a phase difference in their input RF signal. Such as phase difference can be introduced by various electronic means well known to those skilled in the art. For example, a phase difference can be introduced by using a different length coaxial cable to feed one antenna loop as compared with the other.

As seen in FIG. 11A, shelf 320 contains four antenna loops 321–324. This is shown as an example, since there may be more or less than four antenna loops, and other configurations may be used as would be recognized by those skilled in the art based on the disclosure herein. The four loops 321–324 can be activated in different combinations, for instance loops 321 and 322, 321 and 323, or 321 and 324 can be simultaneously activated. In particular, if a pair of loops is active, with a phase difference between the active loops, the RF field vector may be shifted in order to better read antenna tags that are in different physical orientations. Therefore, use of phased antenna loops may provide better "coverage" for reading tags, when compared to non-phased loops.

Figure 11B:
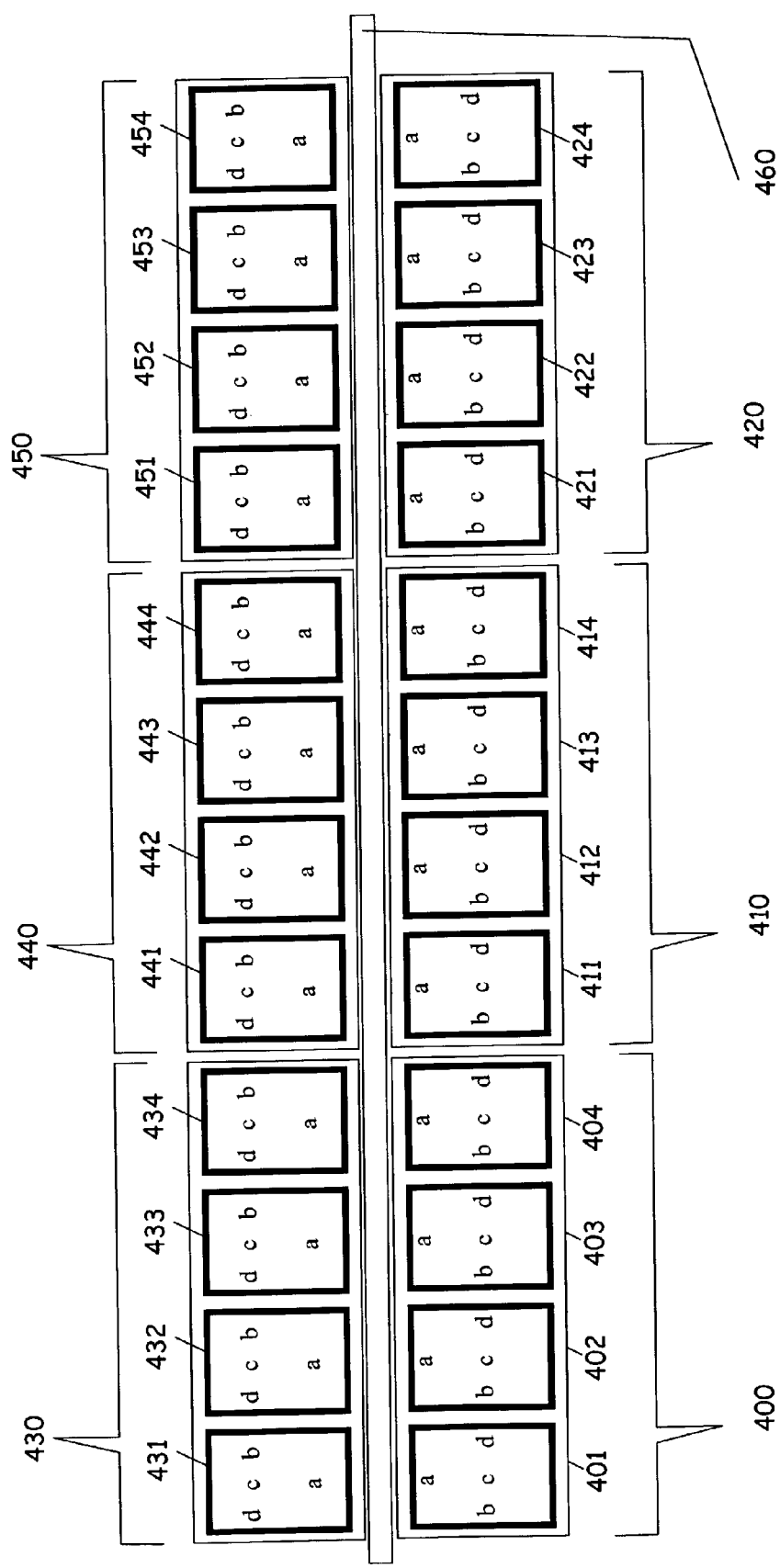
FIG. 11B is a diagram illustrating the use of tags within shelves.

FIG. 11B illustrates a top view of several shelves 400, 410,420,430,440, and 450 supported upon a fixture 460. Each shelf has, by way of example, four antennae. For example shelf 410 contains antennae 411–414. Furthermore within each shelf and proximate to each of the antennae are one or more RFID tags. In FIG. 11B there are four tags per antennae, the tags being designated a–d. Tags within the shelf are useful for a variety of functions. A smaller or greater number of tags may be used as would be recognized by those skilled in the art.

For example, if antenna 411 is turned on at a relatively low power, it should be able to read tag 411c, which is located, for example, approximately in the center of antenna 411. Of course, one of skill in the art would recognize that depending on the antenna and tag design, at low power, tags at locations closer to the antenna conductor may be used since they would be read more readily. Thus tag 411c may be used to test whether antenna 411 is functioning properly. If the power is increased antenna 411 should also be able to read tags 411*a*, *b*, and *d*, which are located near the periphery of antenna 411. By varying the power during a diagnostic or self-check mode, the system should be able to determine how much power is required for antenna 411 to function effectively. Shelf tags may be arranged at several distances from the center of each antenna in order to provide this information.

As the power to antenna 411 is increased, it may eventually be able to read shelf tag 412*b* associated with the adjacent antenna 412. The system may thus determine that antenna 411 and 412 are adjacent. This information may then be used by the system to determine which adjacent antenna may need to be detuned when a given antenna is operating. The fact that antennae 411 and 412 are adjacent could already have been established when shelf 410 was fabricated. However, when several shelves are placed adjacently in a retail store, it may not be possible or convenient to determine in advance which shelves are to be adjacent. The shelf tags may be used to establish which shelves or antennae are adjacent after the system is assembled.

For example, antenna 411 operated at normal power may also detect shelf tag 404*d* associated with adjacent antenna 404 on adjacent shelf 400, whose adjacent position may not have been established prior to shelf placement, and shelf tag 441*a* associated with adjacent antenna 441 on the adjacent shelf 440 on the opposite side of the gondola (or a common support structure for shelves), whose adjacent position may not have been established prior to shelf placement.

It is may be designed that antenna 411 operated at normal power or slightly higher power may be able to read further into adjacent antenna areas, for example reading shelf tags 404*c*, 412*c*, and 441*c*. Thus the functionality described herein may be achieved using only a single shelf tag in the center of each antenna.

Although shelf tags may be useful for the purposes described above, they may slow the system response by increasing the number of tags to be read. It may therefore be a desirable option to use for the shelf tag unique ID serial numbers a specific range of serial numbers that may be directed by the system to a "quiet" mode, that is, not to respond during normal operation, but only to respond during diagnostic or setup operations.

One or more antennae may be contained or hidden within each shelf. The antenna loops may be made using conductive materials. These conductive materials may include metallic conductors such as metal wire or foil. The conductive material may also be strips of mesh or screen. In one embodiment, the antenna loops may be made of copper foil approximately 0.002" thick and 0.5" wide. These loops may be contained within a thin laminate material such as a decorative laminate that is applied to the surface of a supporting shelf material. The loops may also be laminated within glass. The loops may also be adhered to the exterior of a laminated material, glass, or other supporting structure. If additional load bearing support or stiffness is desired, such supporting shelf material may be any material capable of supporting the shelf contents, or providing structural rigidity, as would be recognized by those skilled in the art. Examples of such materials include wood, plastic, rigid plastic foam, glass, fiberglass, or paperboard that is corrugated or otherwise designed to provide stability. An RF-blocking material may be applied to or incorporated into the bottom surface of the shelf, if desired, to prevent detecting RFID tags that may be under instead of the target tags above the shelf. It is to be understood that the intelligent station herein described as a shelf could also be used in a vertical or other angular orientation and the RF blocking material would then be applied in an appropriate orientation to better isolate target tags intended to be read from other adjacent tags.

An RF-blocking material applied to or incorporated into the bottom surface of the shelf, or present in any underlying metal support such as an existing metal shelf, will substantially prevent RF energy from going "below" the shelf. Alternatively, an RF blocking material may also be incorporated within the interior of a shelf. This is an advantage if it is desired that the shelf sense only tagged items on (above) the shelf. However, a consequence of such an RF-blocking material (whether deliberately provided in the shelf construction, or coincidentally present as a pre-existing shelf structure) is that while nearly completely restricting the RF energy below the shelf, the RF-blocking material under the shelf also reduces the "read range" above the shelf. To compensate for this otherwise reduced read range, a layer of compensating material may be provided just below the antenna loops (that is near the top of the shelf structure). Such a material would be non-conductive and have a high magnetic permeability. Examples are Magnum Magnetics RubberSteel™ or a flexible ferrite magnetic sheet having a high in-plane magnetic permeability. Such an in-plane magnetic permeability is achieved by using an isotropic ferrite sheet, not a conventional anisotropic ferrite sheet whose permeability by design is normal to the sheet. The presence of a layer of this compensating material between the antenna and the RF-blocking material, enables higher flux density between the antenna and the RF-blocking material. Consequently the flux density can be higher above the shelf, thus giving better sensing range ("read range") for a given shelf thickness.

The antenna loops, laminated within or attached externally to thin supporting materials, may be disposed in a non-planar form, for example, as curved panels that may be used in certain display cases, beside some clothing racks, or for tunnel readers that may be used at a checkout stand, etc.

The examples herein discuss loop antennas, which are typically used for readers operating at RF frequencies such as 13.56 MHz. It is possible that items within the intelligent station may contain tags operating at other widely different frequencies, such as 915 MHz, 2.45 GHz, or 125 kHz. The intelligent station may be configured to read these or other frequencies, by providing suitable antennae, for example multiple loop antennae for 125 kHz, and dipole antennae for 915 MHz or 2.45 GHz. Antennae within the intelligent station may be provided for one or several of these frequencies. Each antenna would preferably have its own separate switch and tuning circuit. All intelligent stations would share a single common RF cable, and a single common control cable. Intelligent stations may be constructed so that all areas on each intelligent station may read all desired frequencies (that is each area is served by multiple antennae), or different areas on a given intelligent station may be provided with specific antennae for a specific frequency. Intelligent stations operating at different frequencies could all be interconnected. An intelligent station operating at more than one frequency would require a so-call "agile reader" unit that can be configured operate at more than one frequency.

In the preferred embodiments, the antenna loops discussed in present application may be placed, for example, upon shelves so they would be placed underneath products by being incorporated into mats that are placed on shelves. The loops are thus encapsulated in an appropriate rigid or flexible substrate well known to those skilled in the art. Examples of suitable substrate material include a laminated structural material, silicone rubber, urethane rubber, fiberglass, plastic, or other similar material that protect the antenna loops and provide some physical offset to prevent electromagnetic interference in case the antennae are placed on metal shelves, walls, or surfaces.

The encapsulation material or the shelves may be provided with holes or grommets for hanging on vertical surfaces such as the backs of shelves. In an alternate embodiment, the encapsulation material also may be provided with a pressure sensitive adhesive to help attach to a desired surface. The "front" or "shelf" edge of the encapsulation may also be provided with low power light emitting or other display devices that may be turned on by the reader unit or a sequencer unit such as a secondary controller unit within the shelf so that activity of particular display devices may be visually coordinated with the activities of correspondingly positioned reader antennae. Alternatively or in addition, the display devices may also be used to display additional information such as pricing or discounts.

Besides the ability to read RFID tags, the intelligent station may have additional "peripheral" devices that may communicate information through the digital data cable. For example, the intelligent station system would provide a digital data communication highway for add-on or peripheral attachment devices including but not limited to computer terminals, display devices, modems, bar code readers, temperature sensors, locking devices for enclosed or tethered merchandise, etc. The digital data communication highway may be incorporated into the wiring system that sends digital control and data information between controller 124 and secondary controllers 125, or it may be one or more separate digital data communication highways that are made up of wiring that runs through and connects between the stations, with the stations provided with ports through which to connect the add-on or peripheral devices. The digital data communication highway facilitates the transmission of data in both directions between the intelligent stations system (including the controller 124 and secondary controller 125) and the electronic network. Electrical power may also be provided for the add-on or peripheral devices through wires that run through the stations.

It should be understood that, whether or not add-on or peripheral devices are used, electrical power other than RF power may be used by the stations, for example direct current (DC) used by the secondary controller 125, and by the switches and tuning electronics. Such electrical power may be provided by one or more dedicated wires, or it may be incorporated into the digital communication highway or with an RF cable.

As an example, an RF cable may comprise two conductors, for example in a coaxial cable, the center conductor and the sheath conductor. The RF cable carries an RF signal. A DC voltage may be superimposed on the RF signal, in the same RF cable, to provide DC power to intelligent stations. If the DC voltage, for instance 18 volts DC, is higher than needed for some devices in the intelligent station (for instance 5 volts DC), a voltage regulator may be used to decrease the voltage to within usable limits.

As a further example, digital communications may be carried on the same RF cable. For instance, the DC voltage superimposed on the RF cable may be switched between two DC levels (for example 18 volts DC and 12 volts DC) to accomplish non-RF digital communications on the RF cable Therefore, a primary controller may send information to secondary controllers by using such digital communications.

As a further example, a secondary controller may send information to a primary controller in digital form over an RF cable by switching on and off an electrical load to thereby drain current from the RF cable. This in turn may be sensed at the primary controller. The use of voltage level and the use of load level may be done simultaneously to achieve two-way digital non-RF communication through the RF cable.

As another example, in the shelf embodiment, another device that may advantageously be incorporated into the shelf is a plug-in bar code reader that could interface to the secondary control unit 125. When the shelf was being stocked, the bar code reader could be used to scan the packages being placed on the shelf. The bar code data would then be sent back to the electronic network along with the unique RFID tag serial number. If the product identity defined by the bar code was not previously associated with the unique RFID tag serial number, the association would now be completed within the data store. Otherwise the bar code scan could serve as a verification of the data store information. The use of the bar code device would further enable the shelf to provide benefits even during staged introduction of RFID tagged merchandise. By comparing the number of items stocked onto the shelf (as identified by the bar code scanner in conjunction with a simple numeric keypad), against the number of same items sold (as determined by existing scanners at the checkout line) it could be determined approximately how much merchandise remained on the shelf, and whether restocking was necessary. Likewise barcode scanning at the shelf itself could be utilized to provide current pricing information retrieved from the electronic network and displayed through alphanumeric displays at the shelf.

In another embodiment, the shelf or intelligent station may be provided with environmental sensors, to monitor or measure, for example, temperature, humidity, light, or other environmental parameters or factors. Since the system is able to determine what items are on the shelf, the system could keep track of the environment for each item and provide a warning if environmental conditions were out of limits for specific types of items. Separate limits could be defined for each group of items.

One or more proximity sensors, for example, infrared sensors or capacitive sensors, may be located on the shelf to detect the presence of a shopper and determine whether to increase the reading frequency at that shelf in order to give the shopper rapid feedback when an item is moved from the shelf. The means of detecting a shopper would be located at the front edge of the shelf, where they would not be obstructed by merchandise. Infrared or capacitive sensors could sense the presence of a shopper by detecting body heat from the shopper, or a change in local capacitance due to the shopper being in front of the shelf, or the shopper's hand or arm, or merchandise, moving near the front of the shelf. Other means of detecting the presence of a shopper could include visible or infrared light sensors along the front edge of the shelf to detect the shadow of a hand or arm reaching for merchandise on the shelf. The light source in this case could be ambient visible light, or visible or IR light from sources located below the next higher shelf, or from sources overhead or on the ceiling of the store. Store security cameras could also be used to detect the presence of shoppers and to direct the intelligent station to increase reading frequency. Likewise, audible/visual signals or displays or can be activated when a shopper is sensed and for some time thereafter rather than being activated at all times in order to conserve power and component life. Likewise information regarding the proximity of a shopper to the shelf could be relayed back to the electronic network to help analyze shopper traffic patterns, or length of time spent at a particular shelf. The shopper location data could also be fed to store security systems for use in conjunction with scanning patterns of store surveillance cameras.

Likewise the shelf data relayed back to the electronic network can be used to determine if an unusually large number of items are suddenly removed from the shelf. If this occurs, a security camera can be directed at the shelf to take a picture of the shopper who removed the items. If the items are not paid for when the shopper leaves the store, appropriate action can be taken to stop the theft.

Another device that may be incorporated into the shelf is a Hall effect or other similar proximity type sensor to detect movement of tags or presence of a shopper. This information may be used similarly to that described in the preceding description regarding an infrared sensor.

Another use of the shelf would be to detect the presence of "customer tags" associated with shoppers, that could be used to help shoppers find predetermined merchandise items, such as the correct size of clothing items, whereby visual or audible indicators on the shelf could be activated to direct the shopper toward the desired items. Also the "customer tag" when placed on a shelf where a desired item was out of stock, could be used to give the customer a "rain check" and or discount on the item when it came back into stock, or information about the item being in the stock room, at another store, or on order. This could be useful to track when a shopper did not purchase an item because it was out of stock.

Another use of the shelf would be to provide "feedforward" information to predict when more cashiers would be required at the checkout lanes, or when more stockers were required. This could, for example, be done by monitoring the amount of merchandise being removed from shelves, and thereby deducing the volume of merchandise that would be arriving at the checkout lanes. The storekeeper or store manager thereby could schedule the checkout or restocking personnel to optimize how their time is spent, help schedule break time, etc.

Another use of the shelf could be to detect the presence of a "stocking tag" or "employee tag," or a pushbutton or keyed input sequence, to alert the system that the shelf is stocked completely and the database is made aware that the current stock level is the full or target level. This method could be used when item stocking patterns were changed, to update the target level.

The shelf system could be used to suggest, for all shelves covered by the system, based on the price, traffic, and shelf space, the most optimal stocking pattern, which may involve changing the target inventory for all items. Calculating such a stocking pattern would require knowledge of how many of each SKU item would fit on a given shelf area, and how much shelf area was covered by each shelf antenna.

In one aspect of the present invention, it would be advantageous for the shelf system to know the physical location of each shelf, which may not necessarily be obvious even from unique Ethernet or RS-485 addresses or other networking addresses. Therefore, the present invention contemplates incorporating a GPS transducer into each shelf. A more practical solution may be to, instead, provide a portable GPS unit that could be plugged into a USB port (or other similar compatible port) on each shelf, when the shelf was assembled, to identify its location. For example, a GPS unit could be combined with the servomechanical tuning unit used to set up the shelf after its installation.

Alternately, a GPS unit with a programmable RFID tag could be placed upon a shelf and communicate back to the main controller, through the RFID system, what the coordinates of the shelf are. One way of accomplishing this would to use a GPS system connected to a specialized RFID tag having additional storage blocks for information besides its unique serial number. Such a tag would use an integrated circuit with connections to its tag antenna also to communication circuitry to receive data from an outside source, such as the GPS system. The GPS system could be configured to write the spatial coordinates in the additional storage blocks. A known serial number or numbers could be used in the specialized RFID tag, and the RFID system, upon detecting such a specialized RFID tag could interrogate the tag to determine the stored spatial coordinates and associate then with the shelf and antenna that was being read.

The antenna shape need not be confined to single-loop antennae. A single loop antenna is a form factor that may typically be used with high RFID frequencies such as 13.56 MHz. A multi-loop antenna 1215 may be used at a lower frequency such as 125 kHz, or to permit lower current operation at high frequencies such as 13.56 MHz. The use of lower current antennae may permit using lower power switching components. Forming multi-loop antenna may require antenna components such as the wire in the loops to be in close proximity to one another, and therefore the wire may preferably be insulated.

Tuning components associated with the RFID antennae, for example, rotary trim capacitors or capacitor banks, may require access during use. Suitable access may be provided, for example in a shelf embodiment, by providing removable cover devices, or holes in the shelf For attaching conductive antenna materials onto supporting laminate or other structures, a variety of methods may be utilized. For example, a metal foil may be laid down onto a substrate in web form (such as a web of paperboard) or planar form (such as a sheet of paperboard, sheet of laminate, wood or plastic board, etc.) by an automated machine using two or three dimension positioning mechanisms to feed the foil from a reel onto the substrate in the desired antenna pattern.

If the supporting material is wood, a milling machine may be used to form grooves into which conductive wire may be secured in order to form antenna loops. The same method may be used if the supporting material is plastic, or, a heated pattern may be pressed into the plastic to form grooves in which conductive wire may be secured. A plastic substrate may be molded with grooves to hold wire conductors, or the plastic substrate may be molded with a repeating rectilinear pattern of perpendicular grooves that permit forming antenna loops in a large number of patterns. In any of these methods, holes may be drilled, punched, or molded for securing the ends of the antenna wires. These holes may extend through the substrate to become accessible fork connection or insertion into tuning circuits used to tune the antenna loops.

Another method of forming antenna loops is to wrap the conductive wire around a series of pins similar to a loom, then invert the loom and press the conductors onto a substrate. The substrate may be precoated with adhesive to hold the conductors when the loom is removed. Alternately the substrate may be soft enough to allow the conductors to be pressed into the surface of the substrate. Alternately the substrate may be a thermoplastic and the conductors may be preheated so that they partly melt the substrate on contact and become embedded in it's the surface of the substrate. The pins used on the loom to form the antenna loops may optionally be spring-loaded so that when the loom is pressing the conductors onto the substrate, the pins may optionally retract into the loom.

In more detail, FIG. 12 shows one method of making a wire antenna. FIG. 12 is not intended to limit the present invention since one skilled in the art would recognize various modifications, alternatives, and variations. A substrate 1100 is provided, such as a wood, plastic, rubber, high density foam, or similar material. Grooves 1110 are provided in the substrate, typically in a grid pattern. These grooves may be made by machining, molding such as by hot or cold-pressing or injecting molding, casting, hot branding (for example with wood), etc. Pressing methods may use platen (stamping) or rotary devices. Preferably holes 1130 are provided at intersection points in the grooves, by the same methods or by drilling or punching. A large part of the area on substrate 1100 is still occupied by the areas 1120 between grooves. Thus the substrate 1100 still has an essentially planar upper surface, so that loads may be borne by the surface and a covering, film, laminate, or veneer may be applied to provide a planar finished surface. The areas 1120 are also known to be unoccupied by antenna wires, and these areas may be provided by casting, drilling, punching, etc. with holes to accommodate screws or bolts to attach to other structures. The holes may also be used for attachments such as pegboard or display hooks, or through holes for wiring, ventilation, sound from loudspeakers, placement of small lights, etc.

Antenna loop 1200 is shown that has been formed by placing or pressing wire of a suitable diameter into some of the grooves 1110. The ends 1201 of the antenna loop are held in place by securing them into holes 1130. The holes can be entirely through substrate 1100, so that they may be connected to circuitry on the other side of the substrate. Likewise antenna loop 1210 is shown being formed, with wire end 1211 already secured in one hole and wire end 1212 shown ready to be secured into another hole.

Besides simply pressing bare wire through the holes to secure the ends, the wire may be precut to the needed length, and the ends fitted with grommets 1140, buttons, or other mechanical devices that fit into holes 1130. These grommets may be soldered onto the wire for better conductivity. As an alternative to inserting them into holes 1130, the grommets may be slightly larger diameter than the width of the grooves 1110, so that the grommets will only fit at points where two grooves intersect, as shown in FIG. 12A. Alternately during forming of the groove pattern, the intersection points may be made larger than the groove widths as shown in FIG. 12B, to hold a larger grommet 1141. The grommets may be bar shaped (1142) or tee shaped (1143) to fit in the intersection points as shown in FIG. 12C. They may also be cross-shaped. They may be fitted with pins to protrude down into or through substrate 1100, or to extend upward out of substrate 1100. The pins may fit into sockets on, or holes in, the circuit boards. The grommets (e.g. 1140 or 1141) may be hollow to accept other wiring or pins. They may incorporate externally threaded pins or internally threaded holes. The grommets likewise may incorporate internal or external barbs or spring-loaded parts to hold them in place or to assist in connecting to external circuitry. The antenna wires attached to the grommets may also be secured by barbs.

The substrate 1100 may be provided with recesses (not shown) in which to position circuitry (not shown), and such circuitry installed before or after the wires, and the wires attached to the circuitry by soldering or use of grommets, barbs, etc.

Instead of the grooves 1110 forming a regular grid or criss-cross pattern, which allows for multiple antenna patterns to be created, the grooves can instead be provided in "custom" form to comprise only the grooves desired for the actual antennae to be produced. FIG. 13 shows such an embodiment. The grooves, for example 1220 and 1230, can be formed by the same methods described above, as can the holes 1221 and 1231.

Since the grooves and holes hold the wire securely, the wire may be easily inserted by hand into the substrate, or the process may be mechanized. After all desired antennae have been formed in the substrate, any open grooves may be filled with plastic or any other suitable material. A covering laminate, film, or other layer may then be applied on top of the substrate. This covering may be an injection-molded layer of material, or melt-cast layer, or liquid cast layer that cures by chemical reaction or heat (such as an epoxy material or silicone compound), or evaporation (such as a latex material).

The combined substrate and covering then comprise an antenna mat. Depending on the materials, the antenna mat may be flexible or rigid. The antenna mat may also be attached to a planar or non-planar supporting material such as a wood, plastic, fiberglass, etc. board.

The antenna shape need not be confined to single-loop antennae. FIG. 13A shows single loop antennae 1200 and 1210, a form factor that might typically be used with mid range RFID frequencies such as 13.56 MHz. Also shown is a multi-loop antenna 1215 that might typically be used with a lower frequency such as 125 kHz. Forming multi-loop antenna 1215 may require the wire loops to be in close proximity to one another, and therefore the wire may preferably be insulated. It may be desired to have a wire crossover 1216 as shown, or no crossover as denoted by dotted line 1217. The distance between grooves may have to be narrower for multi-loop antennae. Also shown is the shape of a dipole antenna 1218 that might typically be used with higher frequencies such as 915 MHz or 2.45 GHz. The ends 1219 shown for the dipole antenna are bent to denote a method for holding these otherwise loose ends by inserting the ends into holes in the substrate during fabrication.

Figure 14:
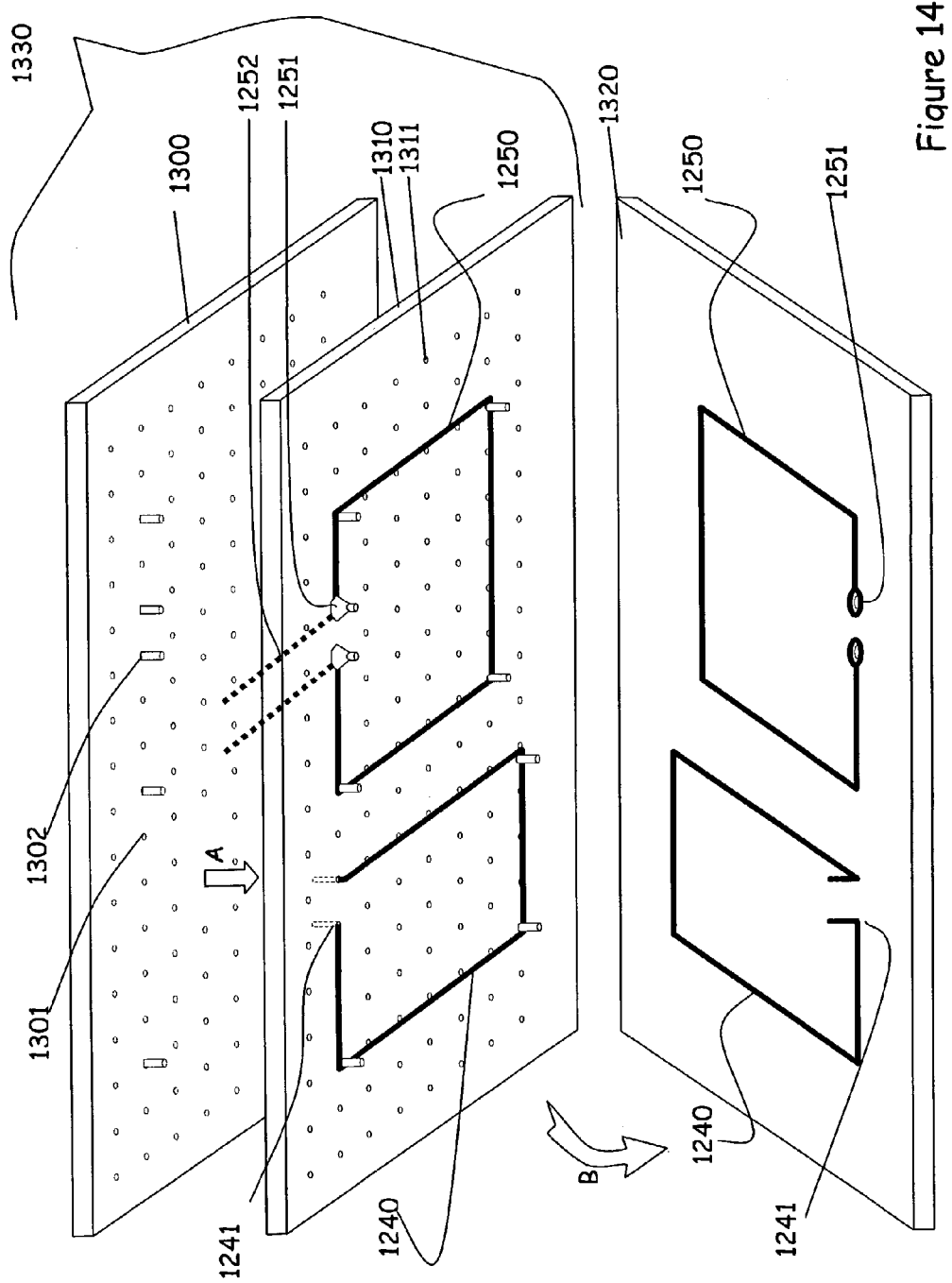
FIG. 14 illustrates another method of making a wire antenna.

In the embodiment of FIGS. 12 and 13, the grooves are created before the antenna wires are set in place. A different embodiment is shown in FIG. 14. An upper plate 1300 is provided which has a pattern of holes 1301 for holding pins 1302. The pins may be threaded and the holes tapped so that the pins may be secured by screwing them into the holes. Thus the number and placement of the pins may be varied.

A lower plate 1310 is provided with matching holes 1311. When the plates 1300 and 1310 are brought together as shown at arrow "A", pins 1302 protrude through holes 1311. Pins 1302 may then be used to define the corners of wire antennae that are wound around the pins under the lower plate 1310. For example antenna 1240 is formed using pins to hold the wire at three corners. At the fourth corner, the two wire ends 1241 are inserted up through open holes 1311 in the lower plate 1310. Another example antenna 1250 is formed using pins at all four corners. Grommets 1251 attached to the ends of the wire loop are held over two additional pins. Instead of securing the wire ends within the plate area, they may also extend beyond the plate as shown by the dotted lines at 1252. In this case the wire ends would be secured by other means (not shown).

The combined assembly 1330 of upper plate 1300 and lower plate 1310 with attached pins, wires, grommets, etc. is then inverted over substrate 1320 as shown by arrow "B".

The antennae 1240 and 1250 are transferred onto the substrate 1320 by one or more of the following or similar methods.

a) An adhesive coating or film is applied to the substrate 1320. The combined assembly 1330 is lowered onto the substrate 1320, and lower plate 1310 is pressed against the substrate. The antennae 1240 and 1250 adhere to the adhesive. If upper plate 1300 is lifted slightly during the pressing step, the pins 1302 will not penetrate the substrate 1320. If upper plate 1300 is also kept under downward pressure, the pins 1302 will make holes in the substrate 1320. Any grommets 1251 will be pressed into the substrate. After the adhesive set, the combined assembly 1330 is lifted, leaving the antenna pattern attached to substrate 1320.

b) Method (a) may be used, with sufficient pressure to force the antenna wires partly or completely below the surface of the substrate 1320. This method could be used, for example, with a high density foam substrate 1320 which requires minimal force to press the wires below the surface.

c) Method (b) may be used, with the wires 1240 and 1250 and grommets 1251 heated to a temperature above the softening point of substrate 1320, so that on contact and pressure, the substrate is softened or melted slightly to accept the wires and grommets. One method of heating the wires is to pass an electric current through them before or during pressing against the substrate. The upper plate 1300 may be released during the pressing step so that the pins 1302 retract and do not penetrate into substrate 1320.

d) The substrate instead of being a solid material 1320 may at this point be cast onto the wires by liquid casting of chemical, thermal, evaporative or otherwise setting material, or by injection molding, of a material to the lower surface of lower plate 1310.

Lower plate 1310 and pins 1302 may be precoated with a release agent to prevent sticking. Such a release agent would be applied before the wires are attached, so that release agent is not applied to the wires. Also, lower plate 1310 may be a non-stick material, for example Teflon or coated with Teflon or a similar non-stick material. If an injection molding is used, lower plate 1310 may be cooled by internal passageways to speed up cooling of the injection-molded material.

After these steps, the antennae 1240 and 1250 may be attached to circuitry using wire ends 1241 or 1252, or grommets 1251.

In all embodiments, it is understood that the wires may be bare (except at crossovers) or insulated. The cross section of the wires may be a solid cylinder as is typically the case with wire, but it may also be square, rectangular, oval, U shaped or channel shaped, vee-shaped, etc. The main requirement of the wire is that regardless of shape it must be conductive and must have a shape and cross-sectional stiffness that promotes its being held in the grooves. The wire may be single conductor (typically known as "solid" conductor), or multistrand. It may be twisted or woven. It may be coaxial cable, in which case the external braid would be used as the active conductor for the RF signal.

Figure 15:
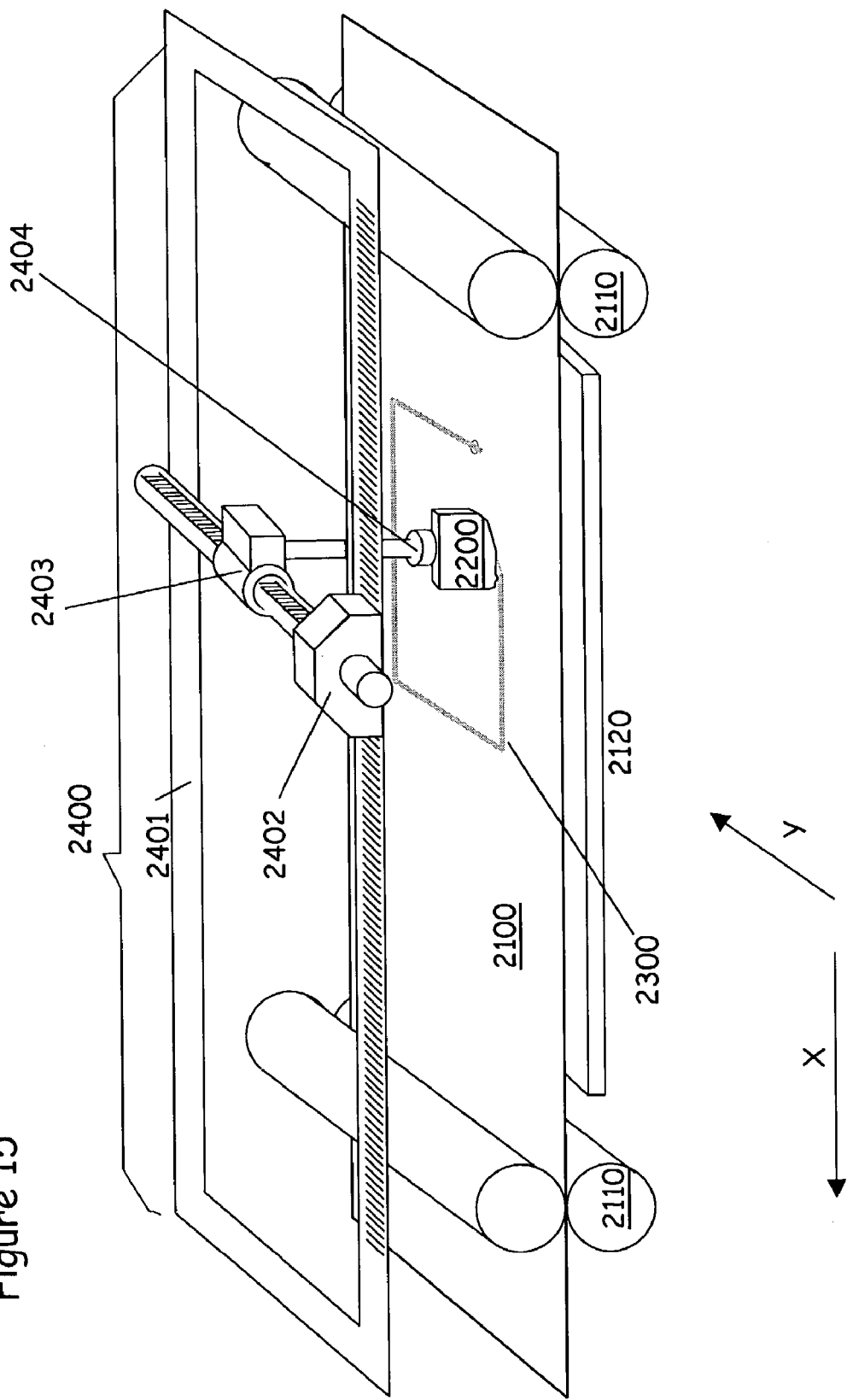
FIG. 15 is a diagram that illustrates a device and method of applying foil tape ribbons to a web or planar substrate to form a foil antenna.

FIG. 15 is a diagram that illustrates a device and method of applying foil tape ribbons to a web or planar substrate to form foil antennas according to the present invention. Such foil antennae have several uses, for example, they may be used as transceivers or readers for communicating with RFID tags in RFID systems that may be used for inventory control. FIG. 15 is not intended to limit the present invention since one skilled in the art would recognize various modifications, alternatives, and variations. A substrate 2100 is provided. This may be in web form, as shown, in which case traction rollers 2110 or other means may be provided to move the web. In the example shown in FIG. 15, such movement would be discontinuous. The web 2100 would be indexed forward a distance, then stopped while one or more conductive pathways were deposited onto substrate 2100. Once the conductive pathways had been deposited on substrate 2100, the web would be indexed forward again and the cycle repeated.

A support plate 2120 is provided under the substrate. This support plate 2120 may incorporate a vacuum hold-down system (not shown) to temporarily fix the substrate 2100 to the support plate 2120. The support plate 2120 itself may also be movable in the X and Y directions to assist in the process of depositing conductive pathways.

An applicator means 2200 is provided for depositing the conductive pathways 2300. This applicator 2200 will be described in more detail later. An x-y stage 2400 is provided for moving applicator 2200. The x-y stage may include a frame 2401, a positioning means 2402 that moves in the principal substrate axis ("x" or "machine" direction), and a second positioning means 2403 that moves in a perpendicular axis ("y" or "cross" direction.) A rotational positioning means 2404 may be provided to turn the applicator 2200 in any angle relative to substrate 2100, to facilitate the operation of applicator 2200. It is anticipated that the substrate 2100 movement and the applicator 2200 movement will be automated by computer means that control motors driving traction rollers 2110, and positioning means 2402, 2403, and 2404, in addition to more controls within applicator 2200.

In FIG. 15 the x and y positioning means 2402 and 2403 are shown as rack and pinion gearing, but could include other means such as cables, linear motors, stepping motors, or other means that can achieve fairly repeatable positioning.

Figure 16:
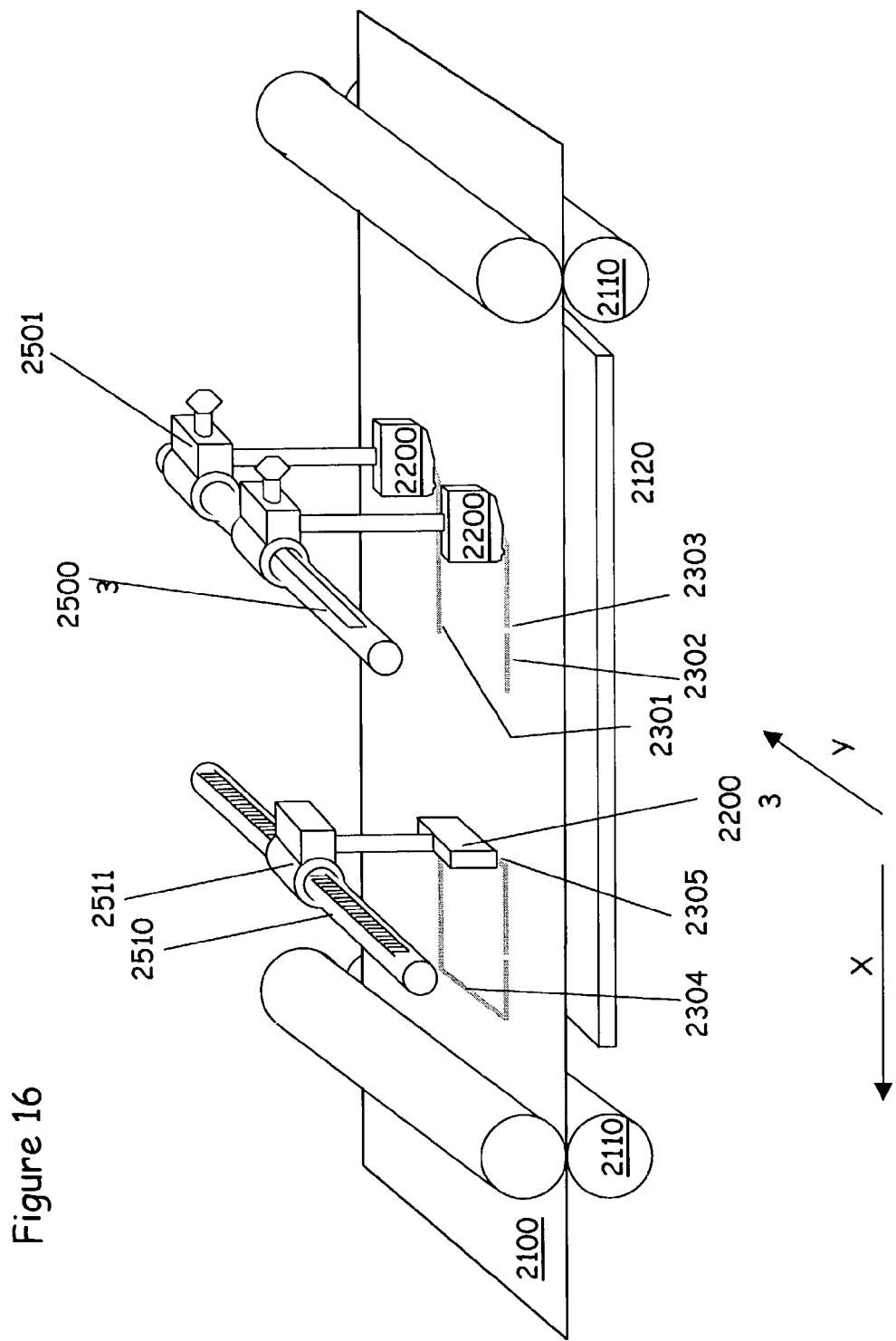
FIG. 16 is a diagram illustrating another method of depositing conductive pathways on a substrate to form a foil antenna.

FIG. 16 shows another method of depositing conductive pathways on a substrate to a form foil antenna. Support member 2500 extends across the substrate and holds two or more stationary positioning means 2501 that in turn support applicators 2200. The stationary positioning means 2501 can be moved by hand across the support member 2500, then fixed in place for example with a thumbscrew. Enough stationary positioning means 2501 with applicators 2200 are provided to lay down along the machine direction (x) as many lengthwise conductive pathways 2301, 2302 as needed. In the example shown, lengthwise conductive pathway 2302 is provided with a skipped area 2303 that will be used for connection to external circuitry.

Support member 2510 extends across the substrate and holds a traversing means 2511 that in turns supports another applicator 2200. Traversing means 2511 can move on demand across the substrate in the cross direction (y) to deposit crossways conductive pathways 2304 and 2305 that connect the lengthwise conductive pathways 2301, 2302.

Operation according to FIG. 16 is therefore as follows: The substrate 2100 is moved forward by traction rollers 2110 (or by movement of support plate 2120). Meanwhile the applicators 2200 attached to stationary positioning means 2501 deposit on demand lengthwise conductive pathways 2301, 2302 that may contain skipped areas 2303.

At the appropriate times, the substrate 2100 movement is paused so that the applicator 2200 attached to traversing means 2511 can deposit crosswise conductive pathways 2304, 2305. The pause in the X direction movement of substrate 2100 may occur in the middle of the process of depositing one or more of the lengthwise conductive pathways 2301, 2302. Alternately, for depositing the crosswise conductive pathways 2304, 2305, applicator 2200 may be fixed in position and the Y direction movement provided by movement of support plate 2120.

The decision of whether to move substrate 2100 in web form or in sheet form will depend on several factors. The substrate may be available in roll form advantageous to web handling, or in cut form advantageous to sheet handling. Some substrates may not be flexible enough for handling in web form, for example thick sheet substrates or substrates that have been partly or completely laminated and are no longer flexible.

The decision of which applicator system to use will also be made based on several factors. The single head applicator design of FIG. 15 minimizes the number of applicators, but slightly complicates the applicator positioning. It may be slightly slower than a multiple applicator design. However, it is quite flexible in terms of making customized products, since every conductive pathway may be customized. The multiple applicator system of FIG. 16 simplifies the positioning of the applicators, and may improve speed for long production runs of single designs.

Instead of moving the applicators as in FIGS. 15 and 16, the substrate itself could be moved in the x-y plane to help create the conductive pathways. This would typically require more floor space than when moving the applicators, and it would be complex if the substrate was in roll form.

Figure 17:
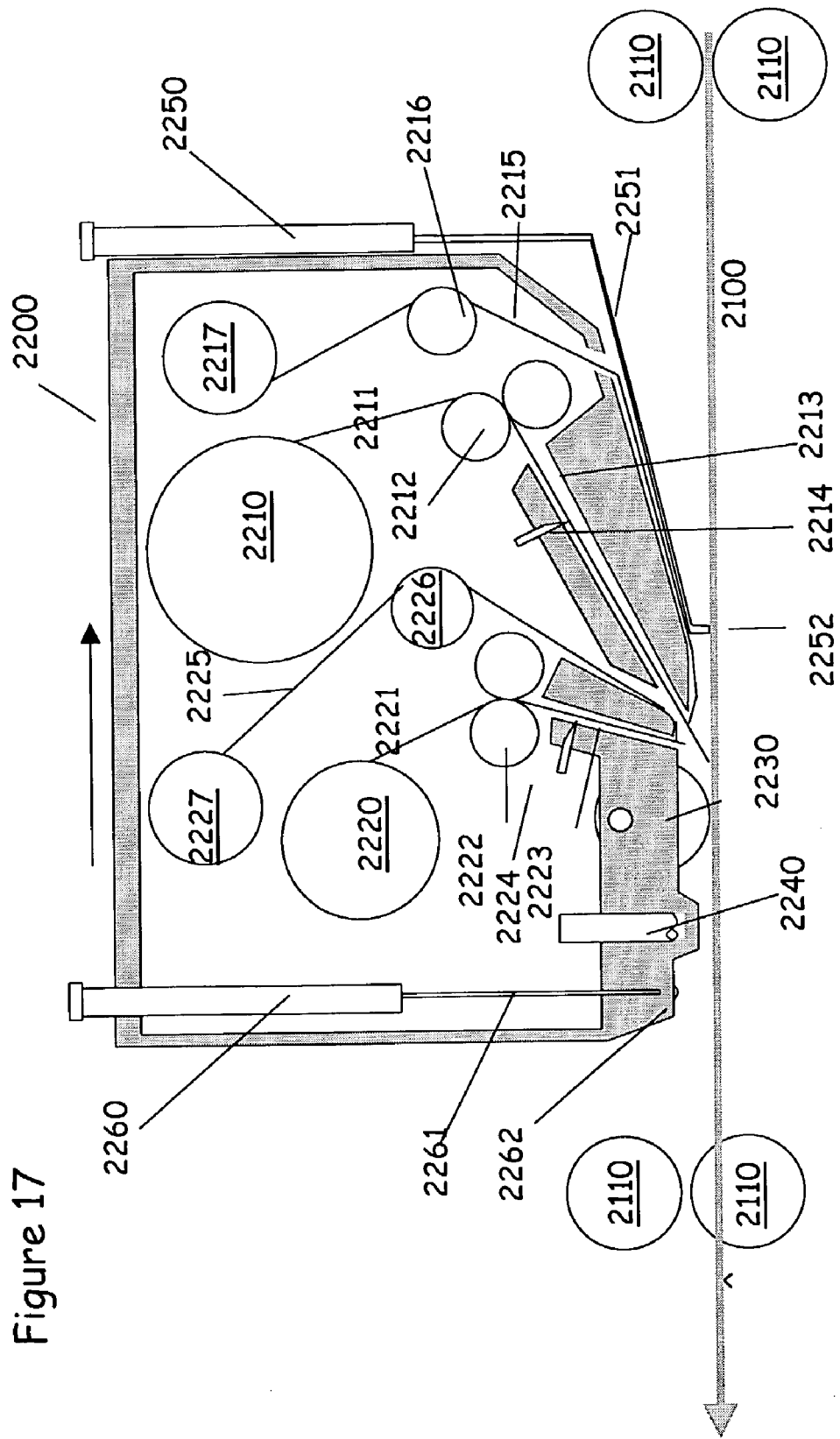
FIG. 17 is a diagram illustrating a cross section of an applicator 2200 for depositing conductive pathways.

FIG. 17 shows a cross section of an applicator 2200 for depositing conductive pathways. FIG. 17 is not intended to limit the invention since one skilled in the art would recognize various modifications, alternatives, and variations. As shown in the embodiment of FIG. 17, the applicator 2200 would move to the right relative to substrate 2100. A supply roll 2210 provides a continuous conductive strip 2211 through a pair of feed rolls 2212 that are computer controlled to provide the continuous strip 2211 only when demanded. The strip 2211 goes into a chute 2213 and past a cutter 2214 that is computer controlled and may be turned at any angle to provide angled cuts if desired. The strip 2211 continues forward and out of the applicator 2200, at which point an optional release liner 2215 can be removed and wound around roller 2216 to be taken up onto tension winding roll 2217.

A second, optional supply roll 2220 provides a continuous insulating strip 2221 through a pair of feed rolls 2222 that are computer controlled to provide the insulating strip 2221 only when demanded. The strip 2221 goes into a chute 2223 and past a cutter 2224 that is computer controlled. The strip 2221 continues forward and out of the applicator 2200, at which point an optional release liner 2225 can be removed and wound around roller 2226 to be taken up onto tension winding roll 2227.

A pressure device 2230 is provided to push the strips 2211 and /or 2221 onto the substrate 2100. The pressure device may be a wheel or roll as shown, or a sliding member, or a reciprocating clamping means. The pressure device 2230 may be heated to help set an adhesive integral to strips 2211 or 2221, or provided externally as described later. The pressure device 2230 may be patterned or knurled, for example to help press the strips 2211 or 2221 onto the substrate 2100, or even to slightly crimp the strips 2211 or 2221 into the material of the substrate 2100. This might remove the need for adhesive, at least in sheet-fed operations. It is also envisioned that strip 2211 may be perforated with holes to improve the adhesion of resin between layers of substrate in the final laminate, even in the areas where the strip 2211 exists.

A hole punch 2240 is provided to perforate the substrate 2100 on demand to create openings through which electrical connections may be made to the conductive strip 2211. Preferably the hole punch 2240 is provided with an internal vacuum connection to remove the waste substrate material created during a hole punching operation.

An adhesive dispenser 2250 is provided to dispense glue 2252 through needle 2251, in order to hold strip 2211 or 2221 to the substrate. Preferably the adhesive is a rapid set material such as a hot melt glue, heat set glue, or epoxy. This adhesive is deposited on demand under computer control to be present under the strip 2211 or 2221, but not deposited if no strip is deposited in a given area. Any adhesive that may be used should not degas when pressed at high temperature, otherwise the integrity of the laminate may be compromised.

The conductive strip 2211 or insulating strip 2221 may also be provided with their own adhesive layers to attach it to the substrate 2100.

The adhesive used to attach the strips 2211 and 2221 to substrate 2100 would typically be non-conductive, since conductive adhesives are more expensive. However, it will be necessary in some places to electrically join parts of the conductive pathway 2300, and for this a conductive adhesive or material would be required. For simplicity it might be decided to use conductive strip 2211 with an integral conductive adhesive, but this would be expensive. Another solution is to provide within the applicator 2200 a reservoir 2260 of conductive adhesive to be applied through needle 2261 in droplet form 2262. A drop 2262 of the conductive adhesive could be applied on top of a previous segment of conductive trace 2300, just before starting the next segment on top of the previous segment. The action of pressing means 2230, with heat and pressure, would then electrically join the two segments. The conductive adhesive drop 2262 could be a drop of metal solder in either a low melting form, or in suspension (either form would be remelted by the pressure means 2230).

Figure 18:
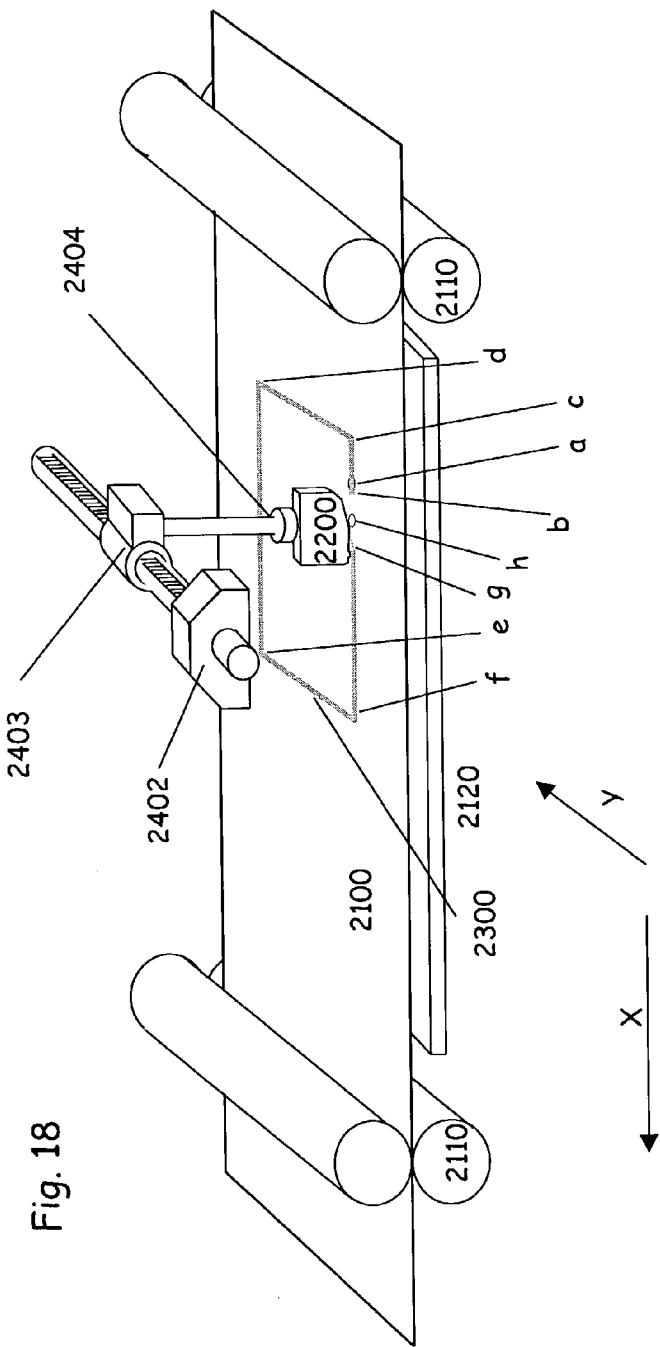
FIG. 18 is diagram that illustrates a method to lay down a simple rectangular conductive pathway using the apparatus shown in FIG. 15.

FIG. 18 illustrates a method using the apparatus shown in FIG. 15 to lay down a simple rectangular conductive pathway. The steps are as follows Substrate 2100 is indexed forward in the x direction by rollers 2110.

Using X positioning means 2402 and y positioning means 2403, the applicator 2200 is moved to point "a" and "h" where the hole punch 2240 makes two holes in the substrate 2100.

Using X positioning means 2402, the applicator 2200 is positioned to point "b".

The applicator 2200 moved by X positioning means 2402, uses internal devices 2210–2217 to lay down a conductive pathway 2300 from points "b" to "c." During this operation, cutter 2214 cuts the strip 2211 at a precisely determined moment so that the conductive pathway 2300 ends at point "c." Note that the beginning of the conductive strip 2300, at point "b," slightly overlaps the hole punched at "a."

X positioning means 2402 is used to move the conductive adhesive applicator 2261 to point "c", where a drop of conductive adhesive 2262 is placed on the end of the conductive pathway 2300.

Rotational positioning means 2404 rotates the applicator 2200 by 90 degrees so that it can run in the cross direction Y.

X and Y positioning means 2402 and 2403 are used to place the applicator 2200 to point "c."

The applicator 2200 moved by Y positioning means 2403, uses internal devices 2210–2217 to lay down a conductive pathway 2300 from points "c" to "d." During this operation, cutter 2214 cuts the strip 2211 at a precisely determined moment so that the conductive pathway 2300 ends at point "d."

Y positioning means 2403 is used to move the conductive adhesive applicator 2261 to point "d", where a drop of conductive adhesive 2262 is placed on the new end of the conductive pathway 2300.

Rotational positioning means 2404 rotates the applicator 2200 by 90 degrees so that it can run in the machine direction X.

X and Y positioning means 2402 and 2403 are used to place the applicator 2200 to point "d."

The applicator 2200 moved by x positioning means 2402, uses internal devices 2210–2217 to lay down a conductive pathway 2300 from points "d" to "e." During this operation, cutter 2214 cuts the strip 2211 at a precisely determined moment so that the conductive pathway 2300 ends at point "e."

X positioning means 2403 is used to move the conductive adhesive applicator 2261 to point "e", where a drop of conductive adhesive 2262 is placed on the new end of the conductive pathway 2300.

Rotational positioning means 2404 rotates the applicator 2200 by 90 degrees so that it can run in the cross direction Y.

X and Y positioning means 2402 and 2403 are used to place the applicator 2200 to point "e"

The applicator 2200 moved by y positioning means 2403, uses internal devices 2210–2217 to lay down a conductive pathway 2300 from points "e" to "f." During this operation, cutter 2214 cuts the strip 2211 at a precisely determined moment so that the conductive pathway 2300 ends at point "f."

Y positioning means 2403 is used to move the conductive adhesive applicator 2261 to point "f", where a drop of conductive adhesive 2262 is placed on the new end of the conductive pathway 2300.

Rotational positioning means 2404 rotates the applicator 2200 by 90 degrees so that it can run in the machine direction X.

X and Y positioning means 2402 and 2403 are used to place the applicator 2200 to point "f."

The applicator 2200 moved by x positioning means 2402, uses internal devices 2210–2217 to lay down a conductive pathway 2300 from points "f" to "g." This last portion of the pathway 2300 is not yet completed in FIG. 18. During this operation, cutter 2214 cuts the strip 2211 at a precisely determined moment so that the conductive pathway 2300 will end at point "g." Note that the end of the conductive pathway 2300, at point "g", will slightly overlap the second hole punched at point "h."

Steps 2–20 are repeated for each conductive trace 2300 to be applied to substrate 2100 on the exposed area of the substrate. Then the substrate is indexed forward again starting with step 1.

Instead of forming the conductive trace 2300 by connecting separate pieces of the foil strip 2211, the conductive trace 2300 may be formed from a continuous strip 2211. Instead of using cutter 2214 to cut the foil 2211 between segments at each corner, the strip 2211 may be automatically folded over. For example, this may be done by turning rotary positioning means 2404 through a 90 degree turn and pressing down on the folded corner so that the trace 2300 lays flat at the corner.

Figure 18B:
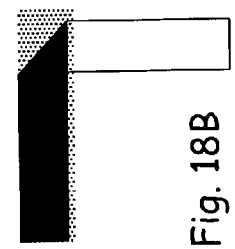
FIGS. 18A–B illustrate foil strips folded over.
Figure 18A:
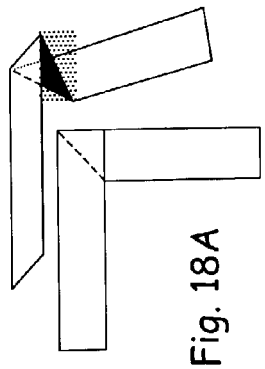

FIG. 18A shows the result. The folded corner will have a maximum of three overlapping thicknesses of foil. FIG. 18B shows the result if the foil is at the same time twisted 180 degrees to invert the tape. (This would require another positioning means, not shown. Inverting the tape may be undesirable if the tape has an adhesive coating, since the adhesive will now be facing away from the substrate). The folded corner will have a maximum of two overlapping thicknesses of foil.

Figure 19:
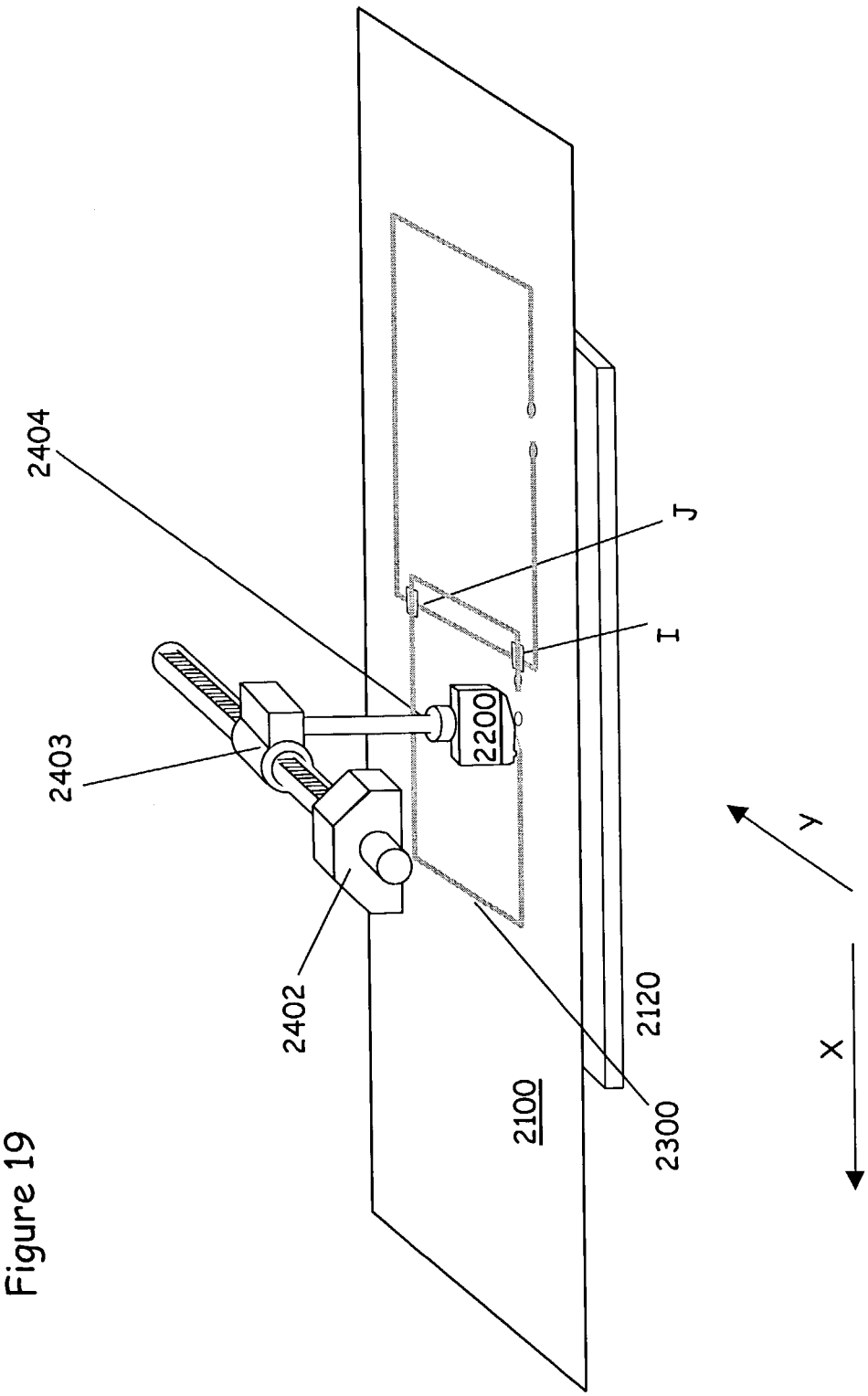
FIG. 19 shows an embodiment where a conductive trace 2300 being laid down overlaps a previous conductive trace.

FIG. 19 shows an embodiment where a conductive trace 2300 being laid down overlaps a previous conductive trace.

Before the overlapping segments of the second conductive trace 2300 are laid down, strips "I" and "J" of nonconductive film are laid down over the first trace, using applicator 2200. These insulating strips "I" and "J" prevent electrical contact between the separate conductive loops that are formed by the conductive trace 2300. In similar manner, "cross-over" circuitry can be laid down.

Figure 20:
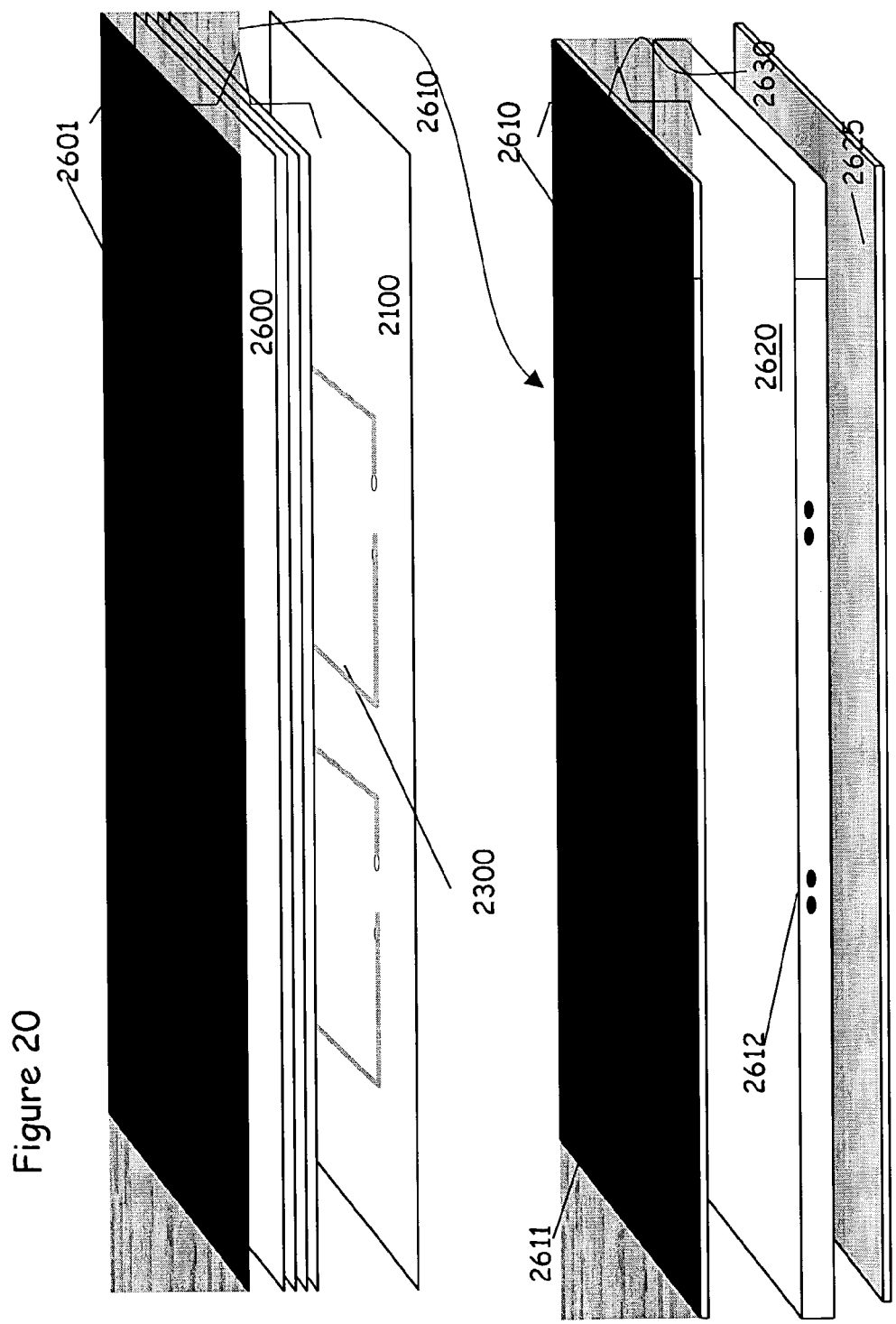
FIG. 20 is a laminated structure containing a foil strip antenna.

It is anticipated that the substrate 2100 with conductive traces 2300, whether in sheet or web form, may be incorporated into a laminated structure that may be used in a shelf, panel, enclosure, spaces, or other form. An example of such a laminated structure is shown in FIG. 20. The substrate 2100, which may be a paper or paperboard material, is joined with additional plies 2600 and 2601 of similar or dissimilar materials, for example saturating Kraft paperboard soaked in resin, and formed under heat and pressure into a laminate 2610. Usually the outer ply or plies 2601 on the first surface opposite from the substrate 2100 would be a decorative material that would be the "outside" of the resulting product. Depending on the orientation of the outer substrate layer 2100, this laminate 2610 contains on its second surface, or just inside that surface, the conductive traces 2300 already described. The laminate 2610 may then be glued onto a heavier supporting member 2620, such as a board made of wood, plastic, particle board, corrugated cardboard, Westvaco Core-board, or similar. The surface of laminate 2610 that is proximal to the conductive traces 2300 is preferably glued to the supporting member 2620. Thus the full thickness of the laminate 2610 protects the conductive traces 2300 from abrasion during use of the resulting combined structure 2630, formed of laminate 2610 and supporting member 2620.

A conductive or metallic backplane 2625 may optionally be applied to the bottom of the shelf to block RF energy from going below the shelf, thus making the shelf operate with approximately the same RF behavior regardless whether or not it was supported by metal brackets or placed upon an existing metal shelf.

Figure 21:
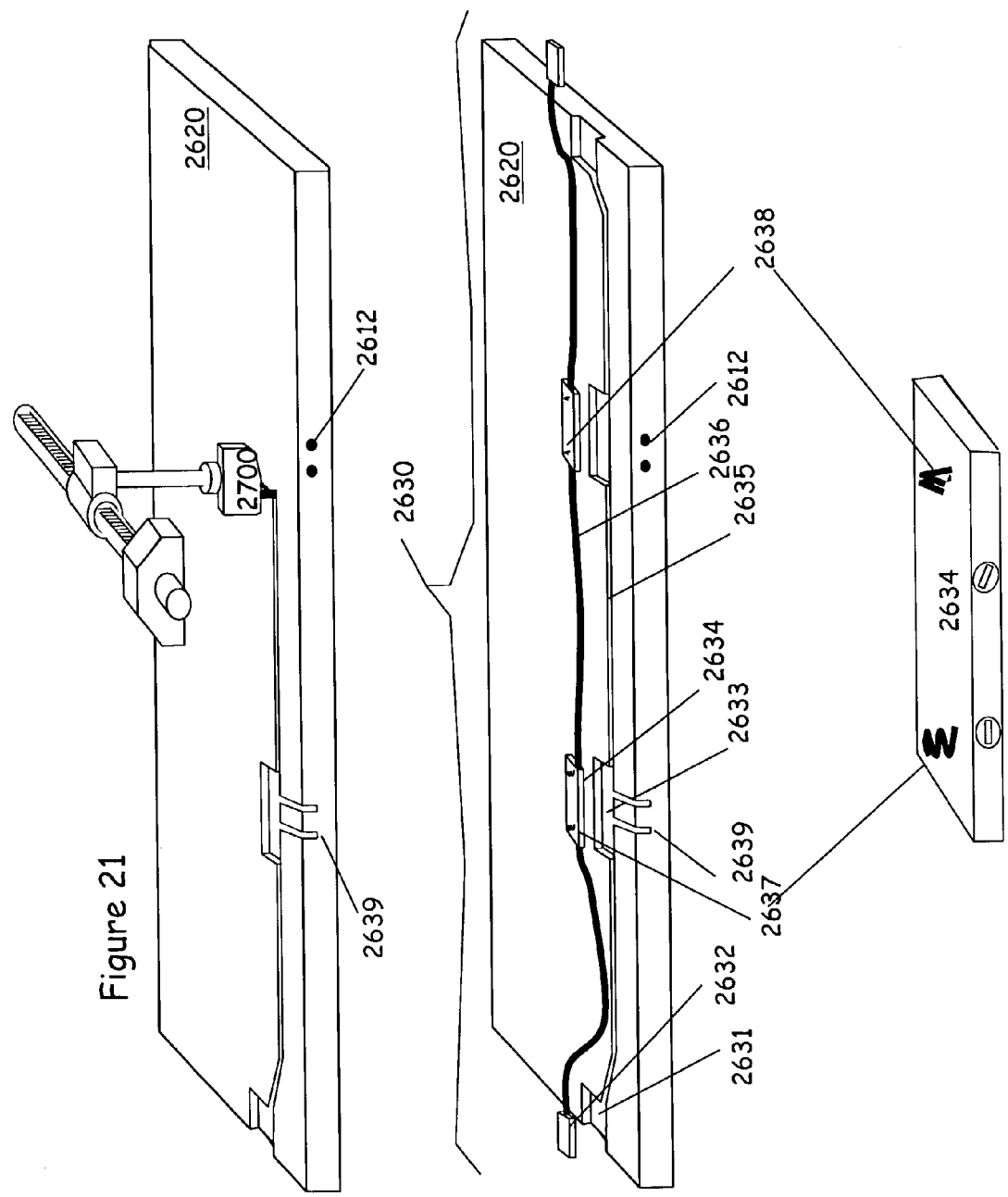
FIG. 21 is a diagram illustrating the use of a milling machine to form openings in a substrate.

FIG. 21 shows how, before the supporting member 2620 is glued to the laminate 2610, it is preferable to place inside the supporting member 2620 one or more electronic circuits that communicate with the conductive traces 2300, either by the latter being directly exposed, or through the perforations already described. To accommodate electronic circuits recesses may be milled into the surface of the supporting member 2620. A numerically controlled milling machine head 2700 could be used in a positioning system similar in design to the system shown in FIG. 15 for laying down the conductive traces 2300, and could be run by a same or similar computer control system that would control the location and depth of recesses. For example, at the edge of the supporting member 2620 is shown recess 2631 for accommodating an external connector 2632. Within supporting member 2620 is shown recess 2633 for containing electronic circuitry 2634 such as switching and tuning circuitry. Spanning supporting member 2620 is shown recess 2635 for containing wires or cables to connect the circuitry components. The electronic circuitry 2634 may incorporate spring loaded coils 2637 or fingers 2638 to make contact with the conductive traces 2300 on substrate 2100 that is part of laminate 2610 to be attached to support member 2620. Said electrical contact could be by pressure, by conductive adhesive or paste, or by solder melted during the lamination process. The milling head 2700 may be used to make grooves 2639 for access of tuning tools such as small screwdrivers for adjusting trim capacitors within circuitry 2634.

Tuning components within circuitry 2634, for example rotary trim capacitors (not shown) may require access after assembly, which can be provided through openings such as holes 2611 drilled through laminate 2610 in FIG. 20, or holes 2612 drilled through supporting member 2620 in FIGS. 20 and 21.

FIGS. 3A and 3B are block diagrams illustrating a preferred embodiment of an inventory control system that uses intelligent shelves in accordance with the present invention. As shown in FIG. 3A, each of the several intelligent shelves 501a–501n and 502a–502n provided according to the present invention have multiple antennae 200 connected to a reader unit 120 through a single transmission cable 222. The reader units 120 controls the activation of the connected antennae 200 either sequentially, or simultaneously with a phase difference, to determine item information from RFID tags associated with respective items being inventoried. Therefore, the reader units 120 are able to extract inventory related information for each of the RFID tagged items stored in the respective shelves. For simplicity, FIG. 3A shows only two groups of shelves, each group having its own reader unit, the groups being 501a–501n and 502a–502n respectively. However, one skilled in the art would recognize that many such groups of shelves could be a part of an inventory control system provided by the present invention. For example, all the shelves in one or more warehouses could be grouped to provide hundreds or even thousands of groups of shelves that could be connected together to form an inventory control system as provided by the present invention.

It should be understood that while the preferred embodiment of the inventory control system and method utilizes a multiple antenna RFID detection system with a single transmission cable 222 corresponding to the embodiment of FIG. 6, all the other embodiments of the multiple antenna RFID system disclosed herein may also be used with the inventory control system and method according to the present invention. Therefore, for example, the RFID detection systems disclosed in FIGS. 7 and 8 may also be used with the inventory control system and method of the present invention. In such embodiments, for example, the unmodulated RF system may be used first to warm up the tags before the modulated RF system is used to extract the inventory related data from the RFID tags.

As shown in FIG. 3A, the item information data collected by the reader units 120 from each of the intelligent shelves 501a–501n and 502a–502n is transmitted to an inventory control processing unit 550. The inventory control processing unit 550 is typically configured to receive item information from the intelligent shelves 501a–501n and 502a–502n. The inventory control processing unit 550 is typically connected to the intelligent shelves over an electronic network 525 and is also associated with an appropriate data store 555 that stores inventory related data including reference tables and also program code and configuration information relevant to inventory control or warehousing. The inventory control processing unit 550 is also programmed and configured to perform inventory control functions that well known to those skilled in the art. For example, some of the functions performed by an inventory control (or warehousing) unit include: storing and tracking quantities of inventoried items on hand, daily movements or sales of various items, tracking positions or locations of various items, etc.

In operation, the inventory control system would determine item information from the intelligent shelves 501a–501n and 502a–502n that are connected to the inventory control processing unit 550 through an electronic network 525. In one embodiment, the various intelligent shelves 501a–501n and 502a–502n would be under the control of inventory control processing unit 550 that would determine when the reader units 120 would poll the antennae 200 to determine item information of items to be inventoried. In an alternate embodiment, the reader units 120 may be programmed to periodically poll the connected multiple antennae for item information and then transmit the determined item information to the inventory control processing unit using a reverse "push" model of data transmission. In a further embodiment, the polling and data transmission of item information by the reader units 120 may be event driven, for example, triggered by a periodic replenishment of inventoried items on the intelligent shelves. In each case, the reader unit 120 would selectively energize the multiple antennae connected to it to determine item information from the RFID tags associated with the items to be inventoried.

Once the item information is received from the reader units 120 of the intelligent shelves 501a–501n and 502a–502n of the present invention, the inventory control processing unit 550 processes the received item information using programmed logic, code, and data at the inventory control processing unit 550 and at the associated data store 555. The processed item information is then typically stored at the data store 555 for future use in the inventory control system and method of the present invention.

One skilled in the art would recognize that inventory control processing unit 550 could be implemented on a general purpose computer system connected to an electronic network 525, such as a computer network. The computer network can also be a public network, such as the Internet or Metropolitan Area Network (MAN), or other private network, such as a corporate Local Area Network (LAN) or Wide Area Network (WAN), or even a virtual private network. A computer system includes a central processing unit (CPU) connected to a system memory. The system memory typically contains an operating system, a BIOS driver, and application programs. In addition, the computer system contains input devices such as a mouse and a keyboard, and output devices such as a printer and a display monitor.

The computer system generally includes a communications interface, such as an Ethernet card, to communicate to the electronic network 525. Other computer systems may also be connected to the electronic network 525. One skilled in the art would recognize that the above system describes the typical components of a computer system connected to an electronic network. It should be appreciated that many other similar configurations are within the abilities of one skilled in the art and all of these configurations could be used with the methods and systems of the present invention. Furthermore, it should be recognized that the computer system and network disclosed herein can be programmed and configured as an inventory control processing unit to perform inventory control related functions that are well known to those skilled in the art.

In addition, one skilled in the art would recognize that the "computer" implemented invention described herein may include components that are not computers per se but also include devices such as Internet appliances and Programmable Logic Controllers (PLCs) that may be used to provide one or more of the functionalities discussed herein. Furthermore, while "electronic" networks are generically used to refer to the communications network connecting the processing sites of the present invention, one skilled in the art would recognize that such networks could be implemented using optical or other equivalent technologies. Likewise, it is also to be understood that the present invention utilizes known security measures for transmission of electronic data across networks. Therefore, encryption, authentication, verification, and other security measures for transmission of electronic data across both public and private networks are provided, where necessary, using techniques that are well known to those skilled in the art.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. An intelligent station system that tracks RFID tags comprising:
   a reader unit that transmits and receives RF signals; and
   a first intelligent station that comprises: a first RF antenna connected to the reader unit by a first transmission cable through a first switch; and one or more additional RF antennae connected to the reader unit by the same first transmission cable through respective one or more additional switches;
   wherein the switches of non-selected antennae alter their associated tuning thus causing them to have a resonant frequency substantially different from the RF signal, and wherein the switches of non-selected antennae are only used to alter their tuning when the non-selected antennae are adjacent to a selected antenna.

2. An intelligent station system that tracks RFID tags comprising:
   a reader unit that transmits and receives RF signals;
   a first intelligent station that comprises: a first RF antenna connected to the reader unit by a first transmission cable through a first switch; and one or more additional RF antennae connected to the reader unit by the same first transmission cable through respective one or more additional switches; and
   a control unit that is operatively connected to the reader unit and to the first and one or more additional switches, wherein the control unit generates a control signal that selectively operates the first and one or more additional switches;
   wherein the first intelligent station further comprises a self-test RFID tag within range of each of the RF antennae; each intelligent station comprises at least one self-test RFID tag within range of each RF antenna, and an RF antenna during a testing step detects the self-test RFID tags within adjacent RF antennae and thus determines which other RF antennae or which other intelligent stations are adjacent; and wherein the adjacency information is used to determine which other RF antennae are to be detuned when an RF antenna is selected for reading.

3. A method of inventory control for items tagged with RFID tags, the method comprising the steps of:
   providing one or more reader units and one or more intelligent stations each of which is connected to at least one reader unit, each of the intelligent stations tracks RFID tags to determine item information of items to be inventoried, each intelligent station comprising: a first RF antenna connected to the reader unit by a first transmission cable through a first switch; and one or more additional RF antennae connected to the reader unit by the same first transmission cable through one or more additional switches, respectively;
   determining item information of items to be inventoried by selectively energizing the first and one or more additional RF antennae of each of the intelligent stations to determine item information of items that are located on the respective intelligent stations; and
   processing the determined item information to update inventory information of the items to be inventoried;
   wherein the step of providing one or more intelligent stations further comprises, for each intelligent station, providing a second transmission cable that connects the reader unit to the first and one or more additional RF antennae through first and one or more additional switches, respectively, wherein the reader unit transmits an unmodulated RF signal to the first and one or more additional RF antennae through the second transmission cable, and transmits a modulated RF signal to the first and one or more additional RF antennae through the first transmission cable; and
   wherein the step of providing one or more intelligent stations comprises, for each intelligent station, configuring the first and one or more additional switches to operate in one of only three states, a first state that only transmits a modulated RF signal to a respective one of the first or one or more additional RF antennae, a second state that only transmits an unmodulated RF signal to the one of the respective first or one or more additional RF antennae, and a third state such that both the modulated RF signal and the unmodulated RF signal bypass the respective one of the first or one or more additional RF antennae.

4. A method of inventory control for items tagged with RFID tags, the method comprising the steps of:
   providing one or more reader units and one or more intelligent stations each of which is connected to at least one reader unit, each of the intelligent stations tracks RFID tags to determine item information of items to be inventoried, each intelligent station comprising: a first RF antenna connected to the reader unit by a first transmission cable through a first switch; and one or more additional RF antennae connected to the reader unit by the same first transmission cable through one or more additional switches, respectively;
   determining item information of items to be inventoried by selectively energizing the first and one or more additional RF antennae of each of the intelligent stations to determine item information of items that are located on the respective intelligent stations; and processing the determined item information to update inventory information of the items to be inventoried; and
   for each reader unit, determining optimal RF power to be provided to read RF antennae connected to that reader unit; storing the determined optimal RF power for each reader unit in a data storage means; and using the stored optimal RF power for a reader unit when selectively energizing the RF antennae connected to that reader unit to determine item information of items located on the intelligent stations connected to that reader unit;
   wherein the data storage means comprise a look-up table.

5. An intelligent shelf system that tracks RFID tags comprising: a reader unit that transmits and receives RF signals; and a first intelligent station that comprises: a first RF antenna connected to the reader unit by a first transmission cable through a first switch; and one or more additional RF antennae connected to the reader unit by the same first transmission cable through respective one or more additional switches, wherein the intelligent station is arranged on a circular rack;

wherein two RF antennae are orthogonally disposed in two vertical planes within the center of the circular rack.

6. The intelligent shelf system according to claim 5, wherein the two RF antennae are connected to the reader unit with the length of the lead-in cables from the reader unit to the two RF antennae differing by ¼ of the RF wavelength.

7. The intelligent shelf system according to claim 5, wherein the two RF antennae are connected through a two-way 90 degree power splitter.

8. An intelligent shelf system that tracks RFID tags comprising: a reader unit that transmits and receives RF signals; and a first intelligent station that comprises: a first RF antenna connected to the reader unit by a first transmission cable through a first switch; and one or more additional RF antennae connected to the reader unit by the same first transmission cable through respective one or more additional switches, wherein the intelligent station is arranged on a circular rack;

wherein the RF antennae are designed as hangers and are arranged or provided on different portions of the circular rack.

* * * * *